US008783035B2

(12) United States Patent
Milam et al.

(10) Patent No.: US 8,783,035 B2
(45) Date of Patent: Jul. 22, 2014

(54) SYSTEM AND PROCESS FOR GENERATION OF ELECTRICAL POWER

(71) Applicant: Shell Oil Company, Houston, TX (US)

(72) Inventors: Stanley Nemec Milam, Houston, TX (US); Richard Bruce Taylor, Sugar Land, TX (US)

(73) Assignee: Shell Oil Company, Houston, TX (US)

( * ) Notice: Subject to any disclaimer, the term of this patent is extended or adjusted under 35 U.S.C. 154(b) by 111 days.

(21) Appl. No.: 13/678,211

(22) Filed: Nov. 15, 2012

(65) Prior Publication Data

US 2013/0133327 A1 May 30, 2013

Related U.S. Application Data

(60) Provisional application No. 61/559,855, filed on Nov. 15, 2011.

(51) Int. Cl.
*F01K 25/08* (2006.01)
*F01K 23/04* (2006.01)

(52) U.S. Cl.
USPC .......... 60/651; 60/655; 60/660; 60/671

(58) Field of Classification Search
USPC .............. 60/651, 671, 655, 660
See application file for complete search history.

(56) References Cited

U.S. PATENT DOCUMENTS

| 3,516,249 | A | * | 6/1970 | Paxton | 60/651 |
| 4,489,563 | A | | 12/1984 | Kalina | |
| 4,732,005 | A | | 3/1988 | Kalina | |
| 4,995,234 | A | * | 2/1991 | Kooy et al. | 60/648 |
| 6,751,959 | B1 | * | 6/2004 | McClanahan et al. | 60/670 |
| 8,096,128 | B2 | * | 1/2012 | Held et al. | 60/645 |

FOREIGN PATENT DOCUMENTS

JP      2000145408 A2      5/2000

OTHER PUBLICATIONS

Fleury, J., Pilot Plant Demonstrates Steam-Ammonia Binary Cycles, Modern Power Systems, (Journal) vol. 5, No. 2, 71-75, Mar. 1985.

* cited by examiner

*Primary Examiner* — Hoang Nguyen

(57) ABSTRACT

A system and process for generation of electrical power is provided. Electrical power is generated by a system including two integrated power cycles, a first power cycle utilizing water/steam as a working fluid and the second power cycle utilizing a fluid selected from the group consisting of molecular nitrogen, argon, a chemical compound having a boiling point of at most 65° C. at 0.101 MPa and a latent heat of vaporization of at least 350 kJ/kg, and a chemical compound having a boiling point of at most 65° C. at 0.101 MPa and a specific heat capacity as a liquid of at least 1.9 kJ/kg-° K as a working fluid. The working fluid of the second power cycle is expanded through a two-phase expander to produce power in the second power cycle, where the expanded working fluid of the second cycle has a temperature of at most 10° C.

22 Claims, 11 Drawing Sheets

SYSTEM AND PROCESS FOR GENERATION OF ELECTRICAL POWER

The present application claims the benefit of U.S. Patent Application No. 61/559,855, filed Nov. 15, 2011, the entire disclosure of which is hereby incorporated by reference.

BACKGROUND OF THE INVENTION

A large proportion of electrical power generated in the world is produced by systems and processes that transfer thermal power from a heat source to water to produce steam and produce electrical power from the steam. Such systems and processes include fossil fuel power plants including coal-fired power plants, oil-fired power plants, and natural gas-fired power plants; nuclear power plants; geothermal power plants; waste incineration power plants; and solar thermal electric plants. Together these systems and processes for producing electrical power from thermal power account for about 80% of electrical power production worldwide, where coal-fired power plants produce about 41%, natural gas fired power plants produce about 20%, nuclear power plants produce about 15%, and oil-fired power plants produce about 6% of the total world electric power.

Many of these systems and processes produce significant quantities of carbon dioxide as an undesirable by-product emission. In particular, fossil fuel power plants such as coal-fired power plants, oil-fired power plants, and natural gas-fired power plants generate substantial quantities of carbon dioxide as a by-product of combustion. Typically, the carbon dioxide produced by these plants is emitted into the atmosphere, contributing to the increase of carbon dioxide in the atmosphere.

Electrical power production by steam-based thermal to electrical power systems and processes is relatively inefficient. Typically, steam-based thermal to electrical power systems generate 13-58% electrical power as a percent of the heating value of the fuel consumed. Standard fossil fuel plants utilizing sub-critical steam as a heat transfer agent for producing electrical power typically generate from 36-40% electrical power as a percent of the heating value of the fuel consumed. Nuclear power plants tend to be less efficient than standard fossil fuel plants, generating electrical power at 30-32% of the heating value of the fuel consumed due to the lower operating temperatures, and consequently lower steam pressures, at which nuclear reactors are run relative to fossil fuel-fired plants.

Substantial efforts have been made to increase the efficiency of steam-based thermal to electrical power systems and processes by even a few percentage points of the heating value of the fuel consumed. For example, power plants have been designed that utilize thermal power to produce super-critical steam (steam having a temperature of at least 374° C. and a pressure of at least 22.15 MPa), thereby improving the efficiency of electrical power generation to about 40-45% of the heating value of the fuel consumed. Currently, efforts are being made to utilize thermal power to produce ultra super-critical steam (steam having a temperature of at least 374° C. and a pressure of at least 30 MPa), thereby improving the efficiency of electrical power generation to about 48% of the heating value of the fuel consumed. Combined cycle gas turbine plants with integtrated heat recovery steam generator systems have been developed that can generate electrical power in an amount up to 53-58% of the heating value of a natural gas fuel consumed to produce the electrical power.

The Kalina cycle, as illustrated in U.S. Pat. Nos. 4,489,563 and 4,732,005, has been introduced as a method for increasing the efficiency of electrical power generation relative to a purely water/steam based thermal to electrical power system. Electrical power generating systems utilizing the Kalina cycle replace a water/steam based working fluid with an aqueous ammonia working fluid, where the ammonia/water concentrations of the aqueous ammonia working fluid can be varied so that the aqueous ammonia working fluid may attain a temperature close to the temperature of the heat source. The Kalina cycle is particularly useful for capturing thermal power from heat sources having relatively low heating value, for example, low grade and conventional geothermal power and industrial waste heat. The Kalina cycle may increase the efficiency of electrical power generation from a heat source having a relatively low heating value by 5-10% of the heating value of the fuel consumed relative to a purely water/steam based thermal to electrical power system.

Other working fluids are being developed to replace the water/steam working fluid that is utilized as a heat transfer agent in most thermal to electrical power systems. For example, a thermal to electrical power system is being developed by Saena corporation that utilizes supercritical carbon dioxide as a working fluid instead of water/steam. Specialized equipment and systems and seals, however, are required to handle supercritical carbon dioxide at temperatures above 400° C., temperatures that are typical in thermal to electrical power systems. These specialized systems, equipment, and seals may be impractical in a large scale commercial electrical power plant capable of generating over 100 MW of electrical power.

Journal article *Pilot Plant Demonstrates Steam-Ammonia Binary Cycles, Modern Power Systems*, vol. 5, no. 2, 71-75, March (1985) provides a binary cycle system utilizing a water/steam working fluid as a heat transfer agent in a first cycle and a working fluid other than water having a lower condensing temperature than water and a low freezing temperature, ammonia for example, as a heat transfer agent in a second cycle, where the second cycle is a "bottoming cycle" that receives its heat from low energy steam produced in the first cycle. Water is heated by a heat source (e.g. nuclear fission or an oil-fired boiler) to produce steam that is expanded in an expander to produce electrical power and low energy steam. Heat is transferred from the low energy steam to the second working fluid in a boiler/condenser to produce a vapor stream from the second working fluid that is expanded in a second expander to produce additional electrical power and to produce an expanded vapor that is subsequently condensed in a condenser by exposure to an ambient air flow. The bottoming cycle permits the use of air cooling to condense the second working fluid rather than evaporative cooling requiring water, permitting a power plant to be sited in locations where there is no large supply of water for evaporative cooling. Substantial power, however, is lost by air cooling the second working fluid because the latent heat of condensation of the second working fluid is rejected to the atmosphere in the air warmed by heat exchange with the second working fluid to condense the second working fluid.

Japanese patent application JP2000145408 A2 also discloses a binary cycle system utilizing a top cycle having steam as a working fluid and a bottoming cycle utilizing a working fluid having a boiling point lower than water such as benzene, pentane, and ammonia. The expanded vapor produced by vaporizing the working fluid of the bottoming cycle and expanding the resulting vapor to produce electrical power is condensed by air cooling or water cooling of the expanded vapor in a condenser. The efficiency of electrical power production is disclosed as being improved from 11% to 17-18% relative to a single cycle steam based system. Again, substantial power is lost by air cooling or water cooling the bottoming cycle working fluid because the latent heat of condensation of the bottoming cycle working fluid is rejected to the atmosphere in the air, or lost to the cooling water, warmed by heat exchange with the bottoming cycle working fluid.

There is a need for practical steam-based thermal to electrical power generating systems and processes that produce substantial amounts of electrical power per unit fuel, particularly steam-based thermal to electrical power generating systems that produce significantly more electrical power per unit fuel than currently utilized electrical power generating processes and systems. Further, there is a need for thermal based fossil fuel-fired electrical power generating systems and processes that produce little or no carbon dioxide emissions.

SUMMARY OF THE INVENTION

The present invention is directed to a method for producing power comprising:
providing a water vapor stream comprising at least 50 mass % water vapor and having a vapor quality of at least 85;
providing a fluid stream in liquid phase, where the fluid of the fluid stream is formed of one or more constituents selected from the group consisting of molecular nitrogen, argon, a chemical compound having a boiling point of at most 65° C. at 0.101 MPa and a latent heat of vaporization of at least 350 kJ/kg, and a chemical compound having a boiling point of at most 65° C. at 0.101 MPa and a specific heat capacity as a liquid of at least 1.9 kJ/kg-° K, where the one or more constituents comprise at least 50% of the fluid of the fluid stream;
thermally contacting the water vapor stream and the liquid phase fluid stream and exchanging heat between the water vapor stream and the fluid stream to condense water from the water vapor stream and to convert at least a portion of the liquid phase fluid stream into a gaseous or a supercritical phase, where the gaseous or supercritical phase fluid stream has a vapor quality of at least 95;
expanding the gaseous or supercritical fluid stream through a first expander system to generate mechanical power and to produce a first expander output stream comprised of the fluid re-formed in liquid phase;
controlling the mass flow rate of the liquid phase fluid stream, or the mass flow rate of the water vapor stream, or the mass flow rates of both the liquid phase fluid stream and the water vapor stream while thermally contacting the water vapor stream and the liquid phase fluid stream to maintain the temperature of the first expander output stream at or below 10° C.; and
generating electrical power from the mechanical power.

DETAILED DESCRIPTION OF THE INVENTION

Figure 1:
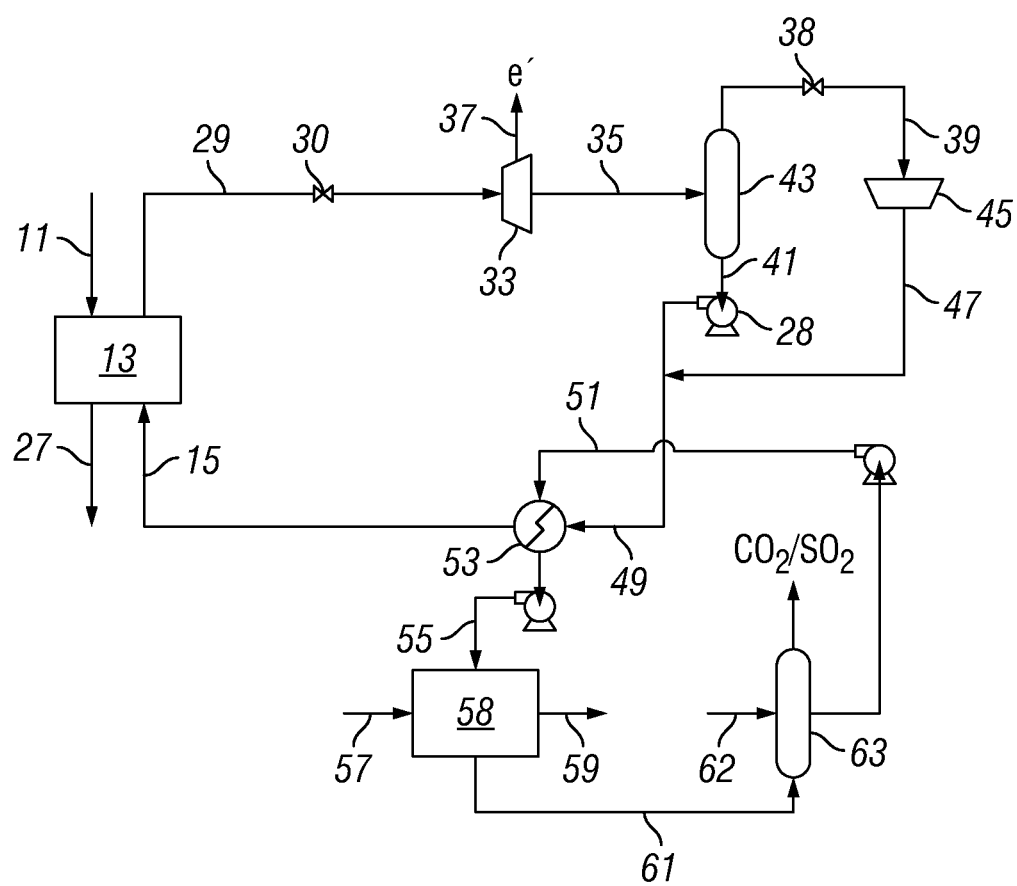
FIG. 1 provides a schematic diagram of the process of the present invention.

Certain terms that are used herein are defined as follows: "Operatively connected" or "operatively coupled", as used herein, when used in conjunction with two or more defined elements, means that the elements are directly or indirectly connected or coupled to allow interaction between the elements. For example, elements that are described as operatively connected or operatively coupled to permit a fluid stream to flow between the elements may be directly connected or coupled so that a fluid stream may flow directly between the elements or may be indirectly connected or coupled so that a fluid stream may flow between the elements after flowing through one or more additional elements. As a further example, elements that are electrically operatively connected or operatively coupled may be directly connected or coupled so that current flows directly between the elements, or may be indirectly connected or coupled so that current flows between the elements after flowing through one or more additional elements, or may be inductively coupled. "Vapor quality", as the term is used herein, is defined as the fraction of the mass of a saturated fluid that is vapor. Vapor quality is defined according to the following equation: $\chi=[m_{vapor}/(m_{vapor}+m_{liquid})]$, where $\chi$ is the vapor quality and m is mass (measured in the same units for each m). Fluids that are not saturated fluids, such as compressed fluids and superheated fluids, do not have a defined vapor quality.

In conventional steam-based thermal to electrical power generating systems and processes, thermal power is generated by a heat source and transferred to steam as a working fluid, and the steam is expanded through one or more expanders (e.g. steam turbine(s)) to produce rotational mechanical power that is converted to electrical power. Expansion of the steam through the one or more expanders produces expanded low energy steam, typically having a temperature of about 110-130° C. at atmospheric pressure (optionally having a temperature as low as about 35° C. at partial vacuum pressures generated in condensing the steam). Temperature and pressure conditions through the one or more expanders are controlled to avoid excessive condensation of water from the steam to avoid damaging the expander turbine blades—typically the low energy steam has a vapor quality of at least 0.8. The low energy steam is then cooled by passing the low energy steam into a first condenser where it is thermally contacted with circulating cooling water to exchange heat between the circulating cooling water and the low energy steam, condensing water from the low energy steam and heating the circulating cooling water. The circulating cooling water is then passed to a cooling tower to reject waste heat to the atmosphere. The water produced by cooling the low energy steam may then be recycled for contact with the heat source to produce steam, and the process may be repeated.

The waste heat rejected to the atmosphere in a conventional steam-based thermal to electrical power generating processes and systems is substantial relative to the total thermal power produced by the heat source per unit fuel. The waste heat is comprised of the latent heat of condensation of water and the sensible heat produced by cooling the low energy steam to produce water. The latent heat of condensation of water that is rejected as waste heat in a conventional steam-based thermal to electrical power generating process typically comprises about 30-50% of the heating value of the fuel, and the sensible heat rejected as waste heat typically comprises about 5-15% of the heating value of the fuel. Typically from about 40-60% of the heating value of the fuel is rejected as waste heat in a conventional steam-based thermal to electrical power generating process and system.

In one aspect, the present invention is directed to a process for capturing a substantial portion of the latent heat of condensation of water and the sensible heat that is rejected as waste heat in a conventional steam-based thermal to electrical power process and converting the resulting thermal power to electrical power. In the process of the present invention, a water vapor stream comprising at least 50 mass % water vapor is thermally contacted with a fluid stream formed of a fluid in liquid or supercritical phase, where the fluid stream is provided for thermal contact with the water vapor stream at a temperature at least 30° C. cooler than the water vapor stream, and heat is exchanged between the water vapor stream and the fluid stream to condense liquid water from the water vapor stream and to heat the fluid stream, where at least a portion of the fluid of the heated fluid stream is in a gaseous or supercritical phase. The heated fluid stream is then expanded to generate mechanical power and to produce an expanded fluid stream comprised of the fluid in liquid phase, and electrical power is generated from the mechanical power. While thermally contacting the water vapor stream and the fluid stream, the mass flow rate of the fluid stream, or the mass flow rate of the water vapor stream, or the mass flow rates of both the fluid stream and the water vapor stream are controlled to maintain the temperature of the expanded fluid stream at or below 10° C.

The water vapor stream may be low energy steam produced by expanding high energy steam. The high energy steam may be produced by heating water to generate steam having a temperature of at least 400° C. and a pressure of at least 3 MPa. For example, the high energy steam may be produced by contacting water or steam with a heat source, for example, a heat source provided by combustion of coal, natural gas, natural gas condensate, liquid natural gas, or oil; nuclear fission; a geothermal heat source; or a solar heat source to generate steam having a temperature of at least 400° C. and a pressure of at least 3 MPa. In a preferred embodiment, expansion of the high energy steam to produce the water vapor stream generates mechanical power, and electrical power is generated from the mechanical power produced by expanding the high energy steam.

The fluid of the fluid stream is formed of one or more constituents selected from the group consisting of molecular nitrogen, argon, a chemical compound having a boiling point of at most 65° C. at 0.101 MPa and a latent heat of vaporization of at least 350 kJ/kg, and a chemical compound having a boiling point of at most 65° C. at 0.101 MPa and a specific heat capacity as a liquid of at least 1.9 kJ/kg-° K.

The process of the present invention permits from 60-90% of the heating value of the fuel to be produced as electrical power.

Referring now to FIG. 1, a process in accordance with the present invention is illustrated. A water vapor stream 11 comprising at least 50 mass % water vapor is provided for thermal contact with a fluid stream 15. The water vapor stream 11 may be fed to a condenser 13 in which the water vapor stream is thermally contacted with the fluid stream 15. The water vapor stream 11 may comprise at least 90 mass %, or at least 95 mass %, or at least 99 mass % water vapor. The water vapor stream may also have a vapor quality of at least 0.8, or at least 0.85, or at least 0.9, or at least 0.95, or may be 1, or may be superheated steam. The water vapor stream 11 may have a temperature of from about 35° C. to about 400° C., a pressure of from 0.0053 MPa (40 torr) to 0.667 MPa (5000 torr), and an enthalpy of from about 2000 kJ/kg to about 4000 kJ/kg. Preferably the water vapor stream 11 is low energy steam. As noted above, the low energy steam may be derived from high energy steam by expanding the high energy steam, where the high energy steam may be produced by thermally contacting water or low energy steam with a heat source.

A fluid stream 15 comprised of a fluid in liquid or supercritical phase is provided for thermal contact with the water vapor stream 11. The fluid stream 15 may be fed to the condenser 13 for thermal contact with the water vapor stream 11, where the fluid stream is thermally contacted with the water vapor stream in the condenser to exchange heat with the water vapor stream. The fluid stream 15 may be provided for thermal contact with the water vapor stream 11 at a temperature at least 30° C., or at least 50° C., or at least 75° C., or at least 90° C., or at least 100° C., or at least 120° C. cooler than the water vapor stream. The fluid stream 15 provided for thermal contact with the water vapor stream 11 may have a vapor quality of at most 0.5, or at most 0.25, or at most 0.1, or at most 0.05, or at most 0.01, or 0%, or may be a compressed liquid or a supercritical fluid.

The fluid of the fluid stream 15 may be formed of one or more constituents that have a relatively high specific heat capacity as a liquid and/or a relatively high latent heat of vaporization so the fluid stream may effectively exchange heat with the water vapor stream 11 to cool the water vapor stream and condense liquid water from the water vapor stream. The one or more constituents of the fluid of the fluid stream 15 may be selected from compounds or elements that have a latent heat of vaporization of at least 350 kJ/kg, or at least 500 kJ/kg, or at least 750 kJ/kg, or at least 1000 kJ/kg and/or that have a specific heat capacity as a liquid of at least 1.9 kJ/kg-° K, or at least 2 kJ/kg-° K, or at least 2.25 kJ/kg-° K. The one or more constituents of the fluid of the fluid stream 15 are selected from the group consisting of molecular nitrogen, argon, a chemical compound having a boiling point of at most 65° C. at 0.101 MPa and a latent heat of vaporization of at least 350 kJ/kg, and a chemical compound having a boiling point of at most 65° C. at a pressure of 0.101 MPa and a specific heat capacity as a liquid of at least 1.9 kJ/kg-° K. Preferably, a constituent of the fluid is selected from the group consisting of anhydrous ammonia, anhydrous carbon dioxide, anhydrous sulfur dioxide, methanol, dichloromethane, dimethyl ether, acetone, diethyl ether, methyl amine, dimethyl amine, trimethyl amine, methyl formate, and molecular nitrogen.

The one or more constituents of the fluid of the fluid stream 15 may also be selected for the capacity to be converted to a gaseous or a supercritical phase upon exchanging heat with the water vapor stream 11 at the pressure and temperature at which the fluid stream 15 is provided for thermal contact with the water vapor stream and at the mass flow rates that the fluid stream and the water vapor stream 11 are provided for thermal contact with each other. Each constituent of the fluid of the fluid stream 15 may have a boiling point of at most 65° C., or at most 25° C., or at most 0° C., or at most −30° C., or at most −50° C. at 0.101 MPa. The one or more constituents of the fluid of the fluid stream 15 may also be selected to have a freezing point of at most −75° C. at 0.101 MPa.

The one or more constituents of the fluid of the fluid stream 15 may also have a low surface tension relative to the surface tension of water at equivalent temperatures. Preferably the one or more constituents of the fluid of the fluid stream a low surface tension relative to the surface tension of water to reduce wear on the expander system utilized to expand the heated fluid stream.

The one or more fluid constituents disclosed above may comprise at least 50 wt. % of the fluid of the fluid stream 15, and more preferably may comprise at least 75 wt. %, or at least 90 wt. %, or at least 95 wt. %, or at least 99 wt. % of the fluid of the fluid stream. Most preferably, the fluid of the fluid stream 15 consists essentially of the one or more constituents selected from the group consisting of molecular nitrogen, argon, a chemical compound having a boiling point of at most 65° C. at a pressure of 0.101 MPa and a latent heat of vaporization of at least 350 kJ/kg, and a chemical compound having a boiling point of at most 65° C. at a pressure of 0.101 MPa and a specific heat capacity as a liquid of at least 1.9 kJ/kg-° K. In an embodiment of the process of the invention, the fluid of the fluid stream 15 is selected from the group consisting of molecular nitrogen, anhydrous ammonia; anhydrous carbon dioxide; anhydrous sulfur dioxide; a mixture of anhydrous ammonia with methyl amine, dimethyl amine, and/or trimethyl amine; or a mixture of carbon dioxide and methanol.

Figure 2:
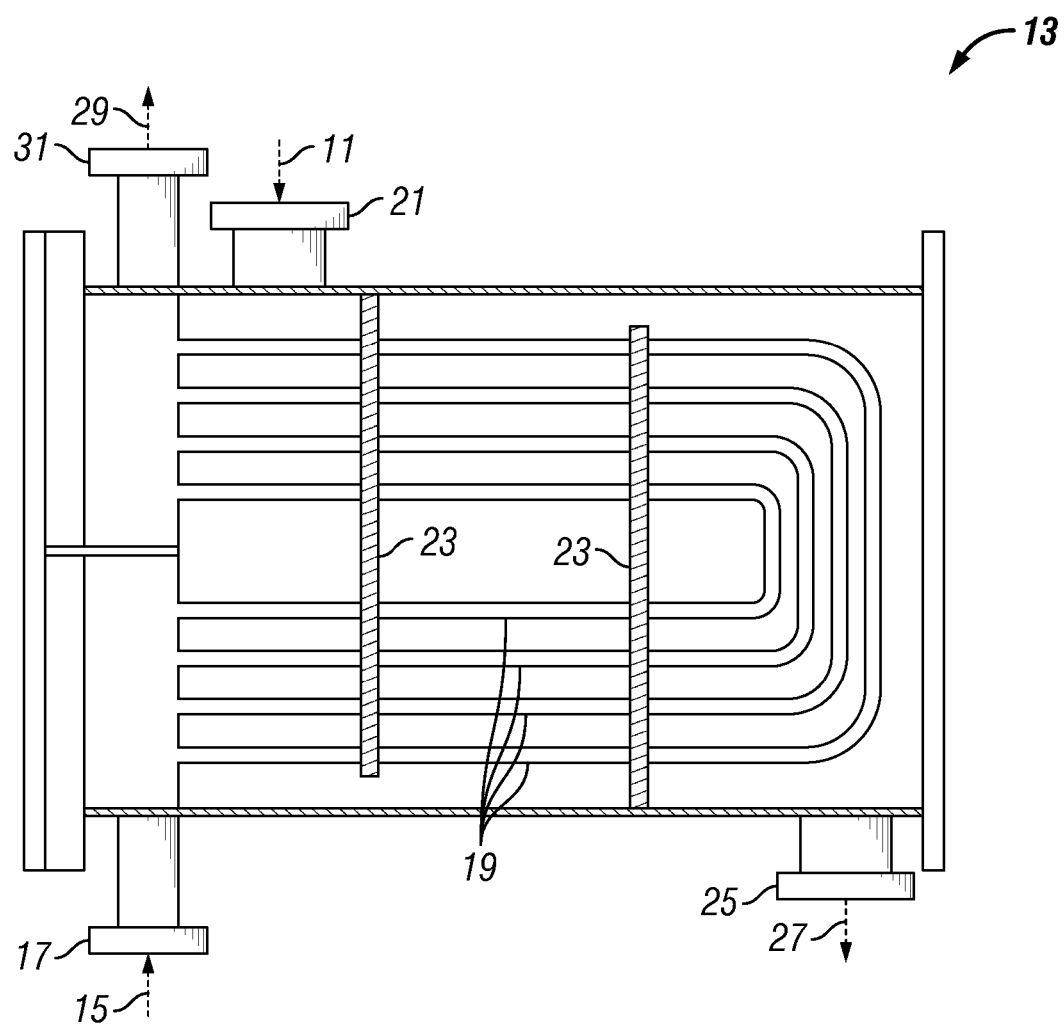
FIG. 2 provides a schematic diagram of a shell and tube condenser that may be used in the process of the present invention.

The fluid stream 15 and the water vapor stream 11 may be thermally contacted by indirectly contacting the fluid stream and the water vapor stream, for example in the condenser 13. As shown in FIG. 2, the fluid stream 15 and the water vapor stream 11 may be thermally contacted by indirect contact in a shell and tube heat exchanger/condenser 13. The fluid stream 15 may enter the condenser 13 through inlet 17 and may circulate through the condenser through tubes 19. The water vapor stream 11 may enter the condenser 13 through inlet 21 and may flow over tubes 19 as it passes through the condenser. Baffles 23 may route the water vapor stream 11 over the tubes 19 to increase the time period of thermal contact between the water vapor stream and the fluid stream 15. As heat is exchanged between the water vapor stream 11 and the fluid stream 15, water condenses from the water vapor stream and the fluid stream is heated, vaporizing liquid phase fluid to form a gaseous or supercritical fluid, or heating supercritical phase fluid if the fluid of the fluid stream 15 is in supercritical phase. The water condensed from the water vapor stream 11 may be removed from the condenser 13 through outlet 25 as a water stream 27, and the heated fluid stream 29 comprised of gaseous or supercritical phase fluid may be removed from the condenser through vapor outlet 31.

Referring back to FIG. 1, the temperature and pressure of the water vapor stream 11 provided for thermal contact with the fluid stream 15 and the temperature and pressure of the fluid stream provided for thermal contact with the water vapor stream are selected to provide a temperature differential of at least 30° C., or at least 50° C., or at least 75° C., or at least 100° C., or at least 125° C. between the water vapor stream and the fluid stream. The water vapor stream 11 may be provided for thermal contact with the fluid stream at a temperature of from about 35° C. to about 300° C. and at a pressure of from 0.0053 MPa (40 torr) to 0.667 MPa (5000 ton) where the temperature and pressure of the water vapor stream provided for thermal contact with the fluid stream are preferably selected so that the water vapor stream 11 has a vapor quality of at least 0.9, and more preferably has a vapor quality of 1.00, and most preferably so the temperature of the water vapor stream is elevated above its saturated vapor pressure. Preferably the water vapor stream 11 is provided for thermal contact with the fluid stream 15 at a pressure at which water condenses from the water vapor stream at a temperature of at least 50° C., or at least 75° C., or at least 90° C., or at least 100° C., or at least 120° C.

In an embodiment of the process of the present invention the water vapor stream 11 may be provided for thermal contact with the fluid stream 15 at a pressure of about 0.012 MPa so that the water in the water vapor stream condenses at a temperature of about 50° C. In another embodiment, the water vapor stream may be provided for thermal contact with the fluid stream at a pressure of about 0.039 MPa so that the water in the water vapor stream condenses at a temperature of about 75° C., or the water vapor stream may be provided for thermal contact with the fluid stream at a pressure of about 0.070 MPa so that the water in the water vapor stream condenses at a temperature of about 90° C., or the water vapor stream may be provided for thermal contact with the fluid stream at a pressure of about 0.101 MPa so that the water in the water vapor stream condenses at a temperature of about 100° C., or the water vapor stream may provided for thermal contact with the fluid stream at a pressure of about 0.198 MPa so that the water in the water vapor stream condenses at a temperature of about 120° C.

The water vapor stream 11 has sufficient enthalpy to substantially heat the fluid of the fluid stream 15 upon thermal contact with the fluid stream 15 when the water vapor stream and the fluid stream, respectively, are provided for thermal contact with each other at rates effective to condense water from the water vapor stream. When the fluid of the fluid stream 15 is in liquid phase, the water vapor stream 11 preferably has sufficient enthalpy to convert at least a majority, and preferably at least 80 mass %, or at least 90 mass %, or substantially all, or 100 mass % of the fluid of fluid stream 15 to a gaseous or supercritical phase The water vapor stream 11 provided for thermal contact with the fluid stream 15 may have an enthalpy of at least 2000 kJ/kg, or at least 2200 kJ/kg, or at least 2500 kJ/kg and may have an enthalpy of up to 4000 kJ/kg or up to 3500 kJ/kg.

The fluid stream 15 is provided for thermal contact with the water vapor stream 11 at a temperature effective to cool the water vapor stream 11 and condense water from the water vapor stream. If the fluid of the fluid stream 15, or a portion thereof, is in liquid phase, the fluid stream is provided for thermal contact with the water vapor stream 11 at a temperature, pressure, and a rate effective to cool the water vapor stream 11 and condense water therefrom and to permit vaporization of the fluid of the fluid stream. The fluid stream 15 is most preferably provided to the condenser 13 for thermal contact with the water vapor stream 11 at a temperature that does not induce the formation of ice from the water condensed from the water vapor stream. The fluid stream 15 may be provided for thermal contact with the water vapor stream 11 at a temperature of from 0° C. to 65° C., or at a temperature of from 0° C. to 25° C., or at a temperature of from 5° C. to 20° C. The fluid stream 15 is provided for thermal contact with the water vapor stream 11 at a temperature that is at least 30° C. lower than the temperature at which the water vapor stream 11 is provided for thermal contact with the fluid stream to provide an effective exchange of heat between the water vapor stream 11 and the fluid stream 15. Preferably, the fluid stream 15 is provided for thermal contact with the water vapor stream 11 at a temperature that is at least 30° C., or at least 50° C., or at least 75° C., or at least 100° C., or at least 125° C. cooler than the temperature at which the water vapor stream 11 is provided for thermal contact with the fluid stream 15.

The fluid stream 15 may be provided at a selected pressure for thermal contact with the water vapor stream. The fluid stream 15 is provided for thermal contact with the water vapor stream 11 at a pressure under which the fluid of the fluid stream is in liquid phase or in supercritical phase, and under which the heated fluid stream 29 produced by thermal contact with the water vapor stream is in gaseous phase or in supercritical phase. If the fluid of the fluid stream is in liquid phase, the fluid stream may be provided at a selected pressure for thermal contact with the water vapor stream by pumping the fluid stream through a fluid stream pump 28. If the fluid of the fluid stream is in supercritical phase, the pump 28 may be a supercritical fluid pump that may provide the fluid stream 15 at a selected pressure for thermal contact with the water vapor stream 11. Alternatively, the fluid stream 15 may be provided at a selected pressure for thermal contact with the water vapor stream 11 by pumping the fluid of the fluid stream in liquid phase then heating the pumped liquid phase fluid to convert the liquid phase fluid to supercritical phase and providing the supercritical fluid for thermal contact with the water vapor.

The mass flow rate of the fluid stream 15, or the mass flow rate of the water vapor stream 11, or the mass flow rates of both the fluid stream and the water vapor stream are controlled in the step of thermally contacting the fluid stream and the water vapor stream to maintain the temperature of an expanded fluid stream at 10° C. or less, or at 5° C. or less, or at 0° C. or less, or at –10° C. or less, or at –20° C. or less, or at –30° C. or less, or from –100° C. to 10° C., or from –90° C. to 0° C., or from –80° C. to –10° C., or from –75° C. to –20° C., where the expanded fluid stream 35 is produced by expanding the heated fluid stream 29 produced by thermally contacting the fluid stream with the water vapor stream. The fluid stream 15 and the water vapor stream 11 may be provided for thermal contact at mass flow rates, respectively, sufficient to provide an amount of fluid during the period of time that the fluid stream is in contact with the water vapor stream that is at least 1 times, or at least 2 times, or at least 3 times the mass of the water vapor in the water vapor stream (mass ratio of fluid stream:water vapor stream is at least 1 or at least 2, or at least 3), or from 1 times the mass of the water vapor in the water vapor stream to 20 times the mass of the water vapor in the water vapor stream (mass ratio of fluid stream:water vapor stream of 1:1 to 20:1), or at a mass ratio of fluid stream:water vapor stream of at least 2:1, or at least 3.1, or at least 4:1, up to 10:1, or up to 8:1, or up to 7:1. The mass flow rate of the fluid stream 15, or the mass flow rate of the water vapor stream 11, or the mass flow rates of both the fluid stream and the water vapor stream may also be controlled in the step of thermally contacting the fluid stream and the water vapor stream to maintain the vapor quality of the expanded fluid stream at 0.5 or less, or at most 0.4, or at most 0.3, or at most 0.2, or at most 0.1, or at most 0.05, or to produce the expanded fluid stream as a supercooled fluid.

The fluid stream 15 and the water vapor stream 11 may be provided for thermal contact with each other at mass flow rates, respectively, that, during the period of time the fluid stream is in thermal contact with the water vapor stream, provide a quantity of the fluid effective to cool the water vapor stream and condense at least 50 mass %, or at least 75 mass %, or at least 90 mass %, or at least 95 mass %, or at least 99 mass %, or all, of the water vapor in the water vapor stream to liquid water. Preferably the fluid stream 15 is provided for thermal contact with the water vapor stream 11 at a mass flow rate effective to provide the fluid stream at the smallest mass ratio of the fluid stream to the water vapor stream that is effective to cool the water vapor stream and condense at least 50 mass %, or at least 75 mass %, or at least 90 mass %, or at least 95 mass % water therefrom, thereby limiting the size of the equipment required to process the fluid stream.

The appropriate quantity of mass of the fluid stream 15 to cool the mass of the water vapor stream to condense water therefrom may be calculated by determining the enthalpy difference between the water vapor stream to be cooled by thermal contact with the fluid stream and water produced by cooling the water vapor stream ($\Delta H_w$ [kJ/kg]) and the enthalpy difference between the fluid stream provided for cooling the water vapor stream and the heated fluid stream produced by heating the fluid stream by thermal contact with the water vapor stream ($\Delta H_1$ [kJ/kg]), then calculating the relative ratio of $\Delta H_1$ to $\Delta H_w$, where the relative ratio of $\Delta H_1$ to $\Delta H_w$ may be utilized as the ratio of the mass of the fluid stream to be provided for thermal contact with the water vapor stream relative to the mass of the water vapor stream.

The fluid stream 15 may be provided for thermal contact with the water vapor stream 11 at a pressure, temperature, and mass flow rate selected to ensure that at least a majority, preferably at least 80 mass %, or at least 90 mass %, or substantially all, or 100 mass % of the fluid of the heated fluid stream 29 produced by such thermal contact is in gaseous or supercritical phase. If the fluid of the heated fluid stream is produced in a gaseous phase, the vapor quality of the fluid of the heated fluid stream is at least 0.9 or the fluid is superheated. For example, if the fluid of the fluid stream 15 is anhydrous ammonia and is provided for thermal contact with the water vapor stream at a temperature of from 0 to 25° C., the pressure under which the fluid stream is provided for thermal contact with the water vapor stream may be 1 MPa. If the fluid of the fluid stream 15 is carbon dioxide and is provided for thermal contact with the water vapor stream 11 at a temperature of from 0 to 25° C., the pressure under which the fluid stream is provided to the condenser may be 6 MPa. If the fluid of the fluid stream is nitrogen and is provided for thermal contact with the water vapor stream at a temperature of from 0 to 30° C., the pressure under which the fluid stream is provided for thermal contact with the water vapor stream may be 27.8 MPa.

Water 27 condensed from the water vapor stream 11 by thermal contact with the fluid stream 15 may be separated from thermal contact with the fluid stream 15. For example, water 27 may be separated from thermal contact with the fluid stream 15 by removing the water from the condenser 13. The water 27 has a significantly reduced enthalpy relative to the water vapor stream 11. The water 27 may have an enthalpy of at most 400 kJ/kg, or at most 300 kJ/kg, or at most 200 kJ/kg, or at most 100 kJ/kg. The water 27 may be subsequently transformed to high energy steam that may be used to produce electrical power and low energy steam that may be utilized as the water vapor stream 11, as described in further detail below.

A substantial portion of the thermal power contained in the water vapor stream 11 may be transferred to the fluid stream 15 by thermally contacting the fluid stream with the water vapor stream to produce the heated fluid stream 29. Thermal power from the latent heat of condensation of water from the water vapor stream 11 and from sensible heat derived by cooling the water vapor stream may be transferred from the water vapor stream to the fluid stream 15 to produce the heated fluid stream 29. The heated fluid stream 29 may be separated from thermal contact with the water vapor stream 11, for example by removing the heated fluid stream 29 from the condenser 13.

The heated fluid stream 29 is elevated in temperature relative to the fluid stream 15 provided for thermal contact with the water vapor stream 11. The heated fluid stream 29 may have a temperature of from 30° C. to 300° C., or from 50° C. to 250° C., or from 75° C. to 225° C. The temperature of the heated fluid stream 29 is dependent on the initial temperature of the water vapor stream 11 thermally contacted with the fluid stream 15, the initial temperature of the fluid stream 15, and on the mass flow rate of the fluid stream 15 relative to the mass flow rate of the water vapor stream 11 during the period of time the fluid stream and the water vapor stream are in thermal contact—where higher water vapor stream temperatures and/or higher fluid stream temperatures and/or slower fluid stream/water vapor stream relative mass flow rates result in higher heated fluid stream temperatures.

The pressure of the heated fluid stream 29 may be dependent on the pressure at which the fluid stream is provided for thermal contact with the water vapor stream, the flow rate of the fluid stream, and the temperature of the heated fluid stream. The pressure of the heated fluid stream may also be regulated prior to being expanded, for example by a heated fluid stream backpressure regulating valve 30. The pressure of the heated fluid stream 29 prior to expansion may range from 1 MPa up to 35 MPa, or from 2 MPa to 30 MPa, or from 3 MPa to 25 MPa, or from 5 MPa to 20 MPa.

The heated fluid stream 29 is expanded to generate mechanical power and to produce the expanded fluid stream 35. The heated fluid stream 29 may be expanded to generate rotational mechanical power by passing the heated fluid stream 29 through a first expander system 33, where the first expander system 33 is preferably comprises one or more turbines and at least one two-phase (dense fluid phase) expander operatively coupled to one or more electrical generators 37. Electrical power is generated from the mechanical power produced by expanding the heated fluid stream 29.

The amount of electrical power generated from the mechanical power produced by expanding the heated fluid stream 29 is dependent on the heat capacity of each component of the heated fluid stream, the mass flow rate of the heated fluid stream, the mass flow rate of each component of the heated fluid stream, on the temperature differential between the heated fluid stream and the expanded fluid stream 35, and on the efficiency of conversion of thermal power to electrical power. The amount of thermal power available for conversion to electrical power by expansion of the heated fluid stream 29 from each component of the heated fluid stream may be expressed according to the following formula:

$$\text{Generation} = \frac{[(\text{heat capacity of component}(kJ/kg)) * (\text{mass flow rate of component }(kg/h)) * (\Delta T)]}{(3600000 \text{ kJ/MW}_t.)}$$

Thermal Power Provided by Component For Electrical Power where ΔT is the difference between the temperature of the heated fluid stream 29 entering the first expander system and the temperature of the expanded fluid stream 35 exiting the first expander system. The total thermal power of the heated fluid stream 29 available for electrical power generation is the sum of the thermal power provided by each component of the heated fluid stream 29. The maximum electrical power that may be produced from expansion of the heated fluid stream 29 in the first expander system 33 is the total difference in thermal power of the heated fluid stream 29 minus the thermal power of the expanded fluid 35 available for electrical power generation multiplied by the efficiency of the first expander system 33 for converting thermal power to electrical power, where the efficiency of the first expander system 33 is typically on the order of from 30% to 90% (0.3 to 0.9). The electrical power produced by expansion of the heated fluid stream 29 across the first expander system 33 may range from 30% to 90% of the thermal power change across the first expander system 33.

The pressure of the expanded gas stream 35 may be selected and controlled to maintain the temperature of the expanded gas stream 35 at a selected temperature. In one embodiment of the process of the present invention, the pressure of the expanded gas stream 35 may be selected and controlled by selecting and controlling the mass flow rate of the fluid stream 15 that is provided for thermal contact with the water vapor stream 11, or by selecting and controlling the mass flow rate of the water vapor stream that is provided for thermal contact with the fluid stream, or by selecting and controlling the mass flow rates of both the fluid stream and the water vapor stream relative to each other. In an embodiment of the process of the present invention the mass flow rate of the fluid stream 15 for thermal contact with the water vapor stream may be controlled utilizing the fluid stream pump 28 and/or either the heated fluid stream backpressure regulating valve 30 or an expanded fluid stream gas pressure regulating valve 38 through which a gaseous portion of expanded fluid stream 35 may pass after being expanded and separated from a liquid portion of the expanded fluid stream, or by controlling both valves 30 and 38. The expanded fluid stream gas pressure regulating valve 38 may be a valve that is automatically controlled by feedback, for example, the mass flow rates of the water vapor stream and the fluid stream and the temperature and/or pressure of the heated fluid stream may be provided as feedback to control the gas pressure regulating valve 38.

The relationship between the expanded fluid stream pressure and the expanded fluid stream temperature is defined by the vapor-liquid equilibrium of the components of the expanded fluid The temperature of the expanded fluid stream 35 may be selected to be at most 10° C., and preferably is selected to be lower than 5° C. to increase the amount of electrical power generated by expansion of the heated fluid stream 29. In one embodiment of the process of the present invention the expanded fluid stream pressure is selected and controlled to maintain the temperature of the expanded fluid stream 35 as low as possible without freezing the components of the expanded fluid stream in order to maximize the quantity of fluid of the expanded fluid stream 35 that is in liquid phase and/or to minimize or eliminate the quantity of fluid in the expanded fluid stream that is in gaseous phase. In another embodiment of the present invention, the expanded fluid stream pressure is selected and controlled to maintain the temperature of the expanded fluid stream from above 0° C. up to 10° C. so the liquid phase of the expanded fluid stream may be thermally contacted with the water vapor stream 11 without being heated.

The temperature of the expanded fluid stream may be selected to optimize the amount of electrical power produced by expanding the heated fluid stream through the first expander system 33. More thermal power is available for conversion to electrical power as the temperature of the expanded fluid stream is decreased, however, the efficiency of the first expander system may decrease as the temperature of the expanded fluid stream is decreased. In particular, the first expander system 33 may include a vapor expander stage in combination with a two-phase expander stage, where the vapor expander stage receives the heated fluid stream and produces mechanical power and an expanded heated fluid stream having a vapor quality of at least 0.85, and the two-phase expander stage receives the expanded heated fluid stream from the vapor expander and produces mechanical power and the expanded fluid stream 35 having a vapor quality of at most 0.5. The vapor expander stage may be more efficient at converting thermal power to mechanical power than the two-phase expander stage, so the temperature of the expanded fluid stream may be selected to ensure that at least 50%, or at least 60%, or at least 70%, or at least 80%, or at least 85% of the mechanical power produced by expanding the heated fluid stream in the first expander system 33 is produced by the vapor expander stage of the first expander system. Generally, the expanded fluid stream 35 temperature may be maintained at a higher temperature and pressure than the temperature of the expanded fluid stream at vacuum or very low pressure to ensure that at least 70% of the mechanical power produced by expanding the heated fluid stream in the first expander system 33 is produced by the vapor expander stage. Optimization of the electrical power that may be produced, therefore, may require balancing the amount of mechanical power produced in the vapor expander stage relative to the two-phase expander stage with the amount of mechanical power produced by maintaining the expanded fluid stream 35 at the lowest possible temperature and lowest possible pressure.

The pressure of the expanded fluid stream 35 may be at most at 0.005 MPa, or at most at 0.01 MPa, or at most at 0.015 MPa, or at most 0.1 MPa, or at most 1 MPa, or at most 5 MPa, and the temperature of the expanded fluid stream may be maintained at a temperature of at most 10° C., or at most 5° C., or at most 0° C., or at most −10° C., or at most −15° C., or at most −20° C., or at most −25° C., and a temperature of at least −100° C., or at least −90° C., or at least −80° C., or at least −75° C., or from −100° C. to 30° C., or from −95° C. to 10° C. or from −90° C. to 0° C., or from −80° C. to −10° C., or from −75° C. to −25° C., or from above 0° C. to 30° C., or from 3° C. to 20° C. If $CO_2$ is utilized in the fluid stream 15 the temperature may be selected to be above the freezing point of $CO_2$, and the pressure of the expanded fluid stream may be maintained at a pressure of from 0.55 MPa to 5 MPa.

Any fluid of the expanded fluid stream 35 that is in gaseous phase may be compressed to convert the gaseous phase fluid to liquid phase, for example by passing the gaseous phase fluid stream 39 of the expanded fluid stream 35 through a compressor 45. Prior to compression, the gaseous phase fluid stream 39 of the expanded fluid stream 35 may be separated from fluid of the expanded fluid stream that is in liquid phase, for example by feeding the expanded fluid stream to an expanded fluid stream gas-liquid separator 43 and separating the gaseous phase fluid stream 39 from the liquid phase fluid stream 41 of the expanded fluid stream. The separated gaseous phase fluid stream 39 may be passed through the expanded fluid stream gas pressure regulating valve 38 to regulate the pressure and temperature of the expanded fluid stream exiting the first expander system 33 and then compressed in a compressor 45 to liquefy the fluid of the gaseous phase fluid stream and form a converted liquid phase fluid 47, which may be combined with the liquid phase fluid stream 41 of the expanded fluid stream 35 to form a liquid phase expanded fluid stream 49.

The temperature of the expanded fluid stream 35 may be selected so that substantially all, for example at least 95 mass %, or at least 97 mass %, or at least 99 mass %, or all of the fluid of the expanded fluid stream 35 is in the liquid phase. The quantity of the expanded fluid stream 35 in the gaseous phase, therefore, may be small and the compressor duty required to compress the gaseous phase fluid stream 39 to the converted liquid phase fluid stream 47 may also be small. In a preferred embodiment, all of the fluid of expanded fluid stream 35 is in liquid phase and no compressor is required to compress a gaseous phase fluid stream 39 of the expanded fluid stream 35 to a converted liquid phase fluid stream 47.

The liquid phase expanded fluid stream 49 comprised of the liquid phase fluid stream 41 of the expanded fluid stream 35 in combination with any converted liquid phase fluid stream 47 derived from compressing a gaseous phase fluid stream 39 of the expanded fluid stream has a temperature of at most 10° C., and preferably has a temperature of at most 5° C., or at most 0° C., or at most −10° C., or at most −20° C., or at most −25° C., and at least −100° C., or at least −90° C., or at least −80° C., or at least −75° C., or from −100° C. to 30° C., or from −95° C. to 10° C., or from −90° C. to 0° C., or from −80° C. to −10° C., or from −75° C. to −25° C.

The liquid phase expanded fluid stream 49 may be heated to form the fluid stream 15 which may then be provided for thermal contact with the water vapor stream 11 to condense water 27 therefrom and to produce the heated fluid stream 29. The liquid phase expanded fluid stream 49 may be heated to form the fluid stream 15 by thermal contact with a solvent 51 having a temperature of at least 20° C. greater, or at least 40° C. greater, or at least 60° C. greater, or at least 100° C. greater than the liquid phase expanded fluid stream. The liquid phase expanded fluid stream 49 and the solvent 51 may be provided to an expanded fluid stream heat exchanger 53, which may be a conventional heat exchanger configured to operate at temperatures between −100° C. and 200° C., to thermally contact the liquid phase expanded fluid stream and the solvent for heat exchange. The liquid phase expanded fluid stream 49 may be heated to a temperature greater than −25° C., or greater than −10° C., or greater than 0° C. and at least 30° C., or at least 50° C., or at least 75° C., or at least 90° C., or at least 100° C., or at least 120° C. cooler than the water vapor stream 11. The liquid phase expanded fluid stream 49 may be heated to a temperature of from 0° C. to 65° C., or a temperature of from 0° C. to 25° C., or a temperature of from 5° C. to 20° C. by thermal contact with the solvent.

Alternatively or conjunctively, the liquid phase expanded fluid stream 49 may be heated by directly mixing a slipstream of a portion of the heated fluid stream 29 separated from the heated fluid stream 29 prior to expanding the heated fluid stream 29. Alternatively or conjunctively, the liquid phase expanded fluid stream 49 may be heated by thermally contacting the liquid phase expanded fluid stream with a slipstream of a portion of the water vapor stream 11 separated from the water vapor stream 11 prior to contacting the water vapor stream with the fluid stream 15, for example in a heat exchanger (not shown).

The solvent 51 is preferably a solvent that may separate a portion, and preferably substantially all, or all, of $CO_2$, $SO_2$, $SO_x$, and $NO_x$ from a gas stream. The solvent 51 may be effective to separate at least 25 vol. %, or at least 50 vol. %, or at least 75 vol. %, or at least 90 vol. % of $CO_2$ from a gas stream containing $CO_2$. Alternatively or conjunctively, the solvent 51 may be effective to separate at least 25 vol. %, or at least 50 vol. %, or at least 75 vol. %, or at least 90 vol. % of $SO_2$ from a gas stream containing $SO_2$ The solvent 51 may be a physical solvent capable of absorbing $CO_2$ and/or $SO_2$ from a gas stream without forming a new chemical compound or adduct that subsequently releases $CO_2$ and/or $SO_2$ upon heating. A preferred physical solvent for use as the solvent 51 is methanol or a methanol/water mixture comprising at least 20 wt. % methanol. The solvent 51 may also be a chemical solvent that reversibly reacts with $CO_2$ and/or $SO_2$ to form a different compound or adduct. Preferably a chemical solvent that reversibly reacts with $CO_2$ or $SO_2$ may be regenerated and the reaction with $CO_2$ and/or $SO_2$ reversed to release $CO_2$ and/or $SO_2$ upon heating. A preferred chemical solvent for use as the solvent 51 is an amine such as methyldiethanolamine or diisopropylamine.

Most preferably, the solvent 51 is methanol or a mixture of methanol and water where methanol comprises at least 20 wt. % of the scrubbing solvent. The gas solubility of $CO_2$ in a physical solvent such as methanol or methanol/water increases as the temperature of the solvent is decreased. The solvent 51, therefore, is preferably cooled to near the freezing point of the solvent by exchanging heat with the liquid phase expanded fluid stream 49, producing a cooled solvent 55. Table 1 lists the freezing point of methanol and solutions of methanol and water at varying concentrations, where the appropriate concentration of methanol and water may be selected for use as the solvent 51 dependent on the selected temperature of the expanded fluid stream 35. For example, the concentration of methanol/water may be selected to have a freezing point at approximately the same temperature as the selected temperature of the expanded fluid stream 35, or may have a freezing point within 5° C. above or below the selected temperature of the expanded fluid stream, or may have a freezing point within 10° C. above or below the selected temperature of the expanded fluid stream.

TABLE 1

| Methanol/Water % wt. | Freezing Point, ° F. | Freezing Point, ° C. |
|---|---|---|
| 20/80 | 0 | −18 |
| 30/70 | −15 | −26 |
| 40/60 | −40 | −40 |
| 50/50 | −65 | −54 |
| 60/40 | −95 | −71 |
| 70/30 | −215 | −137 |
| 80/20 | −220 | −143 |
| 90/10 | −230 | −146 |
| 100/0 | −145 | −98 |

The cooled solvent 55 may be utilized to separate $CO_2$ and/or $SO_2$ from a gas stream containing $CO_2$ and/or $SO_2$ 57 by physically contacting the gas stream containing $CO_2$ and/or $SO_2$ with the cooled solvent. The gas stream 57 containing $CO_2$ and/or $SO_2$ may be physically contacted with the cooled solvent in a wet scrubber 58, for example a venturi scrubber, to separate at least a portion of the $CO_2$ and/or $SO_2$ from the gas stream and to absorb $CO_2$ and/or $SO_2$ into the cooled solvent 55 to produce a $CO_2$-depleted and/or $SO_2$-depleted gas stream 59 and a $CO_2$-rich and/or $SO_2$-rich solvent 61.

In the case of a $CO_2$-rich solvent 61, the $CO_2$-rich solvent 61 may then be treated to separate $CO_2$ from the $CO_2$-rich solvent and regenerate the solvent 51. $CO_2$ may be separated from the $CO_2$-rich solvent by heating the $CO_2$-rich solvent to release the $CO_2$ absorbed in the solvent, if the solvent is a physical solvent, or by reversing the reaction binding the $CO_2$ in the solvent, if the solvent is a chemical solvent. The $CO_2$-rich solvent 61 may be treated to separate $CO_2$ therefrom by feeding the $CO_2$-rich solvent to a solvent gas-liquid separator 63, heating the $CO_2$-rich solvent in the solvent gas-liquid separator to separate $CO_2$ from the $CO_2$-rich solvent and regenerate the solvent 51. The solvent gas-liquid separator 63 may be a heat exchanger in which the $CO_2$-rich solvent is heated to induce the release of $CO_2$. The temperature of the $CO_2$-rich solvent 61 may be increased by at least 20° C., or at least 40° C., or at least 60° C., or at least 100° C. to induce separation of $CO_2$ and regenerate the solvent 51, where the regenerated solvent may have a temperature of from −50° C. to 65° C., or from −25° C. to 50° C., or from 0° C. to 25° C.

A solvent heating medium 62 may be provided to heat the $CO_2$-rich solvent to release the $CO_2$ therefrom. A slipstream of the $CO_2$ containing gas stream 57, which is preferably a flue gas stream having a temperature of from 5° C. to 400° C. as described in further detail below, may be provided to the solvent gas-liquid separator 63 as the heating medium 62 to provide heat to warm the $CO_2$-rich solvent 61. Alternatively or conjunctively, a slipstream of the water vapor stream 11, may be provided to the solvent gas-liquid separator 63 as the heating medium 62 to provide heat to warm the $CO_2$-rich solvent. Alternatively or conjunctively, a slipstream of the heated fluid stream 29 may be provided to the solvent gas-liquid separator 63 as the heating medium 62 to warm the $CO_2$-rich solvent. Alternatively or conjunctively, air or warm water may be provided to the solvent gas-liquid separator 63 as the heating medium 62 to warm the $CO_2$ rich solvent. Alternatively or conjunctively, the $CO_2$ rich solvent 61 may be heated in a fired heater, for example the second gas-liquid separator 63 may be a gas burning heater.

In the case of an $SO_2$-rich solvent, $SO_2$ may be separated from the $SO_2$-rich solvent in a manner similar to that described above for separating $CO_2$ from a $CO_2$-rich solvent.

The regenerated solvent 51 may be provided again to the expanded fluid stream heat exchanger 53 for cooling, preferably to a temperature of from −100° C. to −25° C., and to heat the liquid phase expanded fluid stream 49, preferably to a temperature of from 0° C. to 65° C. The $CO_2$ and/or $SO_2$ gas stream 60 separated from the $CO_2$-rich solvent 61 or $SO_2$-rich solvent 61, respectively, in the solvent gas-liquid separator 63 may be captured and stored.

Figure 3:
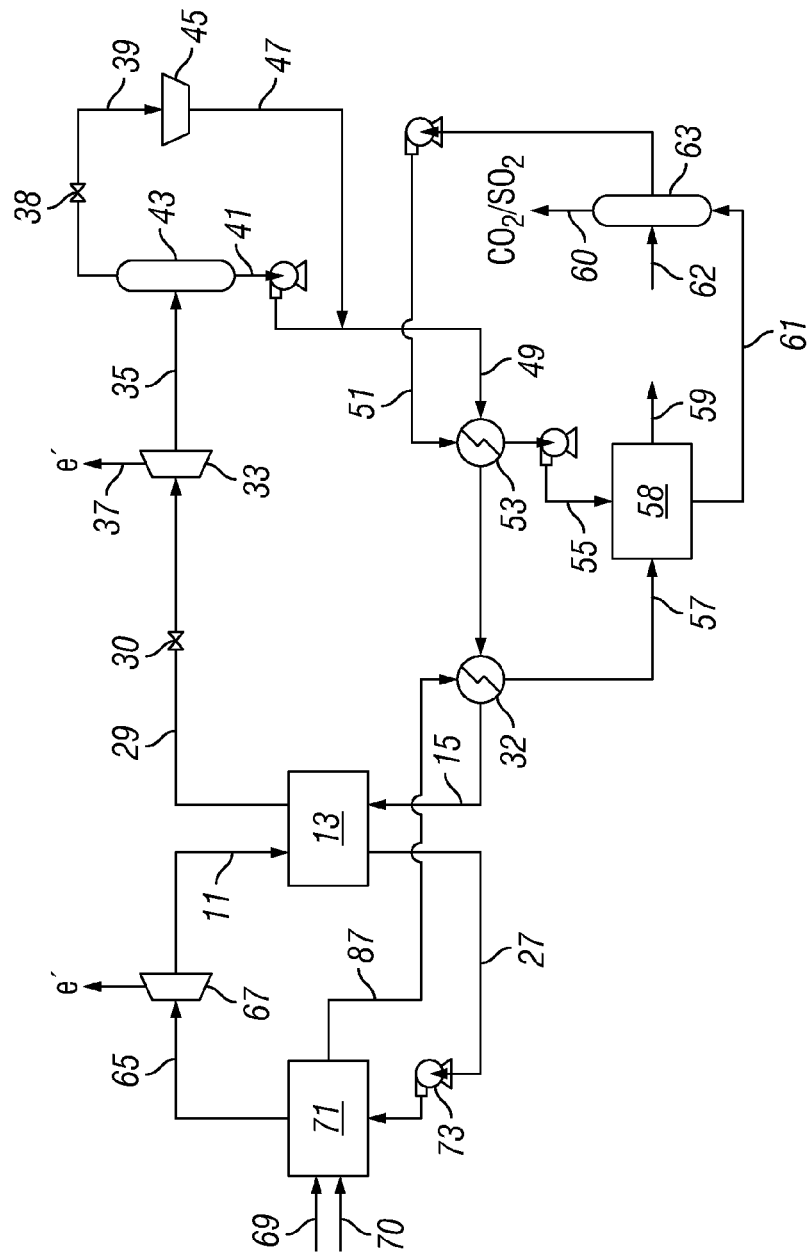
FIG. 3 provides a schematic diagram of the process of the present invention including a top cycle and a bottom cycle.

Referring now to FIG. 3, in a preferred embodiment, the water vapor stream 11 is produced as low energy steam from a thermal electric power processing system such as a coal-fired power plant, an oil-fired power plant, a natural gas-fired power plant, a nuclear power plant, a geothermal power plant, a waste incineration power plant, or a solar thermal electric plant. High energy steam 65 having a temperature of at least 400° C., or at least 500° C., or at least 600° C. and a pressure of at least 3 MPa, or at least 5 MPa, or at least 10 MPa, or at least 15 MPa, or at least 20 MPa, or at least 25 MPa, or at least 30 MPa may be produced by heating water 27 with thermal power produced by or from combusting a fossil fuel, nuclear fission, a geothermal source, combusting waste, or collecting solar energy. The high energy steam 65 may be expanded, for example through a second expander system 67, to generate mechanical power that may be utilized to produce electrical power, for example via an electrical generator, where the water vapor stream 11 is produced as the product of expanding the high energy water vapor stream.

The high energy steam 65 may be expanded to provide the water vapor stream 11 at a temperature and pressure selected to optimally effect the condensation of water from the water vapor stream and to optimally effect heating the fluid stream 15 upon thermal contact of the water vapor stream 11 and the fluid stream 15. The expansion of the high energy steam 65 may be controlled by selecting the physical parameters of the second expander system 67, for example as discussed below with respect to the system of the present invention, to produce a selected temperature and pressure of the resulting water vapor stream. The water vapor stream 11 produced upon expansion of the high energy steam may have a temperature of at least 60° C. and a pressure of at least 0.02 MPa, or may have a temperature of at least 100° C. and a pressure of at least 0.075 MPa, or may have a temperature of at least 190° C. and a pressure of at least 0.19 MPa, or may have a temperature of at least 280° C. and a pressure of at least 0.44 MPa, or may have a temperature of at least 375° C. and a pressure of at least 0.92 MPa.

In a particularly preferred embodiment, the high energy steam 65 is generated by combusting a fossil fuel such as coal, oil, or natural gas 69 and an oxidant stream 70 such as air or oxygen and thermally contacting the resulting combusted gas stream with water 27 in a steam generator 71 to exchange heat between the combusted gas stream and the water 27 and generate the high energy steam. In a particularly preferred embodiment, the fossil fuel that is combusted is natural gas which is combusted in a gas turbine, and the high energy steam 65 is produced in a combined cycle system.

Water 27 produced by cooling and condensing the water vapor stream 11 in the condenser 13 is preferably utilized as the water provided to produce the high energy steam 65. The water 27 may be provided for thermal contact with combusted gas stream by pumping the water from the condenser 13 to the steam generator 71 via a high pressure boiler water feed pump 73. The water 27 may be provided to the steam generator at a temperature of from 100° C. to 200° C. and at a pressure of from 0.075 MPa to 2 MPa prior to being thermally contacted with the combusted gas stream. Preferably, the water 27 produced by cooling and condensing the water vapor stream 11 has a temperature of at least 100° C. and a pressure of at least 0.075 MPa so that no heating is required to provide the water to the steam generator at a temperature of from 100° C. to 200° C.

At least a portion of the combusted gas stream produced by combusting a fossil fuel and an oxidant stream is comprised of $CO_2$. The thermal contact and heat exchange between the combusted gas stream and water 27 cools the combusted gas stream to produce a flue gas stream 87 comprising $CO_2$ that may have a temperature of from greater than 100° C. up to 400° C.

Thermal power may be captured from the flue gas stream 87 for conversion into electrical power. The fluid stream 15 may be thermally contacted with the flue gas stream 87 in a flue gas heat exchanger 32 to heat the fluid stream 15 and to cool the flue gas stream, transferring thermal power from the flue gas stream to the fluid stream 15 and producing a cooled flue gas stream 57. The flue gas stream 87 exiting the steam generator may contain water vapor, for example water vapor produced by combustion, and thermal power transferred from the flue gas stream to the fluid stream may include thermal power captured from the latent heat of condensation of the water in the flue gas stream.

The fluid stream 15 may be thermally contacted with the flue gas stream 87 and the water vapor stream 11 sequentially or in parallel. The fluid stream 15 may be contacted sequentially with the flue gas stream 87 and the water vapor stream 11 by first contacting the fluid stream with the flue gas stream in a flue gas heat exchanger 32 and then, after contacting the fluid stream with the flue gas stream, thermally contacting the fluid stream with the water vapor stream 11 in the condenser 13 to produce the heated fluid stream 29 that is expanded in the first expander system 33. Alternatively, the fluid stream 15 may be thermally contacted with the flue gas stream 87 and the water vapor stream 11 in parallel (not shown), where a portion of the fluid stream is thermally contacted with the flue gas stream 87 in the flue gas heat exchanger 32 and a portion of the fluid stream is thermally contacted with the water vapor stream 11 in condenser 13, and the resulting portions of the heated fluid stream are combined and then expanded in the first expander system 33.

$CO_2$ may be removed from the cooled flue gas stream 57 and the flue gas stream may be further cooled by directly contacting the cooled flue gas stream 57 with the cooled solvent 55 in the scrubber 58. At least 25%, or at least 50%, or at least 75%, or at least 90% of the $CO_2$ in the cooled flue gas stream 57 may be removed from the cooled flue gas stream 57 and the flue gas stream may be cooled to a temperature of at most 100° C., or at most 75° C., or at most 50° C., and preferably to ambient temperatures by contact with the cooled solvent 55. The cleaned flue gas stream 59 may be vented to the atmosphere, and the $CO_2$-rich solvent 61 may be provided to the separator 63 to separate $CO_2$ from the $CO_2$-rich scrubbing solvent and regenerate the solvent 51 as described above.

The process of the present invention is effective to efficiently capture the heating value of a fuel as electrical power, and, where the process produces thermal power by combustion of a fossil fuel, with significantly reduced $CO_2$ production. The heating value of the fuel is efficiently captured as electrical power, in part, by capturing the latent heat of condensation of water from the water vapor stream as mechanical power and converting the mechanical power to electrical power. $CO_2$ emissions from the process may be significantly reduced relative to conventional processes utilizing combustion of a fossil fuel by 1) more efficiently capturing the heating value of the fuel as electrical power—combustion of less fuel is required to produce an equivalent amount of electrical power, generating less $CO_2$; and 2) capturing $CO_2$ produced in the flue gas stream and producing an emissions stream that contains little or no $CO_2$.

Figure 4:
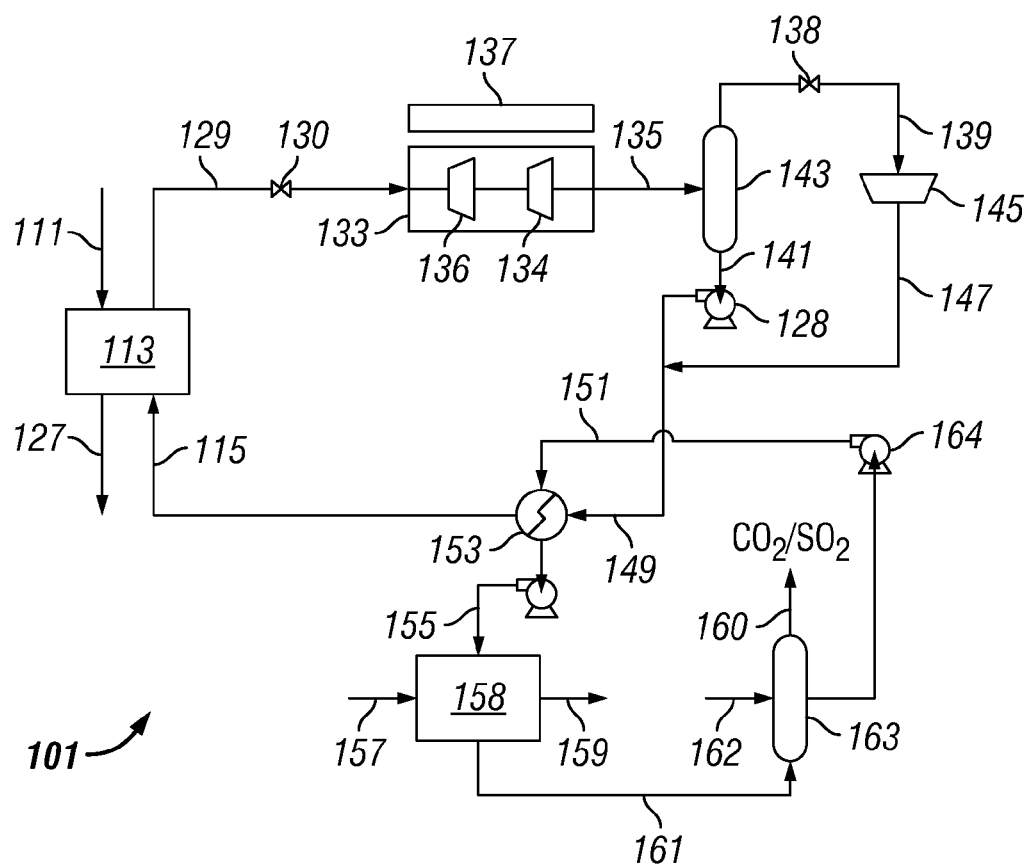
FIG. 4 provides a schematic diagram of a system that may be used to practice the process of the present invention.

In another aspect, the present invention is directed to a system for producing electrical power. Referring now to FIG. 4, the system 101 of the present invention includes a condenser 113 and a first expander system 133. The system also includes a water vapor stream 111 comprising at least 50 mass % water in gaseous and liquid phase and having a vapor quality of at least 0.85. The water vapor stream 111 has the characteristics and composition described above with respect to the water stream 11 utilized in the process of the present invention. The system further comprises a fluid stream 115 comprised of a fluid comprised of one or more constituents selected from the group consisting of molecular nitrogen, argon, a chemical compound having a boiling point of at most 65° C. at 0.101 MPa and a latent heat of vaporization of at least 350 kJ/kg, and a chemical compound having a boiling point of at most 65° C. at 0.101 MPa and a specific heat capacity as a liquid of at least 1.9 kJ/kg-° K, where the one or more constituents comprise at least 50% of the fluid, and where the fluid is in liquid phase or in supercritical phase. The fluid stream 115 has the characteristics and composition described above with respect to the fluid stream 15 utilized in the process of the present invention. The condenser 113 is structured and arranged to enable thermal contact of the water vapor stream 111 and the fluid stream 115, where thermal contact of the water vapor stream and the fluid stream condenses liquid water 127 from the water vapor stream and produces a heated fluid stream 129 comprised of the fluid in gaseous phase or supercritical phase, where fluid of the heated fluid stream in the gaseous phase has having a vapor quality of at least 0.9, or at least 0.95, or 1.0, or is superheated. The heated fluid stream 129 and the liquid water 127 have the characteristics described above with respect to the heated fluid stream 29 and water 27 in the process of the present invention. The condenser 113 of the system of the present invention may be a shell and tube heat exchanger having a configuration as shown in FIG. 2 and as described above with respect to the condenser 13 utilized in the process of the present invention.

A fluid stream pump 128 may be included in the system 101 to pump the fluid stream 115 into the condenser 113. The fluid stream pump 128 may provide the fluid stream 115 to the condenser 113 at a selected mass flow rate and/or at a selected pressure, where the mass flow rate and/or the pressure of the fluid stream provided to the condenser 113 may be selected as described above with respect to the process of the invention. The fluid stream pump 128 may be a pump effective for pumping a liquid or a pump effective for pumping a supercritical fluid.

The first expander system 133 of the system 101 is operatively coupled to the condenser 113 to receive the heated fluid stream 129 from the condenser. The system 101 may include a heated fluid stream backpressure regulating valve 130 operatively coupled to the condenser 113 and the first expander system 113 through which the heated fluid stream 129 may pass as the heated fluid stream flows from the condenser to the first expander system. The heated fluid stream pressure regulating valve 130 may be utilized together with the fluid stream pump 128 and/or with an expanded fluid stream regulating valve 138 to regulate the pressure of the heated fluid stream 129 in the condenser and entering the first expander system 133.

The first expander system 133 is structured and arranged to expand the heated fluid stream 129 to produce mechanical power and an expanded fluid stream 135 that has a temperature of at most 10° C., as described above with respect to the process of the present invention. The first expander system 133 is comprised of a two-phase expander stage 134, and may include a vapor expander stage 136.

The two-phase expander stage 134 of the first expander system 133 is comprised of at least one two-phase expander structured and arranged to receive the heated fluid stream 129 from the condenser 113 or an expanded heated fluid stream from the vapor expander stage 136 and expand the heated fluid stream or expanded heated fluid stream to produce mechanical power and an expanded fluid stream having a vapor quality of at most 0.5 or that is supercooled. The two-phase expander stage 134 of the first expander system 133 may be comprised two or more two-phase expanders arranged sequentially for sequential flow of the heated fluid stream or an expanded heated fluid stream therethrough or arranged in parallel for parallel flow of portions of the heated fluid stream or portions of an expanded heated fluid stream therethrough. Each two-phase expander is preferably structured to generate mechanical power as rotational mechanical power, for example, a two-phase expander may comprise rotatable blade elements that may be rotated by expanding the heated fluid stream or expanded heated fluid stream therethrough and a shaft that may be rotated by rotating the rotatable blade elements. The two-phase expander may be a screw expander, preferably having an "N" screw rotor profile, or a STAR ROTOR™ compressor operated as an expander. Each two phase expander is also structured and arranged to expand the heated fluid stream or expanded heated fluid stream as it passes through the two-phase expander and to effect condensation of the fluid from the heated fluid stream or expanded heated fluid stream as it is expanded thereby. As noted above, the fluid, when in liquid phase, has a surface tension significantly lower than the surface tension of water at an equivalent temperature so the condensing fluid has little physical effect on the structural elements of the two-phase expander. The two-phase expander stage produces the expanded fluid stream 135 containing at least 50 mass %, preferably at least 90 mass %, of the fluid in liquid phase.

The vapor expander stage 136 of the first expander system 133, if any, may be comprised of one or more vapor expanders. If the first expander system 133 includes a vapor expander stage 136, the vapor expander stage may be operatively coupled to the condenser 113 and to the two-phase expander stage 134 to receive the heated fluid stream 129 from the condenser 113 and to provide an expanded heated fluid stream to the two-phase expander stage 134. Each vapor expander is structured and arranged to expand the heated fluid stream to produce mechanical power and an expanded heated fluid stream having a vapor quality of at least 0.85 or comprising the fluid in supercritical phase. Each vapor expander is preferably structured to generate mechanical power as rotational mechanical power, for example, a vapor expander may comprise rotatable blade elements that may be rotated by expanding the heated fluid stream or expanded heated fluid stream therethrough and a shaft that may be rotated by rotating the rotatable blade elements. Each vapor expander may be a conventional turbine.

If the first expander system 133 includes two or more vapor expanders in the vapor expander stage 136, the vapor expanders may be arranged sequentially for sequential flow of the heated fluid stream 129 therethrough or arranged in parallel for parallel flow of portions of the heated fluid stream therethrough. If the vapor expanders are arranged in parallel, each vapor expander may be operatively coupled to a corresponding two-phase expander or two or more vapor expanders may be operatively coupled to a single two-phase expander, or each vapor expander may be operatively coupled to a single two-phase expander.

The first expander system 133 may be operatively coupled to the condenser 113 to provide the liquid phase fluid of the expanded fluid stream 135 from the first expander system to the condenser, thereby circulating the fluid between the condenser and the first expander system. The first expander system 133 may be operatively coupled to the condenser 113 through several elements, where the expanded fluid stream 135 may be further processed as it flows between the first expander system and the condenser, as described in further detail below.

The system 101 comprises at least one first electrical power generating element 137 operatively coupled to the first expander system 133 that is structured and arranged to generate electrical power from the mechanical power produced by the first expander system. A first electrical power generating element 137 may be an electrical power generator inductively coupled to the first expander system 133 to generate electrical power from rotational mechanical power produced by the first expander system. A first electrical power generating element 137 may be an alternator, and preferably is an turbo-alternator. A first electrical power generating element 137 may be a dynamo or a magneto. A first electrical power generating element 137 may also be a magneto-hydrodynamic electrical power generator.

The system 101 of the present invention may include an expanded fluid stream gas-liquid separator 143 to separate gas and liquid phases of the expanded fluid stream 135. The expanded fluid stream gas-liquid separator 143 may be operatively coupled to the first expander system 133 to receive the expanded fluid stream 135 therefrom. The expanded fluid stream gas-liquid separator 143 is configured to separate a gas phase fluid of the expanded fluid stream 135 from a liquid phase fluid of the expanded fluid stream to produce a gaseous phase fluid stream 139 and a liquid phase fluid stream 141. The expanded fluid stream gas-liquid separator 143 may be a conventional high pressure gas-liquid separator or may be a conventional low pressure gas-liquid separator. The expanded fluid stream gas-liquid separator 143 may be configured to separate the gaseous phase fluid stream 139 of the expanded fluid stream from the liquid phase fluid stream 141 of the expanded fluid stream by gravity.

The fluid stream pump 128 may be operatively coupled to the expanded fluid stream gas-liquid separator 143 to receive the liquid phase fluid stream 141 therefrom. As noted above, the fluid stream pump 128 is operatively coupled to the condenser 113 to deliver the fluid stream 15 to the condenser at a selected pressure. One or more system elements may be operatively coupled to the fluid stream pump 128 between the fluid stream pump 128 and the condenser 113 through which the liquid phase fluid stream 141, a liquid phase expanded fluid stream 149, described below, or the fluid stream 115 may pass prior to being provided to the condenser 113.

The system 101 may include an expanded fluid stream gas phase compressor 145 operatively coupled to the expanded fluid stream gas-liquid separator 143 to receive the gaseous phase fluid stream 139. The expanded fluid stream gas phase compressor 145 may compress the gaseous phase fluid stream 145 to produce a converted liquid phase fluid stream 147, where at least 95 mass %, and preferably at least 99 mass %, and most preferably all of the gaseous fluid of the gaseous phase fluid stream 139 is converted to a liquid phase fluid. The expanded fluid stream gas phase compressor 145 may be powered by mechanical power generated by the first expander system 133 or by mechanical power generated by a second expander system, as described below, or by electrical power generated from the first expander system or a second expander system, described below. The system 101 is preferably configured to combine the converted liquid phase fluid stream 147 produced by the expanded fluid stream gas phase compressor 145 with the liquid phase fluid stream 141 exiting the fluid stream pump 128 to form a liquid phase expanded fluid stream 149 that may be provided to the condenser 113 as fluid stream 115 either directly or after being conditioned in other elements of the system 101 as described below.

The system 101 may comprise an expanded fluid stream pressure regulating valve 138 operatively coupled to the expanded fluid stream gas-liquid separator 143 and operatively coupled to the expanded fluid stream gas phase compresser 145 to provide the gasesous expanded fluid stream 139 from the expanded fluid stream gas-liquid separator to the expanded fluid stream gas phase compresser. The expanded fluid stream pressure regulating valve 138 may be controlled to assist in maintaining the temperature, pressure, and/or vapor quality of the expanded fluid stream 135 at a selected temperature, a selected pressure, and/or a selected vapor quality as described above with respect to the process of the present invention. In an embodiment of the system 101 of the present invention, the expanded fluid stream pressure regulating valve 138 may be automatically controlled, for example by a computer, to assist in maintaining the expanded fluid stream 135 at a selected temperature, pressure, or vapor quality in response to feedback regarding the mass flow rates of the water vapor stream 111 and the fluid stream 115, and the temperature and/or pressure of the heated fluid stream 129, and the temperature and/or pressure of the expanded fluid stream 135.

The system 101 may include a first heat exchanger 153 operatively coupled to the first expander system 133 to receive the liquid phase expanded fluid stream 149 therefrom, and operatively coupled to the fluid stream pump 128 to receive the liquid phase expanded fluid stream 149 therefrom. The system 101 preferably includes a first heat exchanger 153 if the temperature of the liquid phase expanded fluid stream 149 is below 0° C., where the first heat exchanger may be utilized to raise the temperature of the liquid phase expanded fluid stream to a temperature of 0° C. or greater, for example, to a temperature of from 0° C. to 65° C., or, more preferably, from 5° C. to 20° C. so that the liquid phase expanded fluid stream may be provided to the condenser 113 for thermal contact with the water vapor stream 111 as fluid stream 115. The first heat exchanger 153 is structured and arranged to thermally contact the liquid phase expanded fluid stream 149 with a heating medium 151 to heat the liquid phase expanded fluid stream. The heating medium 151 may have a temperature at least 20° C., or at least 40° C., or at least 60° C., or at least 100° C. greater than the liquid phase expanded fluid stream 149.

In an embodiment of the system 101 of the present invention, the heating medium 151 is a solvent that is effective to absorb or react with $CO_2$, $SO_2$, $SO_x$, $NO_x$, and/or particulates and that may separate a portion, and preferably substantially all, or all, of $CO_2$, $SO_2$, $SO_x$, $NO_x$, and particulates from a gas stream 157. As described above with respect to the process of the present invention, the solvent 151 may be a physical solvent such as methanol or a methanol/water mixture comprising at least 20 wt. % methanol or a chemical solvent, for example, an amine such as methyldiethanolamine or diisopropylamine. The solvent 151 may be cooled by contacting the liquid phase expanded fluid stream 149 in the heat exchanger 153 to produce a cooled solvent 155 that is more effective for absorbing or reacting with $CO_2$ or $SO_2$ than the solvent 151.

The system 101 may include a scrubber 158 in which the cooled solvent 155 may be physically contacted with a gas stream 157 containing $CO_2$ and/or $SO_2$ to remove a portion of the $CO_2$ and/or $SO_2$, and preferably substantially all, or all, or the $CO_2$ and/or $SO_2$ from the gas stream, as described above with respect to the process of the present invention. The gas stream 157 may be a flue gas stream or a cooled flue gas stream produced as described below in the generation of high energy steam from which the water vapor stream 111 may be produced.

The scrubber 158 may be operatively coupled to the heat exchanger 153 to receive the cooled solvent 155 from the heat exchanger, and may be operatively coupled to a gas stream 157 source to receive the gas stream containing $CO_2$ and/or $SO_2$ from the gas stream source. The scrubber 158 is structured and arranged to physically contact the cooled solvent 155 and the gas stream 157 to intimately mix the cooled solvent and the gas stream. The scrubber 158 is preferably a wet scrubber such as a packed tower scrubber, a plate tower scrubber, or a venturi scrubber. A gas stream 159 depleted in $CO_2$ and/or $SO_2$ relative to the gas stream 157 and a $CO_2$-rich and/or a $SO_2$-rich solvent 161 is produced by physically contacting the gas stream with the cooled solvent 155. The $CO_2$ and/or $SO_2$ depleted gas stream 159 may be vented to the atmosphere.

The system 101 may include a solvent gas-liquid separator 163 operatively coupled to the scrubber 158 to receive the $CO_2$-rich and/or $SO_2$-rich solvent 161 from the scrubber. The solvent gas-liquid separator 163 may be structured and arranged to accept a heating medium 162 such as a slipstream of the water vapor stream 111 or a slipstream of a flue gas stream, or a stream of ambient temperature air, or a stream of water having a temperature of at least 30° C. and to thermally contact the heating medium 162 with the $CO_2$-rich and/or $SO_2$-rich solvent 161 to heat the solvent 161 and release a $CO_2$ and/or $SO_2$ gas stream 160 therefrom, producing a regenerated solvent 151. Alternatively, the solvent gas-liquid separator 163 may be configured to combust a fuel stream, for example a natural gas stream, to generate heat, and may be structured and arranged to contact the $CO_2$-rich and/or $SO_2$-rich solvent 161 with the heat from combustion to release a $CO_2$ and/or an $SO_2$ gas stream 160 therefrom, producing a regenerated solvent. The $CO_2$ and/or $SO_2$ gas stream 160 may be separated from solvent gas-liquid separator and captured. The solvent gas-liquid separator 163 may be operatively coupled to the heat exchanger 153 to provide the regenerated solvent 151 for thermal contact with the liquid phase expanded gas stream 149. Solvent pump 164 may be operatively coupled to the solvent gas-liquid separator 163 to receive the regenerated solvent therefrom and may be operatively coupled to the heat exchanger 153 to deliver the regenerated solvent thereto, where the solvent pump is structured and arranged to pump the regenerated solvent.

Figure 5:
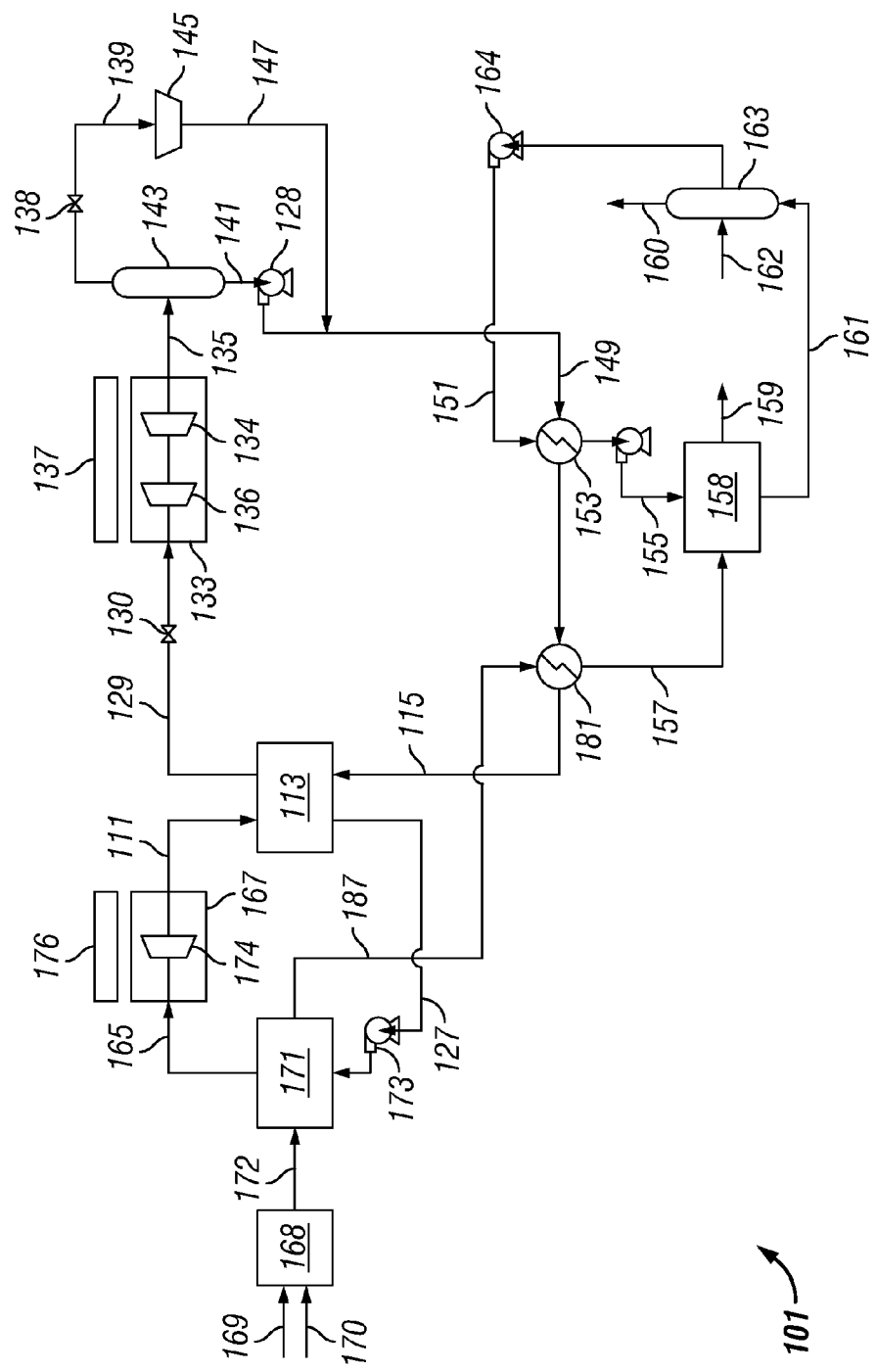
FIG. 5 provides a schematic diagram of a system of the present invention including a top cycle and a bottom cycle including a flue gas stream cooler in parallel with a condenser.

Referring now to FIG. 5, the system 101 may include a heat recovery steam generator 171 operatively coupled to a heat source 168 to receive heat from the heat source and operatively coupled to the condenser 113 to receive water 127 from the condenser. The heat recovery steam generator 171 is structured and arranged to thermally contact heat from the heat source 168 with the water 127 to produce high energy steam 165, where the high energy steam may have the temperature and pressure characteristics discussed above with respect to the process of the present invention. The heat recovery steam generator 171 and the heat source may be combined into a single unit, for example a steam boiler unit in which a fuel may be combusted to produce a combusted gas stream having thermal power, and the combusted gas stream may be thermally contacted with the water in the boiler to generate the high energy steam.

The heat source 168 may be a system or apparatus effective to generate a thermal power source that may be contacted with the water 127 to generate the high energy steam 165. In one embodiment of the system 101 of the present invention, the heat source is a natural gas fired gas turbine that produces a combusted gas stream containing thermal power for thermal contact with the water in the heat recovery steam generator. The heat source may also be a coal-fired or an oil-fired combustor that produces a combusted gas stream containing thermal power for contact with the water in the heat recovery steam generator. The heat source may also be a nuclear reactor that produces thermal power for contact with the water by nuclear fission. In another embodiment, the heat source may be geothermal.

The heat source may be a combustor 168 in which a fuel 169 and an oxidant 170 are combusted to generate a combusted gas stream 172 containing thermal power. The fuel 169 is combustible and may be coal, natural gas, oil, or an oil-derived hydrocarbon containing material. The oxidant 170 contains oxygen and may be air, oxygen-enriched air, or oxygen. The combusted gas stream 172 is fed to the heat recovery steam generator 171 to thermally contact the water 127, generating high energy steam 165 and a flue gas stream 187, where the flue gas stream 187 is formed by cooling the combusted gas stream by thermal contact with the water. The high energy steam and the flue gas stream may have temperature and/or pressure properties as set forth above with respect to the process of the present invention.

The heat recovery steam generator 171 may be operatively coupled to the scrubber 158 so the flue gas stream 187 produced by thermally contacting the combusted gas stream 172 with the water 127 may be provided from the heat recovery steam generator to the scrubber. As noted above with respect to the process of the present invention, the flue gas stream may have a temperature of from 100° C. to 400° C. and contains $CO_2$ and/or $SO_2$. Further, as discussed above with respect to the scrubber 158 of the system, the scrubber is structured and arranged to contact the flue gas stream as the gas stream containing $CO_2$ and/or $SO_2$ 157 with a cooled solvent 155 to strip $CO_2$ and/or $SO_2$ from the flue gas stream. The flue gas stream is also cooled by exchanging heat with the cooled solvent in the scrubber, and the cooled $CO_2$-depleted and/or $SO_2$-depleted flue gas stream 159 may be vented to the atmosphere.

Figure 6:
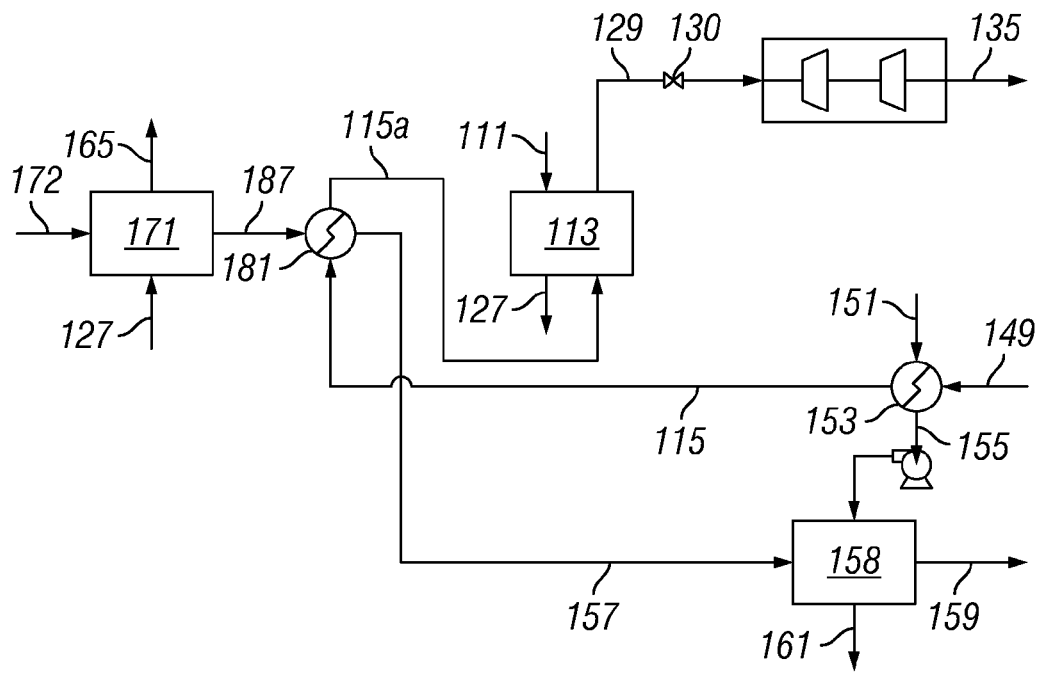
FIG. 6 provides a schematic diagram of a portion of the system of FIG. 5 showing the series configuration of the flue gas stream cooler with the condenser.
Figure 7:
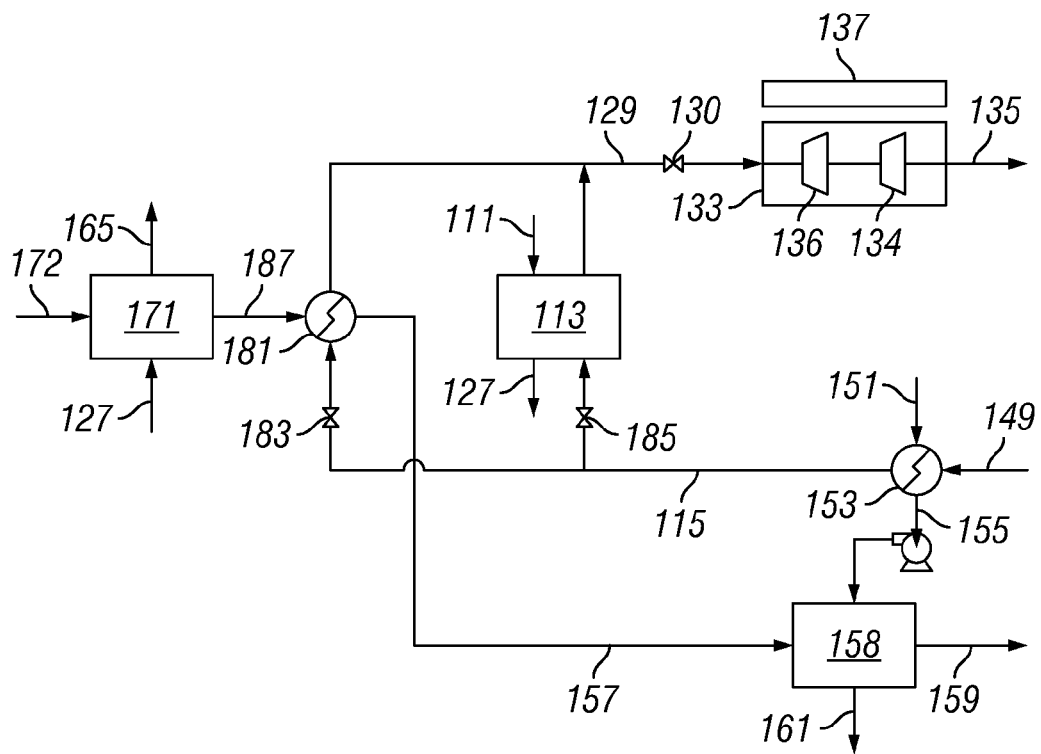
FIG. 7 provides a schematic diagram of a portion of a system of the present invention including a flue gas stream cooler in parallel with a condenser.

Referring now to FIGS. 5, 6, and 7, the system 101 may include a flue gas stream cooler 181 operatively coupled to the heat recovery steam generator 171 to receive the flue gas stream 187 from the heat recovery steam generator. The flue gas stream cooler 181 may also be operatively coupled to the first heat exchanger 153 to receive at least a portion of the fluid stream 115 from the first heat exchanger. The flue gas stream cooler 181 may be structurally arranged to thermally contact the flue gas stream 187 and the fluid stream 115 to cool the flue gas stream 187 and to heat the fluid stream 115. The flue gas stream cooler 181 may also be operatively coupled to the scrubber 158 to provide the cooled flue gas stream 157 to the scrubber 158 to remove at least a portion of $CO_2$ and/or $SO_2$ from the cooled flue gas stream.

In one embodiment, as shown in FIG. 7, the flue gas stream cooler 181 may be operatively coupled to the first heat exchanger 153 and to the first expander system 133 and operates in parallel with the condenser 113 to heat a portion of the fluid stream 115 to provide a portion of the heated fluid stream 129 to the first expander system. Adjustable valves 183 and 185 may be utilized to apportion the flow of the fluid stream 115 between the flue gas stream cooler 181 and the condenser 113, where the valves are adjusted to ensure that sufficient mass flow of the fluid stream 115 is provided to the condenser 113 to cool and condense the water vapor stream 111 and to the flue gas cooler 181 to cool the flue gas stream. In another embodiment, as shown in FIG. 6, the flue gas stream cooler 181 may be operatively coupled to the first heat exchanger 153 and to the condenser 113 to receive the fluid stream 115 from the first heat exchanger and to provide the fluid stream 115a, heated by contact with the flue gas stream 157, to the condenser for thermal contact with the water vapor stream 111.

Referring back to FIG. 5, the system 101 may comprise a second expander system 167 operatively coupled to the heat recovery steam generator 171 to receive high energy steam 165 from the heat recovery steam generator 171. The second expander system is structured and arranged to expand the high energy steam received from the heat recovery steam generator to produce mechanical power and the water vapor stream 111.

The system 101 may comprise at least one second electrical power generating element 176 operatively coupled to the second expander system 167 that is structured and arranged to generate electrical power from the mechanical power produced by the second expander system. A second electrical power generating element 176 may be an electrical power generator inductively coupled to the second expander system 167 to generate electrical power from rotational mechanical power produced by the second expander system. A second electrical power generating element 176 may be an alternator, and preferably is an turbo-alternator. A second electrical power generating element 176 may be a dynamo or a magneto. A second electrical power generating element 176 may also be a magneto-hydrodynamic electrical power generator.

The second expander system 167 may be comprised of one or more steam expanders. In a preferred embodiment, the second expander system 167 may be a modified conventional steam expander. Conventional steam expanders are typically comprised of multiple expansion stages through which steam is sequentially expanded to sequentially reduce the temperature and pressure of high energy steam. For example, the multiple expansion stages of a conventional steam expander may include a high pressure turbine having two expansion stages, an intermediate pressure turbine having three expansion stages, and a low pressure turbine having five expansion stages. The second expander system 167 may be comprised of a steam expander 173 modified relative to a conventional steam expander by utilizing a high pressure turbine and an intermediate pressure turbine but removing one or more of the expansion stages of the low pressure turbine, or by removing the low pressure turbine. The steam expander 173 may be modified relative to a conventional turbine to provide the water vapor stream 111 at a desired temperature and pressure, for example, a temperature of at least 60° C. and a pressure of at least 0.02 MPa by removing the $5^{th}$ stage of a low pressure turbine, or a temperature of at least 100° C. and a pressure of at least 0.075 MPa by removing the $4^{th}$ and $5^{th}$ stages of the low pressure turbine, or a temperature of at least 190° C. and a pressure of at least 0.19 MPa by removing the $3^{rd}$, $4^{th}$, and $5^{th}$ stages of the low pressure turbine, or a temperature of at least 280° C. and a pressure of at least 0.44 MPa by removing the $2^{nd}$, $3^{rd}$, $4^{th}$, and $5^{th}$ stages of the low pressure turbine, or a temperature of at least 375° C. and a pressure of at least 0.92 MPa by removing the low pressure turbine.

The condenser 113 may be operatively coupled to the second expander system 167 to receive the water vapor stream 111 produced by the second expander system. The condenser may cool the water vapor stream 111 to condense water 127 therefrom and heat the fluid stream 115 therein as set forth above.

The system 101 may include one or more boiler feed water pumps 173 operatively coupled to the condenser 113 to receive the water 127 therefrom. The one or more boiler feed water pumps 173 may be operatively coupled to the heat recovery steam generator 171 to provide the water 127 received from the condenser 113 to the heat recovery steam generator for the production of high energy steam 165 therefrom. The one or more boiler feed water pumps 173 are structured and arranged to pump the water 127 from the condenser 113 to the heat recovery steam generator 171. The system 101 may require only a single high pressure boiler feed water pump 173 to pump water 127 from the condenser to the heat recovery steam generator since the water may be provided from the condenser 113 at a relatively high pressure (e.g. at least 0.1 MPa) by removing one or more stages of the low pressure turbine in the second expander system 167. This is not possible in a conventional stream driven power generating system—which typically requires a series of low pressure boiler feed water pumps combined with one or more low pressure heat exchangers and one or more high pressure boiler feed water pumps—since all possible power must be captured from the high energy steam (all the low pressure turbine stages must be utilized) and the resulting steam must be condensed at low pressure in the condenser—typically near vacuum. The system of the present invention captures such power in the first expander system, so the water vapor stream is not required to be condensed at low pressure in the condenser, and the low pressure boiler feed water pumps and heaters are not necessary.

The water 127 provided to the boiler water feed pump 173 or to the heat recovery steam generator may be heated by mixing a slipstream of the high energy steam 165 with the water 127. However, the pressure conditions in the condenser 113 for condensing the water 127 may be selected so that the water 127 has a temperature such that the water 127 needs no heating prior to being fed to the heat recovery steam generator 171, for example, by selecting the expansion conditions of the high energy steam 165 in the second expander system as described above.

To facilitate a better understanding of the present invention, the following illustrative examples of certain aspects of some embodiments are given and comparative examples are provided for comparison of the present invention with systems and processes outside the scope of the present invention. In no way should the following illustrative examples be read to limit, or define, the scope of the invention. Rather, the scope of the invention is defined by the claims appended hereto.

Comparative Example 1

USC CFB Plant Nominally 400 MWe Single Re-Heat Design

A study of a method and system for producing electrical power using a coal-fired heat source to produce ultra-supercritical steam for generation of electrical power was prepared, where the method and system were not in accordance with the present invention and the study is used for comparison with the method and system of the present invention. A detailed engineering design conceptual study of coal fired ultra-supercritical (USC) pressure boilers for production of electrical power, employing a circulating fluidized bed (CFB) combustor, was prepared by Zhen Fan, Steve Goidich, Archie Robertson and Song Wu of Foster Wheeler North America Corp. The design study was performed under United States of America Department of Energy Cooperative Agreement No. DE-FC26-03NT41737; and the final report was issued September 2006.

A nominally 400 megawatt (electrical) ("MWe") USC-CFB conceptual design from that report, as shown in FIGS. 8, 9, 10 and 11, is used as Comparative Example 1. Fuel used in the Study was Illinois No. 6 Coal whose properties are summarized in Table CE-1-1.

TABLE CE-1-1

Properties of Illinois No. 6 Coal

| | (wt %) |
|---|---|
| Proximate Analysis | |
| Moisture | 11.12 |
| Ash | 9.70 |
| Volatile Matter | 34.99 |
| Fixed Carbon | 44.19 |
| TOTAL | 100.00 |
| HHV (Btu/lb) | 11,666 (25,724 kJ/kg) |
| Ultimate Analysis | |
| Moisture | 11.12 |
| Carbon | 63.75 |
| Hydrogen | 4.50 |
| Nitrogen | 1.25 |
| Chlorine | 0.29 |
| Sulfur | 2.51 |
| Ash | 9.70 |
| Oxygen (by difference) | 6.88 |
| TOTAL | 100.00 |

Limestone sorbent whose properties are summarized in Table CE-1-2 was added to the CFB System to mitigate emissions.

TABLE CE-1-2

Properties of Limestone Sorbent

| | Dry Basis, % |
|---|---|
| Calcium Carbonate, $CaCO_3$ | 80.40 |
| Magnesium Carbonate, $MgCO_3$ | 3.50 |
| Silica, $SiO_2$ | 10.32 |
| Aluminum Oxide, $Al_2O_3$ | 3.16 |
| Iron Oxide, $Fe_2O_3$ | 1.24 |
| Sodium Oxide, $Na_2O$ | 0.23 |
| Potassium Oxide, $K_2O$ | 0.72 |
| Balance | 0.43 |

A full load summary of electrical power generation and steam turbine operating conditions is presented in Table CE-1-3. The corresponding full load boiler operating conditions, heat and material balance, and emissions summary is presented in Table CE-1-5.

According to the design conceptual study, the power plant exported about 405 MWe to electrical power consumers. In the study, the steam turbine that drove the electrical generation system was a single machine comprised of tandem High Pressure, Intermediate Pressure, and Low Pressure sections that drove a 3600 RPM hydrogen-cooled generator. Steam entered the high pressure turbine at a rate of 1,196,825.4 kg/h at 31.13 MPa and 593.3° C. Effluent steam from the high pressure turbine was reheated to 593.3° C. and introduced to the intermediate pressure turbine at a rate of 989,569.2 kg/h at a pressure of 5.44 MPa. The intermediate pressure turbine exhausted through the low pressure turbine at a rate of 771,429 kg/h, temperature of 286° C., and pressure of 0.65 MPa. Effluent from the low pressure turbine was routed to a single pressure condenser that was operated at inlet temperature of about 35 to 45° C. and 0.007 MPa.

Steam was extracted from the high pressure, intermediate pressure, and low pressure turbine cylinders, and from the cold reheat piping for boiler feed water heating and deaeration as well as for operation of the boiler feed water pump driven by an auxiliary turbine. The boiler feed water heating train consisted of seven closed feed water heaters (four low-pressure and three high pressure), and one open feed water heater (deaerator).

TABLE CE-1-3

| Power Generation Summary: | | | | |
|---|---|---|---|---|
| Gross Power at Generator Terminals | 426,281 | kWe | 426.281 | MWe |
| Internal Power Consumption (including auxiliary turbine) | 21,400 | kWe | 21.400 | MWe |
| Net Power | 404,881 | kWe | 404.881 | MWe |
| Net Efficiency [HHV], % | 40.6 | | 40.6 | |
| Net Heat Rate [HHV] | 8,405 | BTU/kWh | 8868 | kJ/kWh |
| Condenser Cooling Duty | 1,560,000,000 | BTU/h | 1,645,887,360 | kJ/h |
| Steam Turbine Conditions Summary: | | | | |
| High Pressure Turbine Steam Flow Rate | 2,639,000 | lb/h | 1,196,825.4 | kg/h |
| High Pressure Turbine Inlet Temperature | 1,100 | F. | 593.3 | C. |
| High Pressure Turbine Inlet Pressure | 4,515 | psia | 31.13 | MPa |
| Intermediate Pressure Turbine Steam Flow Rate | 2,182,000 | lb/h | 989,569.2 | kg/h |
| Intermediate Pressure Turbine Inlet Temperature | 1,100 | F. | 593.3 | C. |
| Intermediate Pressure Turbine Inlet Pressure | 789 | psia | 5.44 | MPa |
| Low Pressure Turbine Steam Flow Rate | 1,701,000 | lb/h | 771,429 | kg/h |
| Low Pressure Turbine Inlet Temperature | 546 | F. | 286 | C. |
| Low Pressure Turbine Inlet Pressure | 94 | psia | 0.65 | MPa |

For purposes of comparison with the present invention, the contributions to the power output of the steam turbine by individual stages were computed from the enthalpy change across that stage of the steam turbine and the mass flow of steam through that stage of the steam turbine. The results of the calculations are summarized in Table CE-1-4.

TABLE CE-1-4

| | | Temperature Degrees, C. | Pressure, MPa | Steam Density, kg/m³ | Enthalpy, kJ/kg | Mass Flow, kg/h | Power, kJ/h | Contribution |
|---|---|---|---|---|---|---|---|---|
| High Pressure Turbine Section | | | | | | | | |
| STAGE-1 | Inlet | 593.3 | 31.13 | 92.600 | 3,414.5 | 1,196,825.4 | 379,633,015.9 | 24.3% |
| | Outlet | 392.8 | 9.00 | 34.000 | 3,097.3 | 1,196,825.4 | | |
| STAGE-2 | Inlet | 392.8 | 9.00 | 34.000 | 3,097.3 | 1,101,133.8 | 105,598,730.2 | 6.8% |
| | Outlet | 334.4 | 5.89 | 24.200 | 3,001.4 | 1,101,133.8 | | |
| Intermediate Turbine Section | | | | | | | | |
| STAGE-1 | inlet | 593.3 | 5.44 | 13.970 | 3,647.8 | 989,569.2 | 255,605,714.3 | 16.4% |
| | Outlet | 466.7 | 2.43 | 7.275 | 3,389.5 | 989,569.2 | | |
| STAGE-2 | Inlet | 466.7 | 2.43 | 7.275 | 3,389.5 | 959,637.2 | 168,896,145.1 | 10.8% |
| | Outlet | 378.9 | 1.34 | 4.550 | 3,213.5 | 959,637.2 | | |
| STAGE-3 | Inlet | 378.9 | 1.34 | 4.550 | 3,213.5 | 916,553.3 | 173,045,260.8 | 11.1% |
| | Outlet | 282.8 | 0.65 | 2.580 | 3,024.7 | 916,553.3 | | |
| Low Pressure Turbine Section | | | | | | | | |
| STAGE-1 | Inlet | 285.6 | 0.65 | 2.580 | 3,024.7 | 771,428.6 | 129,214,285.7 | 8.3% |
| | Outlet | 195.0 | 0.27 | 1.270 | 2,857.2 | 771,428.6 | | |
| STAGE-2 | Inlet | 195.0 | 0.27 | 1.270 | 2,857.2 | 729,705.2 | 114,198,866.2 | 7.3% |
| | Outlet | 112.8 | 0.11 | 0.630 | 2,700.7 | 729,705.2 | | |
| STAGE-3 | Inlet | 112.8 | 0.11 | 0.630 | 2,700.7 | 678,911.6 | 54,516,598.6 | 3.5% |
| | Outlet | 66.7 | 0.03 | 0.170 | 2,620.4 | 678,911.6 | | |
| STAGE-4 | Inlet | 66.7 | 0.03 | 0.170 | 2,620.4 | 646,258.5 | 181,340,136.1 | 11.6% |
| | Outlet | 38.9 | 0.01 | 0.054 | 2,339.8 | 646,258.5 | | |

The individual contribution of each of the steam turbine stages, at full load conditions, was calculated based on the enthalpy change of steam across that turbine stage; results in kJ/h per stage, and as normalized percent contribution for each stage are summarized in Table CE-1-4. The contribution of each of the turbine sections, at full load conditions, is the sum of the contribution of each stage within that section; these values were calculated as shown in table CE-1-4. On a normalized basis, the contribution of the high pressure turbine section was calculated to be 31.1%, the contribution of the intermediate pressure turbine section was calculated to be 38.3% and, the contribution of the low pressure turbine section was calculated to be 30.7%. The lowest pressure stage of the low pressure turbine was operated in a condensing environment where the effluent steam quality was assumed to be 0.90. The last two stages of the low pressure turbine accounted for about 15% of the power produced when the steam turbine was operated at full load.

In the study, injection of limestone sorbent into the circulating fluidized bed combustor permitted in-situ capture of sulfur dioxide thereby obviating the need for separate flue gas desulfurization equipment. Additionally, the low furnace temperature of the circulating fluidized bed combustor facilitated operation at low nitrogen oxide emission levels. A pulse jet, fabric filter was used to control particulate emissions and removal of over 99.9% of the dust in the flue gas was achieved.

Illustrative Example 1

USC CFB Plant with Single Re-Heat Steam Design and Integrated Second Fluid Power Cycle A design study was prepared based on thermodynamic calculations of a method and system for producing electrical power using a first power cycle utilizing water/steam as a working fluid and a second power cycle utilizing carbon dioxide as a working fluid, where the method and system were in accordance with the present invention. In the first power cycle, a coal-fired heat source was utilized to produce ultra-supercritical steam for generation of electrical power followed by an integrated second fluid power cycle utilizing carbon dioxide as a working fluid.

In the first power cycle, the coal-fired steam turbine driven generator portion of the design study of Illustrative Example 1 replicated the design study of the USC CFB Plant of nominally 400 MWe capacity described in Comparative Example 1 above with the exception that: (a) the low pressure steam turbine was eliminated, (b) the four low pressure feed water pre-heaters were eliminated, and (c) steam extraction for operation of the auxiliary turbine was made either from the high pressure steam turbine cylinder or the intermediate pressure steam turbine cylinder. At full load conditions the input of combustion air, fuel, and sorbent were maintained as described in Comparative Example 1.

TABLE CE-1-5

| Boiler Operating Conditions: | | | | |
|---|---|---|---|---|
| Main Steam Flow Rate | 2,710,000 | lb/h | 1,229,025 | kg/h |
| Main Steam Temperature | 1,106° | F. | 596.7 | C. |
| Main Steam Pressure | 4,732 | psia | 32.63 | MPa |
| Reheat Steam Flow Rate | 2,198,000 | lb/h | 996,825.4 | kg/h |
| Reheat Steam Temperature | 1,101 | F. | 593.9 | C. |
| Reheat Steam Pressure | 804 | psia | 5.54 | MPa |
| Feed Water Inlet Temperature | 569 | F. | 298.3 | C. |
| Heat and Mass Balance Parameters: | | | | |
| Flue Gas Rate | 3,296,000 | lb/h | 1,494,784.6 | kg/h |
| Combustion Air Rate | 3,029,000 | lb/h | 1,373,696 | kg/h |
| Coal Rate | 291,702 | lb/h | 132,291 | kg/h |
| Limestone Rate | 58,551 | lb/h | 26,554 | kg/h |
| Total Ash Rate | 82,970 | lb/h | 37,628 | kg/h |
| Furnace Exit Temperature | 1,600 | F. | 871.1 | C. |
| Flue Gas Temperature Entering Air Heater | 649 | F. | 342.8 | C. |
| Flue Gas Temperature Leaving Air Heater | 244 | F. | 117.8 | C. |
| Bottom Ash Temperature | 500 | F. | 260.0 | C. |
| Excess Combustion Air, % | 20 | | 20 | |
| Emissions Summary at 85% Capacity Factor: | | | | |
| Sulfur Dioxide ($SO_2$) | 2,172 | Tons/year | 1,970,068 | kg/year |
| Nitrogen Oxides ($NO_x$) | 2,027 | Tons/year | 1,838,549 | kg/year |
| Particulate | 105 | Tons/year | 95,238 | kg/year |
| Carbon Dioxide ($CO_2$) | 2,587,910 | Tons/year | 2,347,310,658 | kg/year |

Comparative Example 1 shows that Circulating Fluidized Bed combustors in coal power plant service are pragmatic facilities at the 400 MWe scale. In summary, Comparative Example 1 showed the production of net electrical power of about 405 MWe at an efficiency of about 40.6% electrical power produced per unit fuel consumed. The report authors also indicated that such facilities may be built at a scale of 800 MWe. The authors showed that CFB power plants have about the same efficiency, relative to input fuel, as similar sized pulverized coal plants of comparable steam system configuration.

As a consequence of eliminating the low pressure steam turbine and the four low pressure feed water pre-heaters, the calculated quantity of electricity generated at full load by the steam turbine of the first power cycle was reduced. The calculated net power output from the steam turbine driven generator was reduced from 404.8 MWe to about 280.6 MWe, 69.3% relative to the net electrical power output calculated in Comparative Example 1.

In the design study of Illustrative Example 1, superheated steam was produced in a steam boiler heated by a combustion gas produced by firing coal in a coal-fired burner. The superheated steam was fed to the steam turbine system, modified relative to Comparative Example 1 by elimination of the low pressure steam turbine, to generate electrical power. Expanded steam exited the steam turbine system and was passed to a condenser where it was cooled to liquid water, and the liquid water was passed to a de-aerator via a low pressure boiler water feed pump. The deaerated water was recycled to the steam boiler via a high pressure boiler water feed pump. The steam turbine of the first power cycle was computed to generate less power than the steam turbine of Comparative Example 1 because the low pressure turbine section was deleted. The full load power generation capacity of the first power cycle of was computed to be 69.3% of that of Comparative Example 1, or 280.6 MWe.

In the design study of Illustrative Example 1, liquefied, pressurized carbon dioxide at temperature between 0 and 10° C. and pressure of 30 MPa, was used as the coolant in the condenser, and was thermally contacted with steam in the condenser to produce liquid water from the steam. Thermal power was extracted from steam by the carbon dioxide in the condenser, increasing the temperature of the carbon dioxide significantly and producing supercritical carbon dioxide.

The heated pressurized supercritical carbon dioxide produced from the steam condenser was passed to an expander system including a dense fluid phase (two phase) expander where the carbon dioxide stream was expanded to a pressure of 0.55 MPa and a temperature of −55 C. Upon expansion, thermal power was extracted from the heated pressurized supercritical carbon dioxide as rotational mechanical power by the expander system. The mechanical power was utilized to drive an electrical generator to produce electrical power.

In the design study of Illustrative Example 1, cold liquid carbon dioxide discharged from the expander was recycled to the steam condenser by a return pump which discharged the cold liquid carbon dioxide at high pressure suitable to meet the flow requirements of the system (e.g. pressure greater than or equal to 30 MPa). The mass flow of the carbon dioxide through the steam condenser and the second power cycle was controlled to produce most of the carbon dioxide as a liquid upon expansion since it is highly advantageous that the expanded carbon dioxide be a liquid with only a very small fraction present as vapor (e.g. the vapor quality of the expanded carbon dioxide is very low). The advantage arises because pumping liquid carbon dioxide consumes far less power than compression and liquefaction of carbon dioxide vapor. High pressure liquid carbon dioxide, at temperature as low as −55 C, was warmed in a heat exchanger to a final temperature of 0 to 10 C prior to being returned to the steam condenser.

Superheated Steam Cooling/Condensation/Recycle to Steam Boiler

In the design study of Illustrative Example 1, the net electrical power produced in the first power cycle using water/steam as a working fluid to capture thermal power from a combustion gas was calculated, where the steam turbine utilized to convert thermal power of the steam to mechanical power included a High Pressure Turbine stage and an Intermediate Pressure Turbine stage but no Low Pressure Turbine stage.

Figure 8:
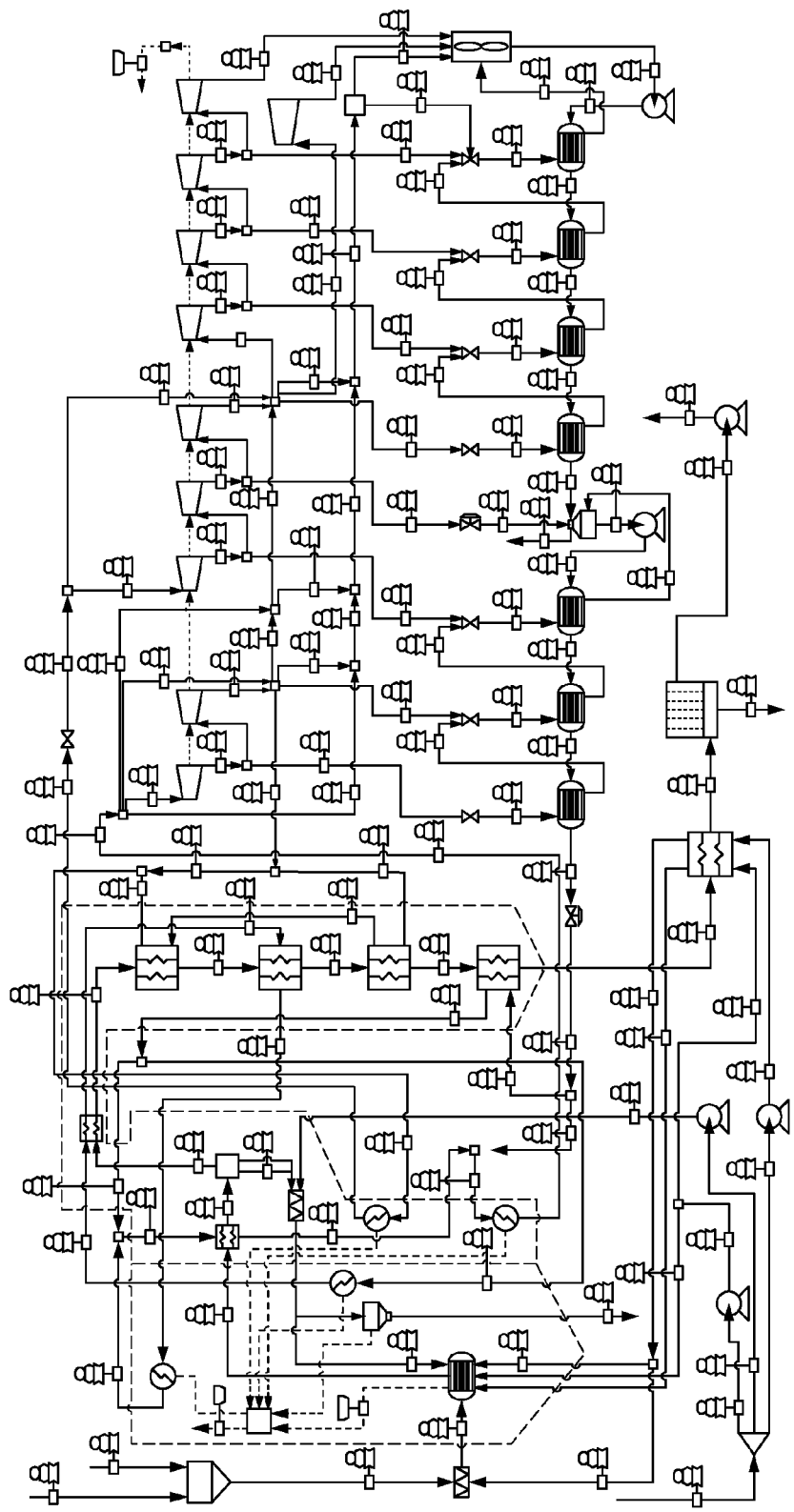
FIG. 8 provides a schematic diagram of a design plan of a coal-fired, ultra-supercritical electrical power generating system of the prior art.
Figure 9:
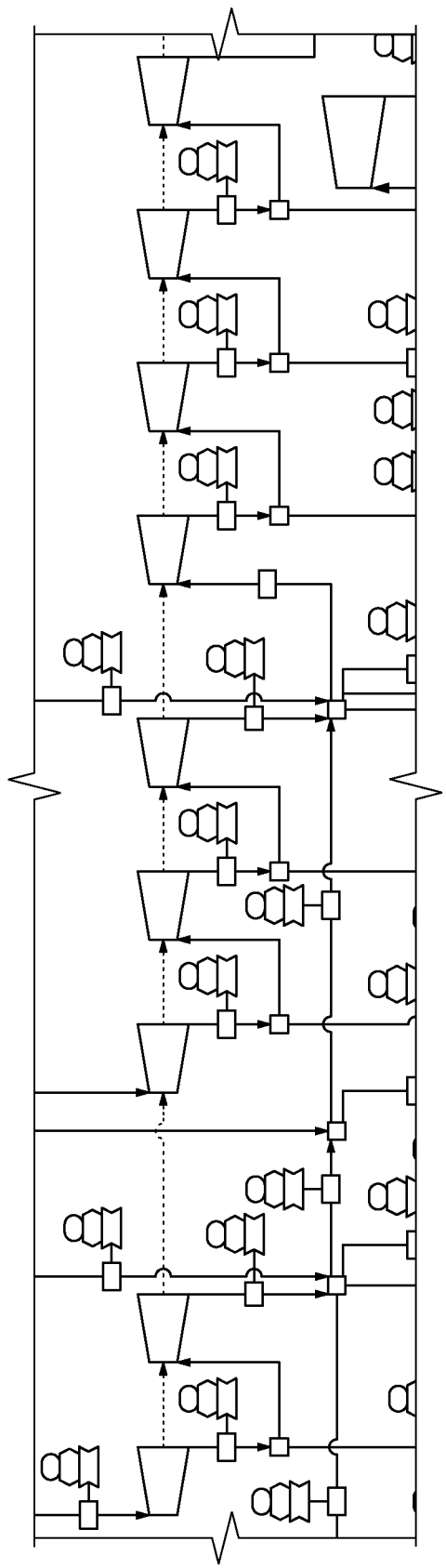
FIG. 9 provides a schematic diagram of the steam turbine portion of the system of FIG. 8.
Figure 10:
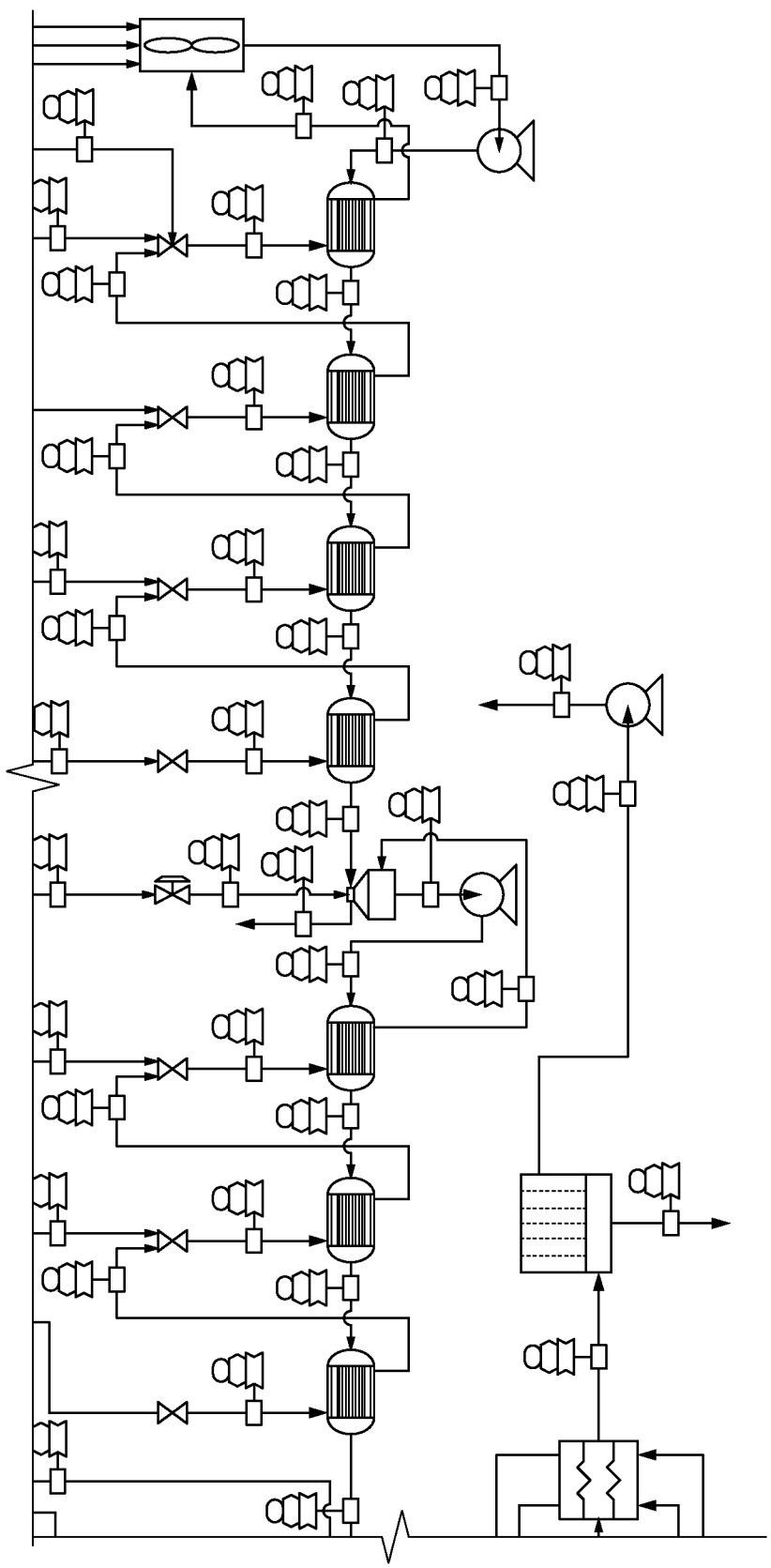
FIG. 10 provides a schematic diagram of the boiler feed water pump portion of the system of FIG. 8.
Figure 11:
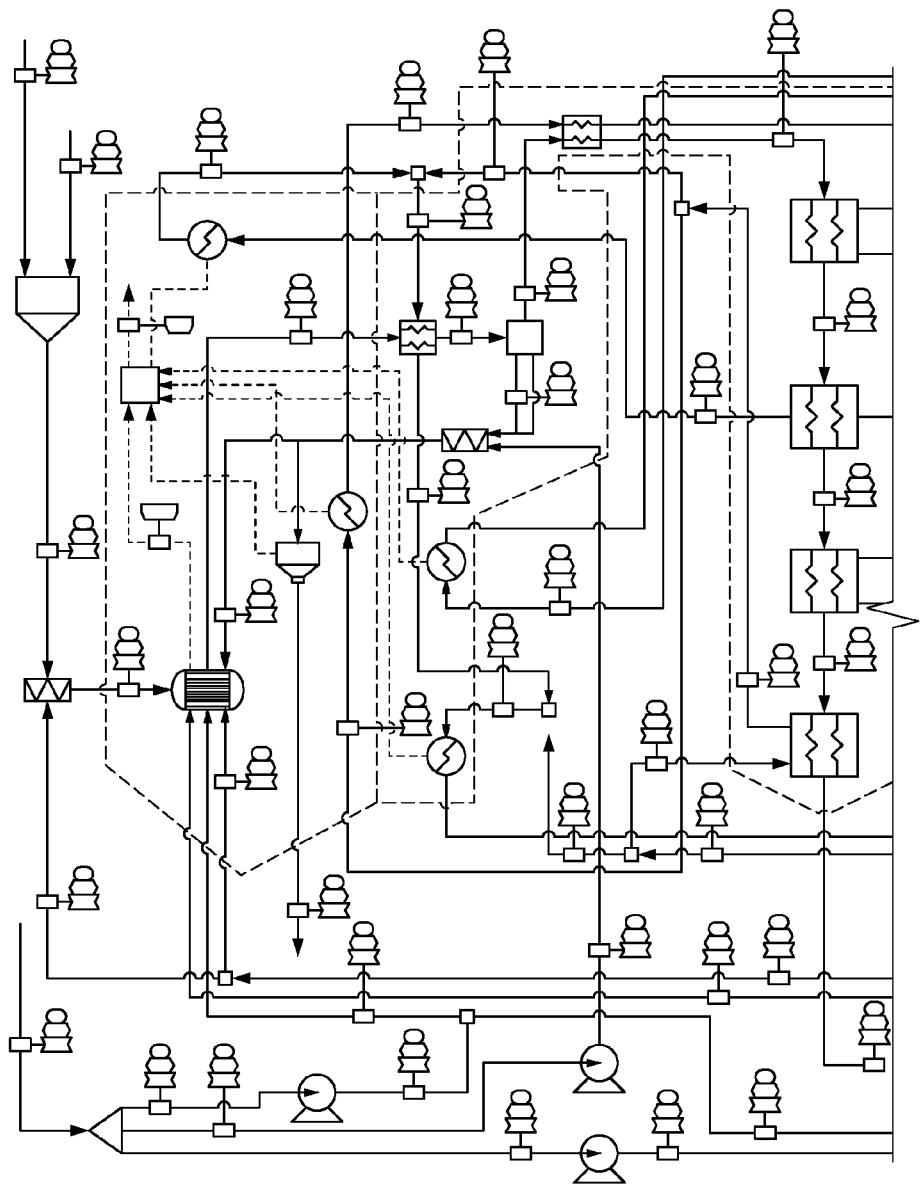
FIG. 11 provides a schematic diagram of the steam generating portion of the system of FIG. 8.

In the design study of Illustrative Example 1, calculations showed that steam exited the final stage of the steam turbine of the first power cycle (the Intermediate Pressure Turbine) at 282.8° C., 0.65 MPa, mass flow of 916,553.3 kg/h, and enthalpy 3024.8 kJ/kg. The Intermediate Pressure Turbine outlet steam was blended with three additional steam streams: (a) a first stream at 412.2° C., 5.89 MPa, mass flow of 8,163.3 kg/h, and enthalpy 3211.2 kJ/kg, (b) a second stream at 593.3° C., 5.44 MPa, mass flow of 7,256.2 kg/h, and enthalpy of 3647.7 kJ/kg, and (c) a third stream at 401.7° C., 5.89 MPa, mass flow of 2,267.6 kg/h, and enthalpy of 3,184.6 kJ/kg. In Comparative Example 1, the additional streams were utilized to provide heat to four low pressure feed water heaters, as shown in FIG. 8, and the auxiliary turbine (which is driven in the Design Study of Illustrative Example 1 by steam extracted from either the high pressure steam turbine cylinder or the intermediate pressure steam turbine cylinder). The four low pressure feed water heaters were not required in the system of Illustrative Example 1 since the Low Pressure Turbine was eliminated and, as a result, water condensed from the Intermediate Pressure Turbine and the three streams was condensed at a temperature of 160° C. rather than 35° C. The combined steam flow streams were calculated to have mass flow rate of 934,240.4 kg/h, enthalpy of 3030.4 kJ/kg, temperature of 285.6° C., and pressure 0.65 MPa.

In the design study of Illustrative Example 1, the combined steam flow streams—directed to the low pressure turbine, the auxiliary turbine, and the low pressure boiler feed water heaters in Comparative Example 1—were cooled in a condenser to form liquid water at a temperature of 160° C., 0.65 MPa, and enthalpy of 675.5 kJ/kg. The enthalpy change upon cooling was calculated to be 2354.9 kJ/kg; the mass flow of steam to be cooled in the condenser was calculated to be 934,240.4 kg/h; and the resulting heat transfer rate in the condenser was calculated to be 2,200,042,718.0 kJ/h.

In the design study of Illustrative Example 1, the liquefied water stream exiting the condenser at a temperature of 160° C., pressure of 0.65 MPa, enthalpy of 675.5 kJ/kg, density 907.5 kg/m$^3$ and mass flow rate of 934,240.4 kg/h was pumped by a low pressure boiler water feed pump into a de-aerator of the steam system; where the differential pressure across the low pressure boiler water feed pump was 0.65 MPa while the volumetric flow through the low pressure boiler water feed pump was 1029.5 m$^3$/h. The power consumption of the low pressure boiler water feed pump was ascertained to be less than about 1 MWm. A high pressure boiler water feed pump was used to further pressurize the deaerated boiler feed water from a pressure of 1.30 MPa, a temperature of 191.7° C., a density of 874.3 kg/m$^3$, a mass flow rate of 1,229,024.9 kg/h, and a volumetric flow rate of 1405.7 m$^3$/h to a pressure of 37.1 MPa, a temperature of 198.9° C., a density of 890.3 kg/m$^3$, a mass flow rate of 1,229,024.9 kg/h, a volumetric flow rate of 1380.5 m$^3$/h, and an enthalpy of 863.8 kJ/kg. The power consumption of the high pressure boiler water feed pump was determined to be 18 MWm; where the high pressure boiler water feed pump was driven by power from the auxiliary steam turbine.

In summary, electrical power was produced in the first power cycle of Illustrative Example 1 by combustion of coal with air and limestone in a circulating fluidized bed combustor whose heat and mass balances and emissions performance were identical to that of Comparative Example 1. Thermal power was extracted from the combustion flue gas by generation of steam, at full load conditions, in a manner identical that used in Comparative Example 1. The steam that was generated was expanded through a single steam turbine comprised of a high and intermediate pressure section whose design was based on that described in Comparative Example 1 with the exception that the low pressure steam turbine cylinder was deleted. As a result of deleting the low pressure steam turbine cylinder, less thermal power was extracted from the steam stream by the steam turbine and converted to rotational mechanical power, MWm, and ultimately to electrical power, MWe. The quantity of electrical power produced was computed based on the relative ratio of thermal power converted to mechanical power by the steam turbine of Illustrative Example 1 relative to that of Comparative Example 1.

The ratio of thermal power extracted employing the method of Illustrative Example 1 versus Comparative Example 1 was 0.693; as computed by the enthalpy change across the several stages of the steam turbine of Comparative Example 1. Consequently, the net electrical power produced in the first power cycle of Illustrative Example 1 was decreased by a factor of 0.693 relative to Comparative Example 1. The net electrical power available for export from the first power cycle of Illustrative Example 1 was computed to be 280.6 MWe. Reduction in the power consumption of the low pressure condenser water return pump, as a result of the reduced differential pressure across that pump, was not included in the power calculations. Deletion of the four low pressure boiler feed water heaters was the cause of the decrease of differential pressure across the low pressure condenser water return pump in the first power cycle of Illustrative Example 1. The power requirement of the high pressure boiler feed water pump, driven by the auxiliary turbine, did not change in Illustrative Example 1 versus Comparative Example 1; thus, the re-location of the steam extraction to drive the auxiliary turbine is not relevant with respect to the net electrical power output of the first power cycle of Illustrative Example 1.

The condenser operating conditions of Illustrative Example 1 versus Comparative Example 1 were dramatically different. The condenser of Illustrative Example 1 is operated at nearly 100 times higher pressure, and consequently about 100 times higher thermal power density that that of Comparative Example 1. In addition to the higher thermal power density in the condenser the thermal power to be recovered at the condenser is about 30% higher in the case of Illustrative Example 1 versus Comparative Example 1. The thermal power recovered at the condenser of Illustrative Example 1 into the second fluid power cycle, was central to the efficacy of the second fluid cycle.

Liquid Carbon Dioxide Coolant to Condense Superheated Steam

In the design study of Illustrative Example 1, carbon dioxide was used as the working fluid in the second power cycle. Liquid carbon dioxide was utilized as the heat exchange fluid (coolant) in the condenser to condense steam of the first power cycle to liquid water. It was supplied to the condenser at an inlet temperature of 5 C, and pressure of 30 MPa. The enthalpy of liquid carbon dioxide at 5 C and 30 MPa is 203.3 kJ/kg.

Supercritical carbon dioxide was calculated to be produced from the condenser at a temperature of about 193.6 C, pressure of 30 MPa, and enthalpy of 560.3 kJ/kg. The enthalpy change of carbon dioxide upon transit through the condenser was calculated as 357.0 kJ/, and the flow rate of liquid carbon dioxide required to uptake 2,200,042,718 kJ/h, while cooling the steam/water stream to 160 C from 285.5 C, was calculated as 6,162,584.6 kg/h. The heat transfer efficiency from steam/water to carbon dioxide coolant was assumed to be 100% and the condenser was assumed to provide negligible pressure drop.

Expansion of Supercritical Carbon Dioxide

In the design study of Illustrative Example 1, the supercritical carbon dioxide fluid, at about 194 C and 30 MPa was routed to a multi-stage, dense fluid phase (two phase) isentropic expander driving an electrical generator. The supercritical carbon dioxide was expanded to a discharge pressure of 0.55 MPa. The mass flow rate of carbon dioxide fluid was calculated to be 6,162,584.6 kg/h.

The properties of the carbon dioxide fluid stream as it transits the multi-stage dense fluid phase expander were calculated and are summarized in Table IE-1-1.

TABLE IE-1-1

Properties of Carbon Dioxide as it Transits the Expander
Isochoric Data for D = 400 kg/m$^3$

| Expansion Stage | Temperature, C. | Pressure, MPa | Enthalpy, kJ/kg | Vapor Quality |
|---|---|---|---|---|
| Stage 1 inlet | 193.6 | 30.0 | 560.3 | Supercritical |
| Stage 1 Outlet | 34.4 | 7.88 | 356.5 | Supercritical |
| Stage 2 Inlet | | | | |
| Stage 2 Outlet | 4.4 | 3.91 | 249.7 | 0.18 |
| Stage 3 Inlet | | | | |
| Stage 3 Outlet | −20.2 | 1.96 | 177.4 | 0.08 |
| Stage 4 Inlet | | | | |
| Stage 4 Outlet | −40.6 | 0.98 | 125.3 | 0.04 |
| Stage 5 Inlet | | | | |
| Stage 5 Outlet | −55.0 | 0.55 | 91.6 | 0.02 |
| Overall Change | −248.6 | 29.45 | −468.7 | 0.98 |

Calculations indicated that the low temperature expanded carbon dioxide was produced as a liquid at −55.0 C, 0.55 MPa, enthalpy 91.6 kJ/kg, density of 1172.9 kg/m$^3$, mass flow rate 6,162,584.6 kg/h, and volumetric flow rate of 5,254.1 m$^3$/h.

In the design study of Illustrative Example 1, cold carbon dioxide liquid was collected at the dense fluid phase expander outlet, pumped through a heat exchanger to reheat it to 5 C, and reintroduced to the condenser and a flue gas heat exchanger at 5 C and 30 MPa to re-enter the circuit of the second fluid integrated power cycle.

Mechanical power consumed to pump 5,254.1 m$^3$/h of carbon dioxide was estimated based on the power requirements to pump water in the boiler system of Comparative Example 1. The data from Comparative Example 1 show that 1 MW of mechanical power was required to discharge 939.7 m$^3$/h water against a differential pressure of 3.593 MPa in the Cold Water Pump and 18 MW of mechanical power were required to discharge 1380.5 m$^3$/h water against a differential pressure of 35.8 MPa in the Boiler Water Feed Pump. The calculated slope of those data, in units of (MWm/(m$^3$/h·MPa), indicated the sensitivity of the water pumps to their differential pressure and volumetric flow rate per hour. The slope was computed to be $3.42 \times 10^{-4}$ MWm/(m$^3$/h) per megapascal differential pressure across the pump. This value was used to estimate the pumping power for liquid carbon dioxide recycle in the second power cycle. The power required to pump liquid carbon dioxide for recycle was not the only power consuming step when recycling liquid carbon dioxide in the second fluid power cycle; it was also necessary to calculate the power required to compress a small fraction of carbon dioxide produced as a gas across the dense fluid phase expander to liquefy the gaseous carbon dioxide for recycle.

The power to pump liquid carbon dioxide, as if no vapor were present in the expander exhaust, was computed as a function of the volumetric flow rate and pump differential pressure as described above; then, the value was prorated by the fraction of liquid carbon dioxide formed. The mechanical power required to pump the liquid carbon dioxide was calculated to be 51.9 MWm according to the following equation:

Liquid Pumping Power=$(3.42 \times 10^{-4}$ MW/(m$^3$/h·MPa)) (5,254.1 m$^3$/h)×(29.45 MPa)×(0.98)=51.9 MWm.

The power required for compression and liquefaction of carbon dioxide vapor was assumed to be 10 times that of the liquid carbon dioxide pumping power. In this way the compression power was sensitive to the final pressure and scaled to the fraction of carbon dioxide vapor formed at the expander outlet. The mechanical power required to liquefy the gaseous carbon dioxide was calculated to be 10.6 MWm according to the following equation:

Compression Power=$(3.42 \times 10^{-4}$ MW/(m$^3$/h·MPa))(5,254.1 m$^3$/h)×(29.45 MPa)×(0.02)×10=10.6 MW/m Power Recovery from the Carbon Dioxide Expander The electrical power generation from expansion of the carbon dioxide through the dense fluid phase expander was calculated. The net mechanical power (rotational) produced by expansion of the supercritical carbon dioxide through the dense phase fluid expander was calculated by subtracting the mechanical power required to recycle the liquid and gas components of carbon dioxide stream produced at the outlet of dense phase fluid expander in the second power cycle from the mechanical power produced by expansion of the supercritical carbon dioxide through the dense fluid phase isentropic expander. The electrical power produced by expansion of the supercritical carbon dioxide in the dense fluid phase isentropic expander was calculated from the net mechanical power as converted to electrical power by driving a generator whose efficiency was assumed to be 99%.

The thermal power produced by expansion of the supercritical carbon dioxide across the dense phase fluid isentropic expander was calculated from the enthalpy change of carbon dioxide across the expander and the mass flow of carbon dioxide through the expander. The enthalpy change of carbon dioxide across the expander was calculated as 468.7 kJ/kg, and the mass flow of carbon dioxide through the expander was calculated as 6,162,584.6 kg/h. The thermal power of expansion of the supercritical carbon dioxide across the expander was calculated as 2,888,403,402 kJ/h or 802.3 MWt.

The total mechanical power produced by expansion of the supercritical carbon dioxide across the dense fluid phase expander was calculated from the thermal power produced by expansion of the supercritical carbon dioxide across the dense fluid phase expander. The efficiency for conversion of thermal power to rotational mechanical power of the multi stage, dense fluid phase, isentropic expander was ascertained to be about 40-60%. The total mechanical power produced by expansion of the supercritical carbon dioxide across the dense fluid phase expander was estimated to range from 320.9 to 481.4 MWm. The net mechanical power provided by expansion of the supercritical carbon dioxide across the dense phase fluid expander was calculated as being in a range from 258.4 to 418.9 MWm by subtracting the mechanical power required for operation of the liquid carbon dioxide pump and compressor from the total mechanical power.

Assuming about 1% losses in the electrical generator, the quantity of electrical power generated in the Carbon Dioxide Power Cycle was estimated to range from about 255.8 to about 414.7 MWe.

Power Generation of Illustrative Example 1 with Series Flow Flue Gas and Steam/Water Heat Exchanger versus Comparative Example 1

The total electrical power produced by the power plant of the design study of Illustrative Example 1 was calculated by adding the electrical power produced by the first power cycle (steam) and the electrical power produced by the second power cycle (carbon dioxide). The calculated total electrical power of the power plant of Illustrative Example 1 ranged from 536.4 to 695.3 MWe at full load.

The total electrical power per unit fuel produced by the power plant of the design study of Illustrative Example 1 was significantly greater than the electrical power per unit fuel produced by the electrical power plant of Comparative Example 1. The power plant of Illustrative Example 1 has a net electrical power output that ranges from 536.4 to 695.3 MWe at full load whereas the electrical power produced by the power plant of Comparative Example 1 was estimated at 404.8 MWe net plant output for the same fuel consumption. The power plant of Illustrative Example 1 was calculated to have a net electrical power output from 32 to 73% higher, per unit fuel, than the power plant of Comparative Example 1. The net plant efficiency basis fuel of the power plant of Illustrative Example 1 was estimated to be between 56 and 74% basis input fuel (132,291 kg/h at 25,724 kJ/kg or 945.3 MW fuel combustion power).

Illustrative Example 2

USC CFB Plant with Single Re-Heat Steam Design and Integrated Second Fluid Power Cycle Including Power Extraction from Flue Gas A design study was prepared based on thermodynamic calculations of a method and a system for producing electrical power using a first power cycle utilizing water/steam as the working fluid and a second power cycle utilizing carbon dioxide as a working fluid, where the method and system were in accordance with the present invention. In the first power cycle, a coal-fired heat source was utilized to produce ultra-supercritical steam for generation of electrical power followed by an integrated second fluid power cycle utilizing carbon dioxide as a working fluid. Power extracted from flue gas produced by burning coal was included in the power produced in the second power cycle.

In the first power cycle, the coal-fired steam turbine driven generator portion of the design study of Illustrative Example 2 replicated the design study of the USC CFB Plant of nominally 400 MWe capacity described in Comparative Example 1 above with the exception that: (a) the low pressure steam turbine was eliminated, (b) the four low pressure feed water pre-heaters were not included, and (c) steam extraction for operation of the auxiliary turbine was made either from the high pressure steam turbine cylinder or the intermediate pressure steam turbine cylinder. At full load conditions the input of combustion air, fuel, and sorbent are maintained as described in Comparative Example 1.

As a consequence of eliminating the low pressure steam turbine and the four low pressure feed water pre-heaters, the calculated quantity of electricity generated at full load by the steam turbine of the first power cycle was reduced. The calculated net power output from the steam turbine driven generator was reduced from 404.8 MWe to about 280.6 MWe, 69.3% relative to the net electrical power output calculated in Comparative Example 1.

In the design study of Illustrative Example 2, superheated steam was produced in a steam boiler heated by a combustion gas produced by firing coal in a coal-fired burner. The superheated steam was fed to the steam turbine system, modified by elimination of the low pressure steam turbine, to generate electrical power. Expanded steam exited the steam turbine system and was passed to a condenser where it was cooled to liquid water, and the liquid water was passed to a de-aerator via a low pressure water pump. The deaerated water was recycled to the steam boiler via a high pressure water pump.

In the design study of Illustrative Example 2, liquefied, pressurized carbon dioxide at temperature between 0 and 10° C. and pressure of about 30 MPa, was used as the coolant in the condenser, and was thermally contacted with steam in the condenser to produce liquid water from the steam. Thermal power was extracted from steam by the carbon dioxide in the condenser, increasing the temperature of the carbon dioxide significantly and producing supercritical carbon dioxide.

In the design study of Illustrative Example 2, a separate portion of liquefied, pressurized carbon dioxide at a temperature between 0 and 10° C. and a pressure of about 30 MPa was thermally contacted with hot flue gas in a heat exchanger to cool the hot flue gas to facilitate scrubbing of pollutants from the flue gas and to capture thermal power from the hot flue gas. The hot flue gas was produced by firing coal in the coal-fired burner to produce a combustion gas, and thermally contacting the combustion gas with water/steam in the steam boiler to produce the superheated steam and the hot flue gas. The hot flue gas was exhausted from the steam boiler to the heat exchanger for thermal contact with the liquefied, pressurized carbon dioxide. Water produced by the combustion of coal was condensed and recovered from the hot flue gas upon exchanging heat with the liquefied, pressurized carbon dioxide. Thermal power was extracted from the hot flue gas by the liquefied, pressurized carbon dioxide, increasing the temperature of the carbon dioxide significantly and producing supercritical carbon dioxide.

The heated pressurized supercritical carbon dioxide produced from the steam condenser was combined with the heated pressurized supercritical carbon dioxide produced from the flue gas heat exchanger, and the combined supercritical carbon dioxide stream was passed to an expander system including a dense fluid phase (two phase) expander where the carbon dioxide stream was expanded to a pressure of 0.55 MPa and a temperature of −55 C. Upon expansion, thermal power was extracted from the heated pressurized supercritical carbon dioxide as rotational mechanical power by the expander system. The mechanical power was utilized to drive an electrical generator to produce electrical power.

In the design study of Illustrative Example 2, cold liquid carbon dioxide discharged from the expander was recycled to the steam condenser and flue gas cooling heat exchanger by a return pump which discharged the cold liquid carbon dioxide at high pressure suitable to meet the flow requirements of the system (e.g. pressure greater than or equal to 30 MPa). The mass flow of the carbon dioxide through the steam condenser and the second power cycle was controlled to produce most of the carbon dioxide as a liquid upon expansion since it is highly advantageous that the expanded carbon dioxide be a liquid with only a very small fraction present as vapor (the vapor quality of the expanded carbon dioxide is very low). The advantage arises because pumping liquid carbon dioxide consumes far less power than compression and liquefaction of carbon dioxide vapor. High pressure liquid carbon dioxide, at temperature as low as −55 C, was warmed in a heat exchanger by thermal contact with a flue gas scrubbing solvent to a final temperature of 0 to 10 C prior to being returned to the steam condenser and flue gas cooling heat exchanger.

The resulting cold flue gas scrubbing solvent was injected into a scrubber where cooled de-watered flue gas was directly contacted with the cold scrubbing solvent to extract carbon dioxide, residual water, and pollutants including particulates, $SO_x$, $NO_x$ from the flue gas. Pollutant laden scrubbing solvent was pumped from the scrubbing tower to a regeneration system where it is stripped of pollutants, using conventional methods, and returned to the flue gas scrubbing system through the cold liquid carbon dioxide warming heat exchanger. Pollutants scrubbed from the flue gas were exported from the regeneration system. Carbon dioxide of combustion, if scrubbed from the flue gas, was recovered from the scrubbing solvent by pressurized distillation where carbon dioxide was recovered as a distilled liquefied gas and the scrubbing solvent is distilled to remove water.

Superheated Steam Cooling/Condensation/Recycle to Steam Boiler

In the design study of Illustrative Example 2, the net electrical power produced in the first power cycle using water/steam as a working fluid to capture thermal power from a combustion gas was calculated, where the steam turbine utilized to convert thermal power of the steam to mechanical power included a High Pressure Turbine stage and an Intermediate Pressure Turbine stage but no Low Pressure Turbine stage.

In the design study of Illustrative Example 2, calculations showed that steam exited the final stage of the steam turbine of the first power cycle (the Intermediate Pressure Turbine) at 282.8° C., 0.65 MPa, mass flow of 916,553.3 kg/h, and enthalpy 3024.8 kJ/kg. The Intermediate Pressure Turbine outlet steam was blended with three additional streams: (a) a first stream at 412.2° C., 5.89 MPa, mass flow of 8,163.3 kg/h, and enthalpy 3211.2 kJ/kg, (b) a second stream at 593.3° C., 5.44 MPa, mass flow of 7,256.2 kg/h, and enthalpy of 3647.7 kJ/kg, and (c) a stream at 401.7° C., 5.89 MPa, mass flow of 2,267.6 kg/h, and enthalpy of 3,184.6 kJ/kg. In Comparative Example 1, the additional streams were utilized to provide heat to four low pressure feed water heaters, as shown in FIG. 8 and the auxiliary turbine (which is driven in the Design Study of Illustrative Example 1 by steam extracted from either the high pressure steam turbine cylinder or the intermediate pressure steam turbine cylinder). The four low pressure feed water heaters were not required in the system of Illustrative Example 1 since the Low Pressure Turbine was eliminated and, as a result, water condensed from the Intermediate Pressure Turbine and the three streams was condensed at a temperature of 160° C. rather than 35° C. The combined steam flow streams were calculated to have mass flow rate of 934,240.4 kg/h, enthalpy of 3030.4 kJ/kg, temperature of 285.6° C., and pressure 0.65 MPa.

In the design study of Illustrative Example 2, the combined steam flow streams—directed to the low pressure turbine, the auxiliary turbine, and the low pressure boiler feed water heaters in Comparative Example 1—were cooled in a condenser to form liquid water at a temperature of 160° C., 0.65 MPa, and enthalpy of 675.5 kJ/kg. The enthalpy change upon cooling was calculated to be (3030.4−675.5) 2354.9 kJ/kg; the mass flow of steam to be cooled in the condenser was calculated to be 934,240.4 kg/h; and the resulting heat transfer rate in the condenser was calculated to be 2,200,042,718.0 kJ/h.

In the design study of Illustrative Example 2, the liquefied water stream at a temperature of 160° C., pressure of 0.65 MPa, enthalpy of 675.5 kJ/kg, density 907.5 kg/m$^3$ and mass flow rate of 934,240.4 kg/h was pumped by a low pressure boiler water feed pump into a de-aerator of the steam system; where the differential pressure across the low pressure boiler water feed pump was 0.65 MPa while the volumetric flow through the low pressure boiler water feed pump was 1029.5 m$^3$/h. The power consumption of the low pressure boiler water feed pump was ascertained to be less than about 1 MWm. A high pressure boiler water feed pump was used to further pressurize the deaerated boiler feed water from 1.30 MPa, 191.7° C., density of 874.3 kg/m$^3$, mass flow rate of 1,229,024.9 kg/h, and volumetric flow rate of 1405.7 m$^3$/h to 198.9° C., 37.1 MPa, density 890.3 kg/m$^3$, mass flow 1,229,024.9 kg/h, volumetric flow rate of 1380.5 m$^3$/h, and enthalpy of 863.8 kJ/kg. The power consumption of the high pressure boiler water feed pump was determined to be 18 MWm; where the high pressure boiler water feed pump was driven by power from the auxiliary steam turbine.

As stated in Comparative Example 1, the power required to pump boiler feed water to a discharge pressure of 37.1 MPa, at a rate of about 1400 m³/h, is about 20 MWt which is converted to mechanical rotational power by the auxiliary turbine.

In summary, electrical power was produced in the first power cycle of Illustrative Example 2 in the same manner as described in Illustrative Example 1.

Steam Boiler Flue Gas Cooling—Calculation of the Composition and Thermal Power of the Flue Gas Stream of Comparative Example 1

In the design study of Illustrative Example 2, the thermal power captured from recovery of heat from hot flue gas was included in the total thermal power captured from combustion of coal for production of electrical power. As shown in the design study of Comparative Example 1 (Table CE-1-5) flue gas was discharged from the power plant to the environment at a temperature of 117.8 C. The discharge of hot flue gas to the environment is a direct thermal power loss and leads to reduced efficiency of the power plant. Capture of the thermal power from flue gas requires exchange of heat from the flue gas to another stream at lower temperature. In the design study of Illustrative Example 2, liquefied, pressurized carbon dioxide having a temperature of from 0-10° C. and a pressure of about 30 MPa was used to capture thermal power from the hot flue gas.

The thermal power captured from the hot flue gas was calculated from the components comprising the flue gas stream, their heat capacities, their flow rates, and their change in temperature upon cooling to a temperature of 20° C. Calculation of the thermal power captured from the hot flue gas also included thermal power captured from the latent heat of condensation of water vapor present in the hot flue gas.

The components of the hot flue gas stream were determined from the components of the air and coal combusted to produce a combustion gas subsequently cooled by thermal contact with water/steam in the steam boiler to produce the hot flue gas, and the compounds produced upon combustion of the combustion air and the coal as well as depletion of components of the combustion air and coal that react to produce combustion compounds.

The components of the combustion air and their characteristics are provided in Table IE-2-1. As stated in the design study on which Comparative Example 1 is based, the input combustion air rate was 1,373,696 kg/h with humidity 55%, wet bulb temperature 12.2 C and dry bulb temperature 17.2 C. For the design study of Illustrative Example 2, combustion air having the same characteristics as the combustion air of Comparative Example 1 was used, where the water content of the combustion air was estimated by averaging the wet and dry bulb temperatures of the combustion air provided in the design study on which Comparative Example 1 is based and rounding to 15 C. The saturation pressure of water vapor in air at 15 C is 0.01062 kg water/kg air and it was calculated that each kilogram of combustion air carried 0.0058 kg water.

TABLE IE-2-1

Characteristics of Combustion Air

| Compound | Weight Fraction | Heat Capacity | Units |
|---|---|---|---|
| Nitrogen | 0.7507 | 1.04 | kJ/(kg · K) |
| Oxygen | 0.2302 | 0.919 | kJ/(kg · K) |
| Argon | 0.0127 | 0.52 | kJ/(kg · K) |
| Carbon Dioxide | 0.0006 | 0.844 | kJ/(kg · K) |

TABLE IE-2-1-continued

Characteristics of Combustion Air

| Compound | Weight Fraction | Heat Capacity | Units |
|---|---|---|---|
| Sulfur Dioxide | | 0.64 | kJ/(kg · K) |
| Water Vapor | 0.0058 | 1.97 | kJ/(kg · K) |
| Water Latent Heat of Vaporization/Condensation | | 2260 | kJ/kg |
| Water Liquid | | 4.1813 | kJ/(kg · K) |

The composition of the flue gas was computed from the input coal ultimate analysis, Table IE-2-1, the combustion air composition, and the following combustion reactions.

Water→$H_2O$ Water contained in coal is recovered as water
Carbon+$O_2$→$CO_2$ Carbon contained in coal is converted to carbon dioxide
Hydrogen+$O_2$→$H_2O$ Hydrogen contained in coal is converted to water
Nitrogen→$N_2$ Nitrogen contained in coal is recovered as molecular nitrogen
Chlorine→no reaction Chlorine contained in coal is retained in the ash
Sulfur+$O_2$→$SO_2$ Sulfur contained in coal is converted to sulfur dioxide and retained in the ash For purposes of calculating the thermal power recovered from the hot flue gas, ash was excluded from the flue gas composition since the ash is separated from the hot flue gas prior to cooling the hot flue gas with the liquefied, pressurized carbon dioxide. The $SO_2$ and chlorine components of the coal are largely retained in the ash. The retention of those species occurs because carbon dioxide is released from the limestone sorbent at the high temperature of the Circulating Fluidized Bed permitting formation of sulfate and chloride minerals in the ash. Therefore, $SO_2$ and chlorine were excluded from the flue gas composition for the purpose of establishing the enthalpy of the flue gas stream to determine the thermal power captured from the flue gas stream by heat exchange with the liquefied pressurized carbon dioxide. $NO_x$ was also excluded from the flue gas composition for the purpose of establishing the enthalpy of the flue gas stream because the absolute mass quantity of $NO_x$ on an hourly basis was very small.

Table IE-2-2 provides the components and characteristics of the flue gas at a flue gas rate of 1,487,912 kg/h (at a combustion air input rate that provides a nominally 20% stoichiometric excess of oxygen relative to the oxygen required for complete combustion with the fuel).

TABLE IE-2-2

Characteristics of Flue Gas at nominally 20% Stoichiometric Excess Oxygen

| Compound | Weight Fraction | Input Rates, kg/h | Flow Rate, kg/h |
|---|---|---|---|
| Nitrogen from Air | 0.7507 | 1,373,696 | 1,031,234 |
| Oxygen from Air | 0.2302 | 1,373,696 | 316,225 |
| Oxygen Consumption | | | <267,228> |
| Residual Oxygen | | | 48,997 |
| Argon from Air | 0.0127 | 1,373,696 | 17,446 |
| $CO_2$ from Air | 0.0006 | 1,373,696 | 824 |
| $CO_2$ from Coal Combustion | 0.6375 × (44/12) | 132,291 | 309,230 |
| $CO_2$ from Limestone | 0.3720 | 26,554 | 9,878 |
| Total $CO_2$ | | | 319,932 |
| $H_2O$ from Air | 0.0058 | 1,373,696 | 7,967 |
| $H_2O$ from Coal | 0.1112 | 132,291 | 14,711 |

TABLE IE-2-2-continued

Characteristics of Flue Gas at nominally 20% Stoichiometric Excess Oxygen

| Compound | Weight Fraction | Input Rates, kg/h | Flow Rate, kg/h |
|---|---|---|---|
| $H_2O$ from Coal Combustion | 0.045 × (32/4) | 132,291 | 47,625 |
| Total $H_2O$ | | | 70,303 |
| Total Flue Gas Flow Rate | | | 1,487,912 |

Oxygen consumption was computed by multiplying the mass of input carbon from coal, in kg/h, by the ratio of the molecular weight of oxygen ($O_2$) and atomic carbon (C) (e.g. 32/12) and the input hydrogen from coal, in kg/h, by the ratio of the molecular weight of oxygen ($O_2$) and atomic hydrogen (e.g. 32/4) required to produce water from the hydrogen input as a component of the coal fuel.

The computed total flue gas flow rate was slightly lower than that provided in Comparative Example 1 (1,494,784.6 kg/h); the values agree within about 0.5%. The computed excess oxygen content, relative to consumed oxygen, was 18.3%; somewhat less than the 20% target level stated in Comparative Example 1.

The thermal power recovered upon cooling the flue gas stream having the composition as shown in Table IE-2-2—above from 117.8 to 20 C was calculated based on the components comprising the flue gas stream, their heat capacities, their flow rates, and their change in temperature. Water vapor in the hot flue gas stream undergoes a phase change to liquid water upon cooling, and the latent heat of condensation (vaporization) was included in the calculation of the thermal power recovered upon cooling the hot flue gas. The thermal power recovered upon cooling the hot flue gas from 117° C. to 20° C. was calculated to be 89.3 MWt, as shown in Table IE-2-3 below.

TABLE IE-2-3

Thermal Power Recovered Upon Cooling flue Gas from 117.8 to 20 C.

| Compound | Flow Rate, kg/h | Heat Capacity, kJ/(kg · K) | Thermal Power, kJ/h | Percent of Total |
|---|---|---|---|---|
| Nitrogen | 1,031,234. | 1.04 | 104,888,873 | 32.6 |
| Oxygen | 48,997 | 0.919 | 4,403,762 | 1.4 |
| Argon | 17,446 | 0.52 | 887,234 | 0.3 |
| $CO_2$ | 319,932 | 0.844 | 26,408,211 | 8.2 |
| $H_2O$ | 70,303 | 1.97 | 2,465,245 | 0.8 |
| Water Latent Heat of Vaporization/Condensation | | 2260 kJ/kg | 158,884,780 | 49.4 |
| Water Liquid | | 4.1813 | 23,516,635 | 7.3 |
| Thermal Power Recovery on Cooling Flue Gas, kJ/h | | | 321,454,739 | |
| Total Thermal Power Recovery on Cooling Flue Gas to 20 C., MWt | | | 89.3 | |

It is clear from Table IE-2-3, and it is notable, that condensation of water vapor and thereafter cooling of liquid water was a major contributor to the thermal power captured by cooling the flue gas stream, and lost as waste heat in the process of the design study of Comparative Example 1.

Power Production in the Second Power Cycle Using Carbon Dioxide as a Working Fluid In the design study of Illustrative Example 2, the electrical power produced in the second power cycle using carbon dioxide as a working fluid to capture thermal power from the expanded steam in the condenser and from the hot flue gas stream in a heat exchanger was calculated.

Liquid carbon dioxide was used as the heat exchange fluid (coolant) in the steam condenser to condense steam of the first power cycle to liquid water. It was supplied to the steam condenser at an inlet temperature of 5 C, pressure of 30 MPa, and enthalpy of 203.3 kJ/kg. Supercritical carbon dioxide was calculated to be produced from the condenser at a temperature of about 193.6 C, pressure of 30 MPa, and enthalpy of 560.3 kJ/kg. The enthalpy change of carbon dioxide upon transit through the condenser was calculated as 357.0 kJ/k, and the flow rate of liquid carbon dioxide required to uptake 2,200,042,718 kJ/h, while cooling the steam/water stream to 160 C from 285.5 C, was calculated as 6,162,584.6 kg/h. The heat transfer efficiency from steam/water to carbon dioxide coolant was assumed to be 100% and the condenser was assumed to provide negligible pressure drop.

Liquid carbon dioxide was also used as the heat exchange fluid (coolant) in the flue gas heat exchanger to cool the flue gas. It was supplied to the flue gas heat exchanger at an inlet temperature of 5 C, pressure of 30 MPa, and enthalpy of 203.3 kJ/kg. Super critical carbon dioxide was calculated to be produced from the flue gas heat exchanger at a temperature of about 50 C, pressure of 30 MPa, and enthalpy of 289.9 kJ/kg. The enthalpy change of carbon dioxide upon transit through the heat exchanger was calculated as 86.6 kJ/k, and the flow rate of liquid carbon dioxide required to uptake 321,454,739 kJ/h while cooling the flue gas stream to 20 C from 117.8 C was calculated as 3,711,948.5 kg/h. The heat transfer efficiency from flue gas to carbon dioxide coolant was assumed to be 100%.

Expansion of Supercritical Carbon Dioxide

The supercritical carbon dioxide stream from the steam condenser (6,162,584.6 kg/h, 193.6 C, 30 MPa, and enthalpy of 560.3 kJ/kg) and the supercritical carbon dioxide stream from the flue gas heat exchanger (3,711,948.5 kg/h, 50 C, 30 MPa, and enthalpy of 289.9 kJ/kg) were blended to produce a single supercritical carbon dioxide stream whose flow rate was 9,874,533.1 kg/h, 134.0 C, 30 MPa, and weight averaged enthalpy of 458.7 kJ/kg. The supercritical carbon dioxide fluid was routed to a multi stage, dense fluid phase, isentropic expander driving an electrical generator. The supercritical carbon dioxide was expanded to a discharge pressure of 0.55 MPa. The combined mass flow rate of carbon dioxide fluid was calculated as 9,874,533.1 kg/h. The properties of the carbon dioxide fluid stream as it transits the multi-stage dense fluid phase expander were calculated and are summarized in Table IE-2-4.

TABLE IE-2-4

Properties of Carbon Dioxide as it Transits the Expander Isochoric Data for D = 538.4 kg/m³

| Expansion Stage | Temperature, C. | Pressure, MPa | Enthalpy, kJ/kg | Quality |
|---|---|---|---|---|
| Stage 1 inlet | 134.0 | 30.0 | 458.7 | Supercritical |
| Stage 1 Outlet | 31.5 | 7.49 | 318.2 | Supercritical |
| Stage 2 Inlet | | | | |
| Stage 2 Outlet | 4.6 | 3.93 | 232.3 | 0.10 |
| Stage 3 Inlet | | | | |
| Stage 3 Outlet | −20.2 | 1.96 | 167.6 | 0.05 |
| Stage 4 Inlet | | | | |
| Stage 4 Outlet | −40.6 | 0.98 | 119.9 | 0.03 |
| Stage 5 Inlet | | | | |
| Stage 5 Outlet | −55.0 | 0.55 | 88.3 | 0.02 |
| Overall Change | −189.0 | 29.45 | −370.4 | 0.98 |

Calculations indicated that the low temperature expanded carbon dioxide was produced as a liquid at a temperature of −55.0 C, a pressure of 0.55 MPa, an enthalpy of 88.3 kJ/kg, a density of 1172.9 kg/m$^3$, at a mass flow rate of 9,874,533.1 kg/h, and at a volumetric flow rate of 8,418.9 m$^3$/h.

In the design study of Illustrative Example 2, cold carbon dioxide liquid was collected at the dense fluid phase expander outlet, pumped through a heat exchanger to reheat to 5 C, and reintroduced to the steam condenser and flue gas heat exchanger at 5 C and 30 MPa to re-enter the circuit of the second fluid integrated power cycle.

Mechanical power consumed to pump 8,418.9 m$^3$/h of carbon dioxide was estimated, based on the computed slope of 3.42×10$^{-4}$ MWm/(m$^3$/h) per megapascal differential pressure across the pump as calculated in Illustrative Example 1. This value was used to estimate the pumping power for liquid carbon dioxide to recycle with the second power cycle. Similar to Illustrative Example 1, the power required to pump liquid carbon dioxide for recycle was not the only large power consuming step when recycling liquid carbon dioxide in the second fluid power cycle; it was also necessary to re-compress the small fraction of carbon dioxide produced as a gas from the second fluid power cycle.

The power to pump liquid carbon dioxide, as if no vapor were present in the expander exhaust, was computed as a function of the pump differential pressure as described above; then, the value was down rated by the fraction of liquid carbon dioxide formed. The mechanical power required to pump the liquid carbon dioxide was calculated to be 83.1 MWm according to the following equation.

Liquid Pumping Power=(3.42×10$^{-4}$ MW/(m$^3$/h·MPa))(8,418.9 m$^3$/h)×(29.45 MPa)×(0.98)=83.1 MWm The power required for compression and liquefaction of carbon dioxide vapor was assumed to be 10 times that of the liquid carbon dioxide pumping power. In this way the compression power was sensitive to the final pressure and scaled to the fraction of carbon dioxide vapor formed at the expander outlet. The mechanical power required to liquefy the gaseous carbon dioxide was calculated to be 10.0 MWm according to the following equation:

Compression Power=(3.42×10$^{-4}$ MW/(m$^3$/h·MPa))(8,418.9 m$^3$/h)×(29.45 MPa)×(0.02)×10=17.0 MWm The total mechanical power required to pump liquid carbon dioxide and compress gaseous carbon dioxide for recycle in the second power cycle was calculated to be 100.1 MWm.

Power Recovery from the Carbon Dioxide Expander

The electrical power generation from expansion of the carbon dioxide through the dense fluid phase expander was calculated. The net mechanical power (rotational) produced by expansion of the supercritical carbon dioxide through the dense phase fluid expander was calculated by subtracting the mechanical power required to recycle the liquid and gas components of carbon dioxide stream produced at the outlet of dense phase fluid expander in the second power cycle from the mechanical power produced by expansion of the supercritical carbon dioxide through the dense fluid phase isentropic expander. The electrical power produced by expansion of the supercritical carbon dioxide in the dense fluid phase isentropic expander was calculated from the net mechanical power as converted to electrical power by driving a generator whose efficiency was assumed to be 99%.

The thermal power produced by expansion of the supercritical carbon dioxide across the dense phase fluid isentropic expander was calculated from the enthalpy change of carbon dioxide across the expander and the mass flow of carbon dioxide through the expander. The enthalpy change of carbon dioxide across the expander was calculated as 370.4 kJ/kg, and the mass flow of carbon dioxide through the expander was calculated as 9,874,533.1 kg/h. The thermal power of expansion of the supercritical carbon dioxide across the expander was calculated as 3,657,527,060 kJ/h or 1016 MWt.

The total mechanical power produced by expansion of the supercritical carbon dioxide across the dense fluid phase expander was calculated from the thermal power produced by expansion of the supercritical carbon dioxide across the dense fluid phase expander. The efficiency for conversion of thermal power to rotational mechanical power of the multi stage, dense fluid phase, isentropic expander was ascertained to be about 40-60%. The total mechanical power produced by expansion of the supercritical carbon dioxide across the dense fluid phase expander was estimated to range from 406.4 to 609.6 MWm. The net mechanical power provided by expansion of the supercritical carbon dioxide across the dense phase fluid expander was calculated as being in a range from 306.3 to 509.5 MWm by subtracting the mechanical power required for operation of the liquid carbon dioxide pump and compressor from the total mechanical power.

Assuming about 1% losses in the electrical generator, the quantity of electrical power generated in the second power cycle (carbon dioxide) was estimated to range from about 303.2 to about 504.4 MWe.

Power Generation of Illustrative Example 2 versus Comparative Example 1

The total electrical power produced by the power plant of the design study of Illustrative Example 2 was calculated by adding the electrical power produced by the first power cycle (steam) and the electrical power produced by the second power cycle (carbon dioxide). The calculated total electrical power of the power plant of Illustrative Example 2 ranged from 583.8 to 785.0 MWe at full load. The net plant efficiency basis fuel is estimated to be between 61 and 83% basis input fuel (coal feed rate 132,291 kg/h at 25,724 kJ/kg or 945.3 MW fuel combustion power).

The power plant of Illustrative Example 2 yields 44% to 94% more power per unit fuel relative to Comparative Example 1, which provided 404.8 MWe net plant electrical power output for the same fuel consumption.

Power Generation of Illustrative Example 2 versus Illustrative Example 1

The power plant of Illustrative Example 2 had a calculated maximum net electrical power output that ranged from 583.8 to 785.0 MWe at full load whereas the power plant of Illustrative Example 1 had a calculated net maximum net electrical power output that ranged from 536.4 to 695.3 MWe for the same fuel consumption. The power plant of Illustrative Example 2 yields 8 to 13% more electrical power per unit fuel relative to Illustrative Example 1.

Illustrative Example 3

USC CFB Plant with Single Re-Heat Steam Design and Integrated Second Fluid Power Cycle including Power Extraction from Flue Gas—Flue Gas Heat Exchanger in Series Flow configuration with Steam/Water Condenser In Illustrative Example 3, the design study of Illustrative Example 2 was modified in one respect—the flue gas heat exchanger was placed in a series flow configuration with the steam condenser, where liquid pressurized carbon dioxide having a temperature of from 0 to 10° C. and a pressure of 30 MPa was provided to the flue gas heat exchanger, and the carbon dioxide stream exiting the flue gas heat exchanger was provided to the steam condenser to cool and condense liquid water from the steam provided to the steam condenser. The heated supercritical carbon dioxide exiting the steam condenser was then expanded in the second fluid power cycle. The system and method of the design study prepared in Illustrative Example 3 were in accordance with the system and method of the present invention.

The electrical power produced by the modified design was calculated based on thermodynamic modeling.

The conditions and power produced in the first power cycle utilizing water/steam as the working fluid and recycling the water are set forth in Illustrative Example 2. The net electrical power produced in the first power cycle was calculated as 280.6 MWe.

The electrical power generated in the second power cycle was calculated based on the thermal power produced by thermally contacting the liquefied pressurized carbon dioxide with the flue gas stream and then with the steam from the first power cycle, expanding the resulting heated supercritical carbon dioxide through an expander system having a dense phase fluid (two phase) expander to generate electrical power, and subtracting power required to pump and condense the expanded carbon dioxide for recycle through the second power cycle.

The flue gas composition, flow rate, and thermal power was the same as in Illustrative Example 2. Flue gas was produced at a rate of 1,487,912 kg/h. The flue gas was cooled from 117.8 C to 20 C in a heat exchanger by thermal contact with liquid pressurized carbon dioxide have a temperature of from 0° C. to 10° and a pressure of 30 MPa. The heat transfer rate between the flue gas and the carbon dioxide in the heat exchanger was 321,454,739 kJ/h. The steam temperature, pressure, flow rate, and thermal power entering the condenser in the first power cycle for condensation by thermal contact with the carbon dioxide was the same as in Illustrative Examples 1 and 2. The steam was produced at a flow rate of 934,240.4 kg/h. The steam was cooled from 285.6° C. to 160° C. at a pressure of 0.65 MPa to condense liquid water from the steam. The enthalpy change upon cooling of the steam stream is 2354.9 kJ/kg and the resulting heat transfer rate between the steam and carbon dioxide in the condenser was 2,200,042,718.0 kJ/h.

The Liquefied Carbon Dioxide Coolant System

The total thermal power to be recovered from the flue gas heat exchanger in series with the steam condenser was calculated as (321,454,739+2,200,042,718.0) 2,521,497,457 kJ/h. The initial temperature and enthalpy of the carbon dioxide prior to thermally contacting the carbon dioxide with the flue gas and the steam were 5° C. and 203.3 kJ/kg, respectively. The temperature and enthalpy of the carbon dioxide after thermal contact with the flue gas and the steam was calculated as 193.6 C and 560.3 kJ/kg, respectively. The flow rate of carbon dioxide was calculated by dividing the total thermal power to be recovered by the enthalpy change per kilogram of coolant-357 kJ/kg. The calculated flow rate of carbon dioxide coolant was 7,063,018 kg/h.

Liquid carbon dioxide was input to the flue gas heat exchanger at a temperature of 5° C., a pressure of 30 MPa, and a flow rate of 7,063,018 kg/h, where the enthalpy of liquid carbon dioxide was calculated as 203.3 kJ/kg. The enthalpy of the input liquid carbon dioxide was calculated to be increased by 45.5 kJ/kg upon thermal contact with the flue gas in the flue gas heat exchanger. The effluent supercritical carbon dioxide from the flue gas heat exchanger, at a flow rate of 7,063,018 kg/h, was calculated to have a temperature of about 29 C, a pressure of 30 MPa, an enthalpy of about 248.8 kJ/kg, and a density of about 951.7 $kg/m^3$.

The quantity of thermal power to be recovered by thermally contacting the supercritical carbon dioxide effluent from the flue gas heat exchanger with the steam of the first power cycle in the condenser to produce liquid water was 2,200,042,718 kJ/h. The enthalpy change of the supercritical carbon dioxide upon transit of the condenser was calculated as 311.5 kJ/kg. Effluent supercritical carbon dioxide from the condenser was calculated to have a temperature of 193.6 C, an enthalpy of 560.3 kJ/kg, and a flow rate of 7,063,018 kg/h.

Expansion of Supercritical Carbon Dioxide

In the design study of Illustrative Example 3, the supercritical carbon dioxide stream from the series flow flue gas heat exchanger and the condenser (7,063,018 kg/h, 193.6 C, 30 MPa, and enthalpy of 560.3 kJ/kg) was routed to a multi stage, dense fluid phase, isentropic expander driving an electrical generator. The calculated temperature, pressure, enthalpy, and vapor quality properties of the carbon dioxide stream as it traversed the expander are summarized in Table IE-3-1.

TABLE IE-3-1

Properties of Carbon Dioxide as it Transits the Expander
Isochoric Data for D = 400 $kg/m^3$

| Expansion Stage | Temperature, C. | Pressure, MPa | Enthalpy, kJ/kg | Vapor Quality |
|---|---|---|---|---|
| Stage 1 inlet | 193.6 | 30.0 | 560.3 | Supercritical |
| Stage 1 Outlet | 34.4 | 7.88 | 356.5 | Supercritical |
| Stage 2 Inlet | | | | |
| Stage 2 Outlet | 4.4 | 3.91 | 249.7 | 0.17 |
| Stage 3 Inlet | | | | |
| Stage 3 Outlet | −20.2 | 1.96 | 177.4 | 0.08 |
| Stage 4 Inlet | | | | |
| Stage 4 Outlet | −40.6 | 0.98 | 125.3 | 0.04 |
| Stage 5 Inlet | | | | |
| Stage 5 Outlet | −55.0 | 0.55 | 91.6 | 0.02 |
| Overall Change | −248.6 | 29.45 | −468.7 | 0.98 |

Calculations indicated that the low temperature expanded carbon dioxide was produced as a liquid at a temperature of −55.0 C, a pressure of 0.55 MPa, an enthalpy of 91.6 kJ/kg, a density of 1172.9 $kg/m^3$, at a mass flow rate of 7,063,018 kg/h, and at a volumetric flow rate of 6,021.8 $m^3/h$.

In the design study of Illustrative Example 3, cold carbon dioxide liquid was collected at the dense fluid phase expander outlet, pumped through a heat exchanger to reheat to 5 C, and reintroduced to the steam condenser and flue gas heat exchanger at 5 C and 30 MPa to re-enter the circuit of the second fluid integrated power cycle.

Mechanical power consumed to pump 6021.8 $m^3/h$ of liquid carbon dioxide was estimated, based on the computed slope of $3.42 \times 10^{-4}$ MWt/($m^3/h$) per megapascal differential pressure across the pump as calculated in Illustrative Example 1. This value was used to estimate the pumping power for liquid carbon dioxide to recycle with the second power cycle. Similar to Illustrative Example 1, the power required to pump liquid carbon dioxide for recycle was not the only large power consuming step when recycling liquid carbon dioxide in the second fluid power cycle; it was also necessary to re-compress the small fraction of carbon dioxide produced as a gas from the second fluid power cycle.

The power to pump liquid carbon dioxide, as if no vapor were present in the expander exhaust, was computed as a function of the pump differential pressure as described above; then, the value was down rated by the fraction of liquid carbon dioxide formed. The mechanical power required to pump the liquid carbon dioxide was calculated to be 59.4 MWm according to the following equation.

Liquid Pumping Power=$(3.42\times10^{-4}$ MW/(m$^3$/h·MPa)) $(6021.8$ m$^3$/h)$\times(29.45$ MPa)$\times(0.98)=59.4$ MWm The power required for compression and liquefaction of carbon dioxide vapor was assumed to be 10 times that of the liquid carbon dioxide pumping power. In this way the compression power was sensitive to the final pressure and scaled to the fraction of carbon dioxide vapor formed at the expander outlet. The mechanical power required to liquefy the gaseous carbon dioxide was calculated to be 12.1 MWm according to the following equation:

Compression Power=$(3.42\times10^{-4}$ MW/(m$^3$/h·MPa)) $(6021.8$ m$^3$/h)$\times(29.45$ MPa)$\times(0.02)\times10=12.1$ MWm The total mechanical power required to pump liquid carbon dioxide and compress gaseous carbon dioxide for recycle in the second power cycle was calculated to be 71.5 MWm.

The high pressure cold carbon dioxide liquid produced by pumping the liquid carbon dioxide effluent from the dense fluid phase expander and compressing the carbon dioxide vapor effluent from the dense fluid phase expander was pumped through a heat exchanger to be heat the liquid carbon dioxide to 5 C. The high pressure cold liquid carbon dioxide was thermally contacted with a flue gas scrubbing solvent in the heat exchanger to heat the cold liquid carbon dioxide to 5° C. and to cool the flue gas scrubbing solvent. The reheated liquid carbon dioxide was then reintroduced to the flue gas heat exchanger at 5 C and 30 MPa to re-enter the circuit of the second fluid integrated power cycle.

The cold flue gas scrubbing solvent was injected into a scrubbing tower where cooled de-watered flue gas exiting the flue gas heat exchanger was directly contacted with the cold scrubbing solvent to extract a portion of the carbon dioxide generated by combustion from the flue gas. Carbon dioxide was then removed from the scrubbing solvent by pressurized distillation, and the scrubbing solvent was recirculated to the cold liquid carbon dioxide/scrubbing solvent heat exchanger.

Power Recovery from the Carbon Dioxide Expander

The electrical power generation from expansion of the carbon dioxide through the dense fluid phase expander was calculated. The net mechanical power (rotational) produced by expansion of the supercritical carbon dioxide through the dense phase fluid expander was calculated by subtracting the mechanical power required to recycle the liquid and gas components of carbon dioxide stream produced at the outlet of dense phase fluid expander in the second power cycle from the mechanical power produced by expansion of the supercritical carbon dioxide through the dense fluid phase isentropic expander. The electrical power produced by expansion of the supercritical carbon dioxide in the dense fluid phase isentropic expander was calculated from the net mechanical power as converted to electrical power by driving a generator whose efficiency was assumed to be 99%.

The thermal power produced by expansion of the supercritical carbon dioxide across the dense phase fluid isentropic expander was calculated from the enthalpy change of carbon dioxide across the expander and the mass flow of carbon dioxide through the expander. The enthalpy change of carbon dioxide across the expander was calculated as 468.7 kJ/kg, and the mass flow of carbon dioxide through the expander was calculated as 7,063,018 kg/h. The thermal power of expansion of the supercritical carbon dioxide across the expander was calculated as 3,310,436,536.6 kJ/h or 919.6 MWt.

The total mechanical power produced by expansion of the supercritical carbon dioxide across the dense fluid phase expander was calculated from the thermal power produced by expansion of the supercritical carbon dioxide across the dense fluid phase expander. The efficiency for conversion of thermal power to rotational mechanical power of the multi stage, dense fluid phase, isentropic expander was ascertained to be about 40-60%. The total mechanical power produced by expansion of the supercritical carbon dioxide across the dense fluid phase expander was estimated to range from 367.8 to 551.7 MWm. The net mechanical power provided by expansion of the supercritical carbon dioxide across the dense phase fluid expander was calculated as being in a range from 296.3 to 480.2 MWm by subtracting the mechanical power required for operation of the liquid carbon dioxide pump and compressor from the total mechanical power.

Assuming about 1% losses in the electrical generator, the quantity of electrical power generated in the second power cycle utilizing carbon dioxide as the working fluid was estimated to range from about 293.3 to about 475.4 MWe.

Power Generation of Illustrative Example 3 with Series Flow Flue Gas and Steam Cooling and Condensing Heat Exchanger Steam/Water Heat Exchanger versus Comparative Example 1

The total electrical power produced by the power plant of the design study of Illustrative Example 3 was calculated by adding the electrical power produced by the first power cycle (steam) and the electrical power produced by the second power cycle (carbon dioxide). The calculated total electrical power of the power plant of Illustrative Example 3 ranged from 573.9 to 756.0 MWe at full load. The net plant efficiency basis fuel is estimated to be between 60 and 80% basis input fuel (coal feed rate 132,291 kg/h at 25,724 kJ/kg or 945.3 MW fuel combustion power).

The power plant of Illustrative Example 3 yields 41% to 87% more power per unit fuel relative to Comparative Example 1, which provided 404.8 MWe net plant electrical power output for the same fuel consumption.

Power Generation of Illustrative Example 3 with Series Flow Flue Gas and Steam Cooling and Condensing Heat Exchanger Steam/Water Heat Exchanger versus Illustrative Example 2 with Parallel Flow Flue Gas and Steam Water Heat Exchangers The power plant of Illustrative Example 3 has a maximum net power output that ranges from 573.9 to 756.0 MWe at full load whereas the power plant of Illustrative Example 2 has a maximum net power output that ranges from 583.8 to 785.0 MWe at full load output for the same fuel consumption.

The power plant of Illustrative Example 3 yields about 2 to 4% less power than the power plant of Illustrative Example 2.

Illustrative Example 4A through 4E

USC CFB Plant with Single Re-Heat Steam Design and Integrated Second Fluid Power Cycle including Power Extraction from Flue Gas In Illustrative Example 4, the design study of Illustrative Example 3 was modified in one respect—the pressure of the supercritical carbon dioxide entering the second power cycle expander system was reduced to 25, 20, 15, 10, and 5 MPa to determine the effect of the carbon dioxide working fluid pressure on electrical power production. The system and method of the design study of Illustrative Example 4 were in accordance with the system and method of the present invention. In the second power cycle, the flue gas heat exchanger preceded the steam condenser in a single series flow path for coolant carbon dioxide.

The electrical power produced by the modified design was calculated based on thermodynamic modeling.

The conditions and power produced in the first power cycle utilizing water/steam as the working fluid and recycling the water are set forth in Illustrative Example 2. The net electrical power produced in the first power cycle was calculated as 280.6 MWe.

The electrical power generated in the second power cycle was calculated based on the thermal power produced by thermally contacting the liquefied pressurized carbon dioxide with the flue gas stream and then with the steam from the first power cycle, expanding the resulting heated supercritical carbon dioxide through an expander system having a dense phase fluid (two phase) expander to generate electrical power, and subtracting power required to pump and condense the expanded carbon dioxide for recycle through the second power cycle.

The flue gas composition, flow rate, and thermal power was the same as in Illustrative Example 2. Flue gas was produced at a rate of 1,487,912 kg/h. The flue gas was cooled from 117.8 C to 20 C in a heat exchanger by thermal contact with liquid pressurized carbon dioxide having a temperature of from 0° C. to 10° and a pressure of 30 MPa. The heat transfer rate between the flue gas and the carbon dioxide in the heat exchanger was 321,454,739 kJ/h. The steam temperature, pressure, flow rate, and thermal power entering the condenser in the first power cycle for condensation by thermal contact with the carbon dioxide was the same as in Illustrative Examples 1 and 2. The steam was produced at a flow rate of 934,240.4 kg/h. The steam was cooled from 285.6° C. to 160° C. at a pressure of 0.65 MPa to condense liquid water from the steam. The enthalpy change upon cooling of the steam stream is 2354.9 kJ/kg and the resulting heat transfer rate between the steam and carbon dioxide in the condenser was 2,200,042,718.0 kJ/h.

The overall quantity of thermal power to be recovered from the flue gas and the steam by the carbon dioxide in the second power cycle was calculated as 2,521,497,457 kJ/h, where it was assumed that there was negligible carbon dioxide pressure drop across the flue gas heat exchanger and the steam condenser. The temperature of liquid carbon dioxide input to the flue gas heat exchanger was 5 C while the final temperature of supercritical carbon dioxide exiting the steam condenser was calculated to range from 193.6° C. to 199.7° C. The flow rate of carbon dioxide passed in series through the flue gas heat exchanger and the steam condenser required to recover 2,521,497,457 kJ/h of thermal power at a carbon dioxide pressure of 25 MPa, 20 MPa, 15 MPa, 10 MPa, and 5 MPa was calculated and is as shown in Table IE-4-1.

TABLE IE-4-1

Temperature, Pressure, Enthalpy, of Liquid $CO_2$ at the Inlet and Outlet of the Heat Exchanger System and Computed Flow $CO_2$ Rate to uptake 2,521,497,457 kJ/h

| Illustrative Example | Inlet Liquid $CO_2$ Temperature, C. | Pressure, MPa | Inlet $CO_2$ Enthalpy, kJ/kg | Outlet $CO_2$ Temperature, C. | Outlet $CO_2$ Enthalpy, kJ/kg | $CO_2$ Flow Rate, kg/h | $CO_2$ Flow Rate, $m^3/h$ |
|---|---|---|---|---|---|---|---|
| 4A | 5 | 25.0 | 203.1 | 194.0 | 573.9 | 6,800,155 | 5,798 |
| 4B | 5 | 20.0 | 203.4 | 198.2 | 595.4 | 6,432,391 | 5,484 |
| 4C | 5 | 15.0 | 204.4 | 199.7 | 614.1 | 6,154,497 | 5,247 |
| 4D | 5 | 10.0 | 206.6 | 193.6 | 624.7 | 6,030,848 | 5,142 |
| 4E | 5 | 5.0 | 211.0 | 193.6 | 643.5 | 5,830,052 | 4,971 |

Expander Outlet Conditions are held constant at −55.0 C, 0.55 MPa, Density liquid $CO_2$ = 1172.9 kg/$m^3$.

In the design study of Illustrative Example 4, the supercritical carbon dioxide that exited the steam condenser was passed through a multi-stage dense fluid phase expander to generate mechanical power from the thermal power contained in the supercritical carbon dioxide. Thermal power captured by expansion of the supercritical carbon dioxide through the dense fluid phase expander was calculated from the enthalpy change across the expander multiplied by the flow rate through the expander, as presented in Table IE-4-2.

TABLE IE-4-2

Calculated Thermal Power Capture at the Expander as a function of Inlet Pressure at Nominally Constant Expander Inlet Temperature

| Expander Inlet T, C. | Expander Inlet P, MPa | $CO_2$ Isochoric Density, kg/$m^3$ | Flow Rate, kg/h | Expander Inlet Enthalpy, kJ/kg | Expander Outlet Enthalpy, kJ/kg | Expander Thermal Power Capture, kJ/h |
|---|---|---|---|---|---|---|
| 194.0 | 25.0 | 335 | 6,800,155 | 573.9 | 94.1 | 3,262,714,347 |
| 198.2 | 20.0 | 260 | 6,432,391 | 595.4 | 98.5 | 3,196,255,322 |
| 199.7 | 15.0 | 190 | 6,154,497 | 614.1 | 105.9 | 3,127,715,420 |
| 193.6 | 10.0 | 125 | 6,030,848 | 624.7 | 120.0 | 3,043,768,875 |
| 193.6 | 5.0 | 60 | 5,830,052 | 643.5 | 164.8 | 2,790,845,856 |

Note:
Expander Outlet Conditions are held constant at −55.0 C, 0.55 MPa, Density liquid $CO_2$ = 1172.9 kg/$m^3$.

The temperature, pressure, enthalpy, and vapor quality properties of the carbon dioxide stream at an expander inlet pressure of 25 MPa as it traversed the expander are summarized in Table IE-4-3 as Illustrative Example 4A. Calculations indicated that the low temperature expanded carbon dioxide of Illustrative Example 4A was produced at the expander outlet as a liquid at a temperature of −55.0 C, 0.55 MPa, an enthalpy of 91.6 kJ/kg, a density of 1172.9 kg/m$^3$, at a mass flow rate of 6,800,155 kg/h, and at a volumetric flow rate of 5798 m$^3$/h.

TABLE IE-4-3

Illustrative Example 4A Carbon Dioxide Dense Fluid, Isentropic Expander Details Isochoric Data for D = 335 kg/m$^3$

| Expansion Stage | Temperature, C. | Pressure, MPa | Enthalpy, kJ/kg | Quality |
|---|---|---|---|---|
| Stage 1 inlet | 194.0 | 25.0 | 573.9 | Supercritical |
| Stage 1 Outlet | 35.0 | 7.81 | 376.8 | Supercritical |
| Stage 2 Inlet | | | | |
| Stage 2 Outlet | 4.5 | 3.92 | 263.5 | 0.24 |
| Stage 3 Inlet | | | | |
| Stage 3 Outlet | −19.9 | 1.97 | 185.7 | 0.11 |
| Stage 4 Inlet | | | | |
| Stage 4 Outlet | −41.3 | 0.96 | 127.7 | 0.05 |
| Stage 5 Inlet | | | | |
| Stage 5 Outlet | −55.0 | 0.55 | 94.1 | 0.03 |
| Overall Change | −249.0 | 24.45 | −479.8 | 0.97 |

The temperature, pressure, enthalpy, and vapor quality properties of the carbon dioxide stream at an expander inlet pressure of 20 MPa as it traversed the expander are summarized in Table IE-4-4 as Illustrative Example 4B. Calculations indicated that the low temperature expanded carbon dioxide of Illustrative Example 4B was produced at the expander outlet as a liquid at a temperature of −55.0 C, 0.55 MPa, an enthalpy of 94.1 kJ/kg, a density of 1172.9 kg/m$^3$, at a mass flow rate of 6,432,391 kg/h, and at a volumetric flow rate of 5584 m$^3$/h.

TABLE IE-4-4

Illustrative Example 4B Carbon Dioxide Dense Fluid, Isentropic Expander Details Isochoric Data for D = 260 kg/m$^3$

| Expansion Stage | Temperature, C. | Pressure, MPa | Enthalpy, kJ/kg | Quality |
|---|---|---|---|---|
| Stage 1 inlet | 198.15 | 20.0 | 595.4 | Supercritical |
| Stage 1 Outlet | 39.6 | 7.79 | 408.5 | Supercritical |
| Stage 2 Inlet | | | | |
| Stage 2 Outlet | 4.5 | 3.92 | 287.5 | 0.35 |
| Stage 3 Inlet | | | | |
| Stage 3 Outlet | −19.9 | 1.97 | 194.0 | 0.15 |
| Stage 4 Inlet | | | | |
| Stage 4 Outlet | −41.3 | 0.96 | 134.8 | 0.08 |
| Stage 5 Inlet | | | | |
| Stage 5 Outlet | −55.0 | 0.55 | 98.5 | 0.04 |
| Overall Change | −253.2 | 19.45 | −496.9 | 0.96 |

The temperature, pressure, enthalpy, and vapor quality properties of the carbon dioxide stream at an expander inlet pressure of 15 MPa as it traversed the expander are summarized in Table IE-4-5 as Illustrative Example 4C. Calculations indicated that the low temperature expanded carbon dioxide of Illustrative Example 4C was produced at the expander outlet as a liquid at a temperature of −55.0 C, 0.55 MPa, an enthalpy of 98.5 kJ/kg, a density of 1172.9 kg/m$^3$, at a mass flow rate of 6,154,497 kg/h, and at a volumetric flow rate of 5247 m$^3$/h.

TABLE IE-4-5

Illustrative Example 4C Carbon Dioxide Dense Fluid, Isentropic Expander Details Isochoric Data for D = 190 kg/m$^3$

| Expansion Stage | Temperature, C. | Pressure, MPa | Enthalpy, kJ/kg | Quality |
|---|---|---|---|---|
| Stage 1 inlet | 199.7 | 15.0 | 614.1 | Supercritical |
| Stage 1 Outlet | 56.3 | 7.76 | 454.5 | Supercritical |
| Stage 2 Inlet | | | | |
| Stage 2 Outlet | 4.5 | 3.92 | 327.1 | 0.53 |
| Stage 3 Inlet | | | | |
| Stage 3 Outlet | −19.9 | 1.97 | 220.7 | 0.23 |
| Stage 4 Inlet | | | | |
| Stage 4 Outlet | −39.8 | 1.00 | 151.4 | 0.12 |
| Stage 5 Inlet | | | | |
| Stage 5 Outlet | −55.0 | 0.55 | 105.9 | 0.07 |
| Overall Change | −254.7 | 14.45 | −508.2 | 0.93 |

The temperature, pressure, enthalpy, and vapor quality properties of the carbon dioxide stream at an expander inlet pressure of 10 MPa as it traversed the expander are summarized in Table IE-4-6 as Illustrative Example 4D. Calculations indicated that the low temperature expanded carbon dioxide of Illustrative Example 4D was produced at the expander outlet as a liquid at a temperature of −55.0 C, 0.55 MPa, an enthalpy of 105.9 kJ/kg, a density of 1172.9 kg/m$^3$, at a mass flow rate of 6,030,498 kg/h, and at a volumetric flow rate of 5142 m$^3$/h.

TABLE IE-4-6

Illustrative Example 4D Carbon Dioxide Dense Fluid, Isentropic Expander Details Isochoric Data for D = 125 kg/m$^3$

| Expansion Stage | Temperature, C. | Pressure, MPa | Enthalpy, kJ/kg | Quality |
|---|---|---|---|---|
| Stage 1 inlet | 193.6 | 10.0 | 624.7 | Supercritical |
| Stage 1 Outlet | 30.4 | 5.0 | 451.5 | 1.0 |
| Stage 2 Inlet | | | | |
| Stage 2 Outlet | −10.8 | 2.59 | 310.8 | 0.52 |
| Stage 3 Inlet | | | | |
| Stage 3 Outlet | −33.7 | 1.26 | 200.0 | 0.24 |
| Stage 4 Inlet | | | | |
| Stage 4 Outlet | −55.0 | 0.55 | 120.0 | 0.10 |
| Overall Change | −248.6 | 9.45 | −504.7 | 0.90 |

The temperature, pressure, enthalpy, and vapor quality properties of the carbon dioxide stream at an expander inlet pressure of 5 MPa as it traversed the expander are summarized in Table IE-4-7 as Illustrative Example 4E. Calculations indicated that the low temperature expanded carbon dioxide of Illustrative Example 4E was produced at the expander outlet as a liquid at a temperature of −55.0 C, 0.55 MPa, an enthalpy of 120.0 kJ/kg, a density of 1172.9 kg/m$^3$, at a mass flow rate of 5,830,052 kg/h, and at a volumetric flow rate of 4971 m$^3$/h.

TABLE IE-4-7

Illustrative Example 4E Carbon Dioxide Dense Fluid, Isentropic Expander Details Isochoric Data for D = 60 kg/m$^3$

| Expansion Stage | Temperature, C. | Pressure, MPa | Enthalpy, kJ/kg | Quality |
|---|---|---|---|---|
| Stage 1 inlet | 193.6 | 5.0 | 643.5 | 1.0 |
| Stage 1 Outlet | 1.4 | 2.5 | 451.8 | 1.0 |
| Stage 2 Inlet | | | | |
| Stage 2 Outlet | −33.7 | 1.26 | 290.8 | 0.53 |
| Stage 3 Inlet | | | | |

TABLE IE-4-7-continued

Illustrative Example 4E Carbon Dioxide Dense Fluid, Isentropic
Expander Details Isochoric Data for D = 60 kg/m³

| Expansion Stage | Temperature, C. | Pressure, MPa | Enthalpy, kJ/kg | Quality |
|---|---|---|---|---|
| Stage 3 Outlet | −55.0 | 0.55 | 164.8 | 0.23 |
| Overall Change | −248.6 | 4.45 | −478.7 | 0.77 |

The thermal power produced by expansion of the supercritical carbon dioxide across the dense phase fluid isentropic expander was calculated for each of Illustrative Examples 4A-4E from the enthalpy change of carbon dioxide across the expander and the mass flow of carbon dioxide through the expander. The net mechanical power produced from the thermal power in the expander for each of the Illustrative Examples 4A-4E was calculated by multiplying the calculated thermal power by the efficiency of conversion of the thermal power to mechanical power of the dense fluid phase expander, which was ascertained to range from 40% to 60%, and subtracting the mechanical power required to recycle the carbon dioxide from the expander outlet to the flue gas heat exchanger. The mechanical power required to recycle the carbon dioxide to the flue gas heat exchanger was calculated from the power required to compress gaseous phase carbon dioxide produced at the expander outlet to liquid phase and to pump liquid phase carbon dioxide to the flue gas heat exchanger at the pressure the carbon dioxide was provided to the flue gas heat exchanger for each of the respective Illustrative Examples 4A-4E. The mechanical power required to compress the gaseous phase carbon dioxide and the pump liquid phase carbon dioxide was calculated in accordance with the calculations of Illustrative Example 2. The electrical power produced in the second power cycle was calculated from the net mechanical power, assuming 99% efficiency in converting the mechanical power to electrical power. The calculated thermal power produced, mechanical power consumed for $CO_2$ recycle, expanded $CO_2$ vapor quality and electrical power produced as a function of expander inlet pressure, is presented in Table IE-4-8.

TABLE IE-4-8

Calculated Electrical Power Production at the Expander
as a function of Inlet Pressure at Nominally Constant Expander Inlet Temperatures

| Expander Inlet T, C | Expander Inlet P, MPa | Expander Thermal Power Capture, MWt | Power Consumed to Recycle $CO_2$, MWm | Electrical Power at the $CO_2$ Expander, MWe | Expanded $CO_2$ Vapor Quality |
|---|---|---|---|---|---|
| 194.0 | 25.0 | 906.3 | 61.6 | 297.9 to 477.4 | 0.03 |
| 198.2 | 20.0 | 887.8 | 49.6 | 302.5 to 478.3 | 0.04 |
| 199.7 | 15.0 | 868.8 | 42.3 | 302.2 to 474.2 | 0.07 |
| 193.6 | 10.0 | 845.5 | 31.6 | 303.6 to 471.0 | 0.10 |
| 193.6 | 5.0 | 775.2 | 23.2 | 287.1 to 437.5 | 0.23 |

Note:
Expander Outlet Conditions are held constant at −55.0 C., 0.55 MPa, Density liquid $CO_2$ = 1172.9 kg/m³.

Table IE-4-2 illustrates that operation of the carbon dioxide expander at lower inlet pressures and nominally constant inlet temperatures lead to lower flow rates of liquid carbon dioxide and lower inlet fluid densities. Table IE-4-8 shows the consequence of such operation at the lower expander inlet pressures while maintaining the high inlet temperature is reduced production of electrical power and production of expanded carbon dioxide with higher vapor quality (increased vapor fraction).

Power Generation of Illustrative Example 4A to 4E with Series Flow Flue Gas and Steam/Water Heat Exchanger versus Comparative Example 1

TABLE IE-4-9

Net Power Plant Electrical Power Production for the Steam and
Carbon Dioxide Cycles as as function of Inlet Pressure
at Nominally Constant Expander Inlet Temperatures

| Illustrative Example | Full Load Steam Cycle Net Power, MWe | Full Load Carbon Dioxide Cycle Net Power, MWe | Net Plant Full Load Power Production, MWe |
|---|---|---|---|
| 4A | 280.6 | 297.9 to 477.4 | 578.5 to 758.0 |
| 4B | 280.6 | 302.5 to 478.3 | 583.1 to 758.9 |
| 4C | 280.6 | 302.2 to 474.2 | 582.8 to 754.8 |
| 4D | 280.6 | 303.6 to 471.0 | 584.2 to 751.6 |
| 4E | 280.6 | 287.1 to 437.5 | 567.7 to 718.1 |

As shown in Table IE-4-9, the power plants of the design plans of Illustrative Examples 4A through 4E were calculated to have a maximum net power output that ranged from 567.7 to 758.9 MWe at full load whereas the power plant of Comparative Example 1 was estimated at 404.8 MWe net plant output for the same fuel consumption. The power plants of the design plans of Illustrative Examples 4A through 4E yield 40% to 88% more power per unit fuel relative to the power plan of the design plan of Comparative Example 1. The net plant efficiency basis fuel for the power plants of the design plans of Illustrative Examples 4A-4E is estimated to be between 60 and 81% basis input fuel (coal fuel rate of 132,291 kg/h at 25,724 kJ/kg heating value or 945.3 MWt).

Illustrative Example 5

USC CFB Plant with Single Re-Heat Steam Design
and Integrated Second Fluid Power Cycle including
Power Extraction from Flue Gas In Illustrative Example 5, the design study of Illustrative Example 4D was modified in one respect—the flow rate carbon dioxide through the dense fluid phase expander was doubled. The system and method of the design study of Illustrative Example 5 were in accordance with the system and method of the present invention.

As in Illustrative Example 4D, the thermal power to be recovered from the flue gas in the flue gas heat exchanger was 321,454,739 kJ/h while that from the steam in the steam condenser was 2,200,042,718 kJ/h. The overall quantity of thermal power to be recovered from the flue gas and the steam was 2,521,497,457 kJ/h assuming that there is a negligible carbon dioxide pressure drop across the flue gas heat exchanger and the steam condenser. Liquid carbon dioxide was provided to the flue gas heat exchanger at a temperature of 5 C, a pressure of 10 MPa, and a flow rate of 12,061,696 kg/h, where the enthalpy of the liquid carbon dioxide was 206.6 kJ/kg. The enthalpy increase per kilogram of carbon dioxide is 209.1 kJ/kg.

In the design study of Illustrative Example 5, the carbon dioxide was passed in series through the flue gas heat exchanger and the steam condenser, and thereafter through the dense fluid expander. Thermodynamic calculations showed that supercritical carbon dioxide was produced at the outlet of the steam condenser at a temperature of 57.1° C., a pressure of 10 MPa, and at a flow rate of 12,061,696 kg/h, where the supercritical carbon dioxide had an enthalpy of 415.7 kJ/kg—an increase of 209.1 kg/J per kilogram of carbon dioxide relative to the liquid carbon dioxide provided to the flue gas heat exchanger. The density of the supercritical carbon dioxide produced from the steam condenser was calculated as 308.44 kg/m$^3$. The supercritical carbon dioxide was provided from the steam condenser outlet to a multi-stage dense fluid phase expander for expansion through the expander. The calculated temperature, pressure, enthalpy, and vapor quality properties of the carbon dioxide stream as it traversed the expander are summarized in Table IE-3-1.

TABLE IE-5-1

Carbon Dioxide Dense Fluid, Isentropic Expander Details
Isochoric Data for D = 308.44 kg/m$^3$

| Expansion Stage | Temperature, C. | Pressure, MPa | Enthalpy, kJ/kg | Quality |
|---|---|---|---|---|
| Stage 1 inlet | 57.1 | 10.0 | 415.7 | Supercritical |
| Stage 1 Outlet | 14.6 | 5.04 | 309.7 | 0.4 |
| Stage 2 Inlet | | | | |
| Stage 2 Outlet | −11.9 | 2.51 | 214.6 | 0.16 |
| Stage 3 Inlet | | | | |
| Stage 3 Outlet | −33.7 | 1.26 | 150.0 | 0.08 |
| Stage 4 Inlet | | | | |
| Stage 4 Outlet | −55.0 | 0.55 | 95.4 | 0.04 |
| Overall Change | −112.1 | 9.45 | −320.3 | 0.96 |

Calculations showed the expanded carbon dioxide was produced as a liquid at a temperature of −55.0° C., a pressure of 0.55 MPa, a vapor quality of 0.04, at a mass flow rate of 12,061,696 kg/h, at a density of 1172.9 kg/m$^3$, and at a volumetric flow rate of 10,284 m$^3$/h, and had an enthalpy of 95.4 kJ/kg.

Power Recovery from the Carbon Dioxide Expander

Net mechanical power produced by expansion of the supercritical carbon dioxide through the dense fluid phase expander was calculated as set forth above with respect to Illustrative Examples 2-4, taking into account the power required to recycle the gaseous (13.3 MWm) and liquid (31.9 MWm) carbon dioxide from the outlet of the expander to the flue gas heat exchanger.

Thermal power provided for conversion to mechanical power by expansion of the supercritical carbon dioxide through the expander was calculated as 3,863,361,088 kJ/h or 1,073 MWt from the enthalpy change of carbon dioxide across the expander of 320.3 kJ/kg and the flow rate of carbon dioxide through the expander of 12,061,696 kg/h. The efficiency for conversion of thermal power to mechanical power in the multi stage, dense fluid phase, isentropic expander is about 40-60%. The total mechanical power produced in the dense fluid phase expander was estimated to range from 429.3 to 643.9 MW. Subtracting the mechanical power for the carbon dioxide pump and compressor provided a net mechanical power of 384.1 to 598.7 MWm.

Assuming the electrical generator is 99% efficient in conversion of mechanical power to electrical power, the quantity of electrical power generated in the second power cycle (carbon dioxide) was estimated to range from 380.3 to 592.7 MWe.

The total electrical power of the design plan of Illustrative Example 5 was calculated to range from 660.9 to 873.3 MWe by adding the 280.6 MWe produced in the first power cycle (steam) to the electrical power generated in the second power cycle (carbon dioxide).

Power Generation of Illustrative Example 5 versus Comparative Example 1

The power plant of the design plan of Illustrative Example 5 was calculated to have a maximum net power output that ranges from 660.9 to 873.3 MWe at full load whereas the power plant of Comparative Example 1 estimated at 404.8 MWe net plant output for the same fuel consumption. The power plant of Illustrative Example 5 was calculated to yield 63% to 116% more power per unit fuel than the power plant of the design plan of Comparative Example 1. The net plant efficiency basis fuel of the design plan of Illustrative Example 5 was estimated to be between 69 and 93% basis input fuel (coal feed rate 132,291 kg/h at 25,724 kJ/kg or 945.3 MWt fuel combustion power).

Power Generation of Illustrative Example 5 versus Illustrative Example 1

The power plant of the design plan of Illustrative Example 5 was calculated to have a maximum net electrical power output that ranges from 660.9 to 873.3 MWe at full load whereas the power plant of the design plan of Illustrative Example 1 was estimated to have at 536.4 to 695.3 MWe net plant electrical power output for the same fuel consumption. The power plant of the design plan of Illustrative Example 5 was calculated to yield 23 to 26% more electrical power per unit fuel than the power plant of the design plan of Illustrative Example 1.

Power Generation of Illustrative Example 5 versus Illustrative Example 4D

The power plant of the design plan of Illustrative Example 5 was calculated to have a maximum net electrical power output that ranges from 660.9 to 873.3 MWe at full load whereas the power plant of the design plan of Illustrative Example 4D was estimated to have at 584.2 to 751.6 MWe net plant electrical power output for the same fuel consumption. The power plant of the design plan of Illustrative Example 5 was calculated to yield 13 to 17% more electrical power per unit fuel than the power plant of the design plan of Illustrative Example 4D. This shows that increasing the mass flow rate of carbon dioxide in the second power cycle may increase the electrical power produced by the method and system of the present invention.

Illustrative Example 6

USC CFB Plant with Single Re-Heat Steam Design and Integrated Second Fluid Power Cycle using a Low Pressure Liquid Ammonia as the Second Power Cycle Working Fluid The power plant design study of Illustrative Example 1 was replicated with the exception that liquid ammonia was used as the working fluid for the integrated second fluid power cycle instead of carbon dioxide.

At full load conditions the input of combustion air, fuel, and sorbent are maintained as described in Illustrative Example 1. The steam power cycle was calculated to have a net electrical power output from the steam turbine driven generator of about 280.6 MWe as calculated above in Illustrative Example 1.

In the design study of Illustrative Example 6, liquid ammonia was used as the coolant in the steam condenser to condense liquid water from steam. A second power cycle produced electrical power in addition to electrical power produced by the first power cycle (steam), where enthalpy was extracted from steam in the steam condenser by thermally contacting the steam with the liquid ammonia, increasing the temperature, pressure, and enthalpy of the ammonia. The high enthalpy ammonia was expanded in a multi-stage dense fluid phase (two phase) expander to generate rotational mechanical power. A portion of the mechanical power was utilized to drive liquid ammonia pumps and compressors to recycle the ammonia to the steam condenser. The remaining mechanical power was used to drive an electrical generator to produce electrical power.

Liquid Ammonia Coolant to Condense Superheated Steam

In the design study of Illustrative Example 6, liquid ammonia was provided to the steam condenser at an inlet temperature of 5 C and pressure of 4.47 MPa. The enthalpy of liquid ammonia at 5 C and 4.47 MPa is 368.8 kJ/kg.

Calculations showed that ammonia vapor was produced from the steam condenser at a temperature of 200.0 C, pressure of 4.47 MPa, density of 21.183 kg/m$^3$, and enthalpy of 2,014.2 kJ/kg after thermally contacting steam from the first power cycle. Calculations also showed that the flow rate of liquid ammonia required to uptake 2,200,042,718.0 kJ/h to cool and condense the steam stream to 160 C was 1,337,087 kg/h, and the enthalpy change of ammonia upon transit through the steam condenser was 1,645.4 kJ/kg. The heat transfer efficiency from the steam stream to the ammonia stream was assumed to be 100% and a negligible pressure drop of ammonia across the steam condenser was assumed.

Expansion of Ammonia Vapor

In the design study of Illustrative Example 6, the heated ammonia vapor stream was provided from the steam condenser to a multi-stage dense fluid phase isentropic expander at a temperature of 200° C., a pressure of 4.47 MPa, and at a mass flow rate of 1,337,087 kg/h, where the heated ammonia vapor stream was calculated to have an enthalpy of 2,014.2 kJ/kg). The heated ammonia vapor stream was expanded through the dense fluid phase expander to a discharge pressure of 0.113 MPa. The calculated temperature, pressure, enthalpy, and vapor quality properties of the ammonia stream as it traversed the expander are summarized in Table IE-6-1.

TABLE IE-6-1

Properties of Ammonia as it Transits the Expander
Isochoric Data for D = 21.183 kg/m$^3$

| Expansion Stage | Temperature, C. | Pressure, MPa | Enthalpy, kJ/kg | Vapor Quality |
| --- | --- | --- | --- | --- |
| Stage 1 inlet | 200.0 | 4.47 | 2,014.2 | Vapor |
| Stage 1 Outlet | 54.7 | 2.291 | 1,466.5 | 0.84 |
| Stage 2 Inlet | | | | |
| Stage 2 Outlet | 28.5 | 1.116 | 938.4 | 0.40 |
| Stage 3 Inlet | | | | |
| Stage 3 Outlet | 7.2 | 0.558 | 628.4 | 0.20 |
| Stage 4 Inlet | | | | |
| Stage 4 Outlet | −12.2 | 0.266 | 418.4 | 0.10 |
| Stage 5 Inlet | | | | |
| Stage 5 Outlet | −31.12 | 0.113 | 262.7 | 0.04 |
| Overall Change | −231.12 | 4.357 | −1,751.5 | 0.96 |

Calculations indicated that the expanded ammonia was produced as a liquid at a temperature of −31.12° C., a pressure of 0.113 MPa, an enthalpy 262.7 kJ/kg, a density of 679.3 kg/m$^3$, a mass flow rate 1,337,087 kg/h, and a volumetric flow rate of 1,968.3 m$^3$/h.

In the design study of Illustrative Example 6, cold ammonia liquid is collected at the dense fluid phase expander outlet, pumped through a heat exchanger to reheat it to 5° C., and recycled to the steam condenser at 5° C. and 4.47 MPa to complete the circuit of the second fluid integrated power cycle.

Mechanical power required to pump 1,968.3 m$^3$/h of ammonia was estimated, based on the computed slope of $3.42 \times 10^{-4}$ MWt/(m$^3$/h) per megapascal differential pressure across the pump as calculated in Illustrative Example 1. This value was used to estimate the pumping power for liquid ammonia to recycle with the second power cycle. The power required to pump liquid ammonia for recycle was not the only large power consuming step when recycling liquid ammonia in the second fluid power cycle; it was also necessary to re-compress the small fraction of ammonia produced as a gas at the dense fluid phase expander outlet.

The power to pump liquid ammonia, as if no vapor were present in the expander exhaust, was computed as a function of the pump differential pressure as described above; then, the value was down rated by the fraction of liquid ammonia formed. The mechanical power required to pump the liquid ammonia was calculated to be 2.8 MWm according to the following equation.

Liquid Pumping Power=(3.42×10$^{-4}$ MW/(m$^3$/h·MPa))
(1,968.3 m$^3$/h)×(4.357 MPa)×(0.96)=2.8 MWm The power required for compression and liquefaction of ammonia vapor was assumed to be 10 times that of the liquid ammonia pumping power. In this way the compression power was sensitive to the final pressure and scaled to the fraction of ammonia vapor formed at the expander outlet. The mechanical power required to liquefy the gaseous ammonia was calculated to be 1.2 MWm according to the following equation:

Compression Power=(3.42×10$^{-4}$ MW/(m$^3$/h·MPa))(1,968.3 m$^3$/h)×(4.357 MPa)×(0.04)×10=1.2 MWm The total mechanical power required to pump liquid ammonia and compress gaseous ammonia for recycle in the second power cycle was calculated to be 4.0 MWm.

Power Recovery from the Ammonia Expander

The electrical power generation from expansion of the ammonia through the dense fluid phase expander was calculated. The net mechanical power (rotational) produced by expansion of the heated ammonia vapor through the dense phase fluid expander was calculated by subtracting the mechanical power required to recycle the liquid and gas components of the ammonia stream produced at the outlet of dense phase fluid expander in the second power cycle from the mechanical power produced by expansion of the heated ammonia vapor through the dense fluid phase isentropic expander. The electrical power produced by expansion of the heated ammonia vapor in the dense fluid phase isentropic expander was calculated from the net mechanical power as converted to electrical power by driving a generator whose efficiency was assumed to be 99%.

The thermal power produced by expansion of the heated ammonia vapor across the dense phase fluid isentropic expander was calculated from the enthalpy change of ammonia across the expander and the mass flow rate of ammonia through the expander. The enthalpy change of ammonia across the expander was calculated as 1751.5 kJ/kg, and the mass flow of ammonia through the expander was calculated as 1,337,087 kg/h. The thermal power of expansion of the heated ammonia vapor across the expander was calculated as 2,341,907,881 kJ/h or 650.5 MWt.

The total mechanical power produced by expansion of the heated ammonia vapor across the dense fluid phase expander was calculated from the thermal power produced by expansion of the heated ammonia vapor across the dense fluid phase expander. The efficiency for conversion of thermal power to rotational mechanical power of the multi stage, dense fluid phase, isentropic expander was ascertained to be about 40-60%. The total mechanical power produced by expansion of the heated ammonia vapor across the dense fluid phase expander was estimated to range from 260.2 to 390.3 MWm. The net mechanical power provided by expansion of the heated ammonia vapor across the dense phase fluid expander was calculated as being in a range from 256.2 to 386.3 MWm by subtracting the mechanical power required for operation of the liquid ammonia pump and compressor from the total mechanical power.

Assuming about 1% losses in the electrical generator, the quantity of electrical power generated in the second power cycle utilizing low pressure ammonia as the working fluid was estimated to range from about 253.6 to about 382.4 MWe.

Power Generation of Illustrative Example 6 USC CFB Plant with Single Re-Heat Steam Design and Integrated Second Fluid Power Cycle using Liquid Ammonia as the Second Power Cycle Working Fluid versus Comparative Example 1

The total electrical power produced by the power plant of the design study of Illustrative Example 6 was calculated by adding the electrical power produced by the first power cycle (steam) and the electrical power produced by the second power cycle (ammonia). The calculated total electrical power of the power plant of Illustrative Example 6 ranged from 534.2 to 663.0 MWe at full load. The net plant efficiency basis fuel is estimated to be between 56% and 71% basis input fuel (coal feed rate 132,291 kg/h at 25,724 kJ/kg or 945.3 MW fuel combustion power).

The power plant of Illustrative Example 6 yields a calculated 31% to 64% more power per unit fuel relative to Comparative Example 1, which provided 404.8 MWe net plant electrical power output for the same fuel consumption.

Power Generation of Illustrative Example 6 Using Liquid Ammonia as the Working Fluid in the Second Power Cycle Versus Illustrative Example 1 Using Carbon Dioxide as the Working Fluid in the Second Power Cycle The power plant of Illustrative Example 6 utilizing low pressure ammonia as a working fluid in the second power cycle yielded a calculated 0% to 5% less power than the power plant output of Illustrative Example 1 utilizing high pressure carbon dioxide as a working fluid in the second power cycle.

Illustrative Example 7

USC CFB Plant with Single Re-Heat Steam Design and Integrated Second Fluid Power Cycle using a High Pressure Liquid Ammonia as the Second Power Cycle Working Fluid The power plant design study of Illustrative Example 1 was replicated with the exception that high pressure liquid ammonia was used as the working fluid for the integrated second fluid power cycle instead of low pressure liquid ammonia.

At full load conditions the input of combustion air, fuel, and sorbent are maintained as described in Illustrative Example 1. The steam power cycle was calculated to have a net electrical power output from the steam turbine driven generator of about 280.6 MWe as calculated above in Illustrative Example 1.

Liquid Ammonia Coolant to Condense Superheated Steam

In the design study of Illustrative Example 7, liquid ammonia was provided to the steam condenser at an inlet temperature of 50° C. and pressure of 15.51 MPa. The enthalpy of liquid ammonia at 50° C. and 15.51 MPa is 585.5 kJ/kg.

Calculations showed that supercritical ammonia was produced from the steam condenser at a temperature of 200.0 C, pressure of 15.51 MPa, density of 100.36 kg/m$^3$, and enthalpy of 1,781.7 kJ/kg after thermally contacting steam from the first power cycle. Calculations also showed that the flow rate of liquid ammonia required to uptake 2,200,042,718.0 kJ/h to cool and condense the steam stream to 160 C was 1,234,800 kg/h, and the enthalpy change of ammonia upon transit through the steam condenser was 1,196.2 kJ/kg. The heat transfer efficiency from the steam stream to the ammonia stream was assumed to be 100% and a negligible pressure drop of ammonia across the steam condenser was assumed.

Supercritical ammonia at about 200 C and 15.51 MPa is routed to one or more multi stage, dense fluid phase, isentropic expander driving electrical generators. It is expanded to a discharge pressure of 2.034 MPa. The mass flow rate of ammonia fluid is 1,234,800 kg/h.

Expansion of Ammonia Vapor

In the design study of Illustrative Example 7, the supercritical ammonia stream was provided from the steam condenser to a multi-stage dense fluid phase isentropic expander at a temperature of 200° C., a pressure of 15.51 MPa, and at a mass flow rate of 1,234,800 kg/h, where the supercritical ammonia stream was calculated to have an enthalpy of 1,781.7 kJ/kg. The supercritical ammonia stream was expanded through the dense fluid phase expander to a discharge pressure of 01 MPa. The calculated temperature, pressure, enthalpy, and vapor quality properties of the ammonia stream as it traversed the expander are summarized in Table IE-7-1.

TABLE IE-7-1

Properties of Ammonia as it Transits the Expander
Isochoric Data for D = 100.36 kg/m$^3$

| Expansion Stage | Temperature, C. | Pressure, MPa | Enthalpy, kJ/kg | Vapor Quality |
|---|---|---|---|---|
| Stage 1 inlet | 200.0 | 15.51 | 1,781.7 | Supercritical |
| Stage 1 Outlet | 116.2 | 8.50 | 1,434.8 | 0.85 |
| Stage 2 Inlet | | | | |
| Stage 2 Outlet | 81.1 | 4.24 | 1,007.8 | 0.30 |
| Stage 3 Inlet | | | | |
| Stage 3 Outlet | 50.0 | 2.034 | 723.5 | 0.13 |
| Stage 4 Inlet | | | | |
| Stage 4 Outlet | 25.0 | 1.00 | 537.4 | 0.07 |
| Stage 5 Inlet | | | | |
| Stage 5 Outlet | −33.2 | 0.10 | 202.9 | 0.01 |
| Overall Change | −233.2 | 15.41 | −1,578.8 | 0.99 |

Calculations indicated that the expanded ammonia was produced as a liquid at a temperature of −33.2° C., a pressure of 0.1 MPa, an enthalpy 202.9 kJ/kg, a density of 681.8 kg/m$^3$, a mass flow rate 1,234,800 kg/h, and a volumetric flow rate of 1,811.1 m$^3$/h.

In the design study of Illustrative Example 7, cold ammonia liquid is collected at the dense fluid phase expander outlet, pumped through a heat exchanger to reheat it to 50° C., and recycled to the steam condenser at 50° C. and 15.51 MPa to complete the circuit of the second fluid integrated power cycle.

Mechanical power required to pump 1,811.1 m³/h of ammonia was estimated, based on the computed slope of $3.42 \times 10^{-4}$ MWt/(m³/h) per megapascal differential pressure across the pump as calculated in Illustrative Example 1. This value was used to estimate the pumping power for liquid ammonia to recycle with the second power cycle. The power required to pump liquid ammonia for recycle was not the only large power consuming step when recycling liquid ammonia in the second fluid power cycle; it was also necessary to re-compress the small fraction of ammonia produced as a gas at the dense fluid phase expander outlet.

The power to pump liquid ammonia, as if no vapor were present in the expander exhaust, was computed as a function of the pump differential pressure as described above; then, the value was down rated by the fraction of liquid ammonia formed. The mechanical power required to pump the liquid ammonia was calculated to be 9.5 MWm according to the following equation.

$$\text{Liquid Pumping Power} = (3.42 \times 10^{-4} \text{ MW}/(\text{m}^3/\text{h} \cdot \text{MPa})) \\ (1{,}811.1 \text{ m}^3/\text{h}) \times (15.41 \text{ MPa}) \times (0.99) = 9.5 \text{ MWm}$$

The power required for compression and liquefaction of ammonia vapor was assumed to be 10 times that of the liquid ammonia pumping power. In this way the compression power was sensitive to the final pressure and scaled to the fraction of ammonia vapor formed at the expander outlet. The mechanical power required to liquefy the gaseous ammonia was calculated to be 1.0 MWm according to the following equation:

$$\text{Compression Power} = (3.42 \times 10^{-4} \text{ MW}/(\text{m}^3/\text{h} \cdot \text{MPa}))(1{,}811.1 \text{ m}^3/\text{h}) \times (15.41 \text{ MPa}) \times (0.01) \times 10 = 1.0 \text{ MWm}$$

The total mechanical power required to pump liquid ammonia and compress gaseous ammonia for recycle in the second power cycle was calculated to be 10.5 MWm.

Power Recovery from the Ammonia Expander

The electrical power generation from expansion of the ammonia through the dense fluid phase expander was calculated. The net mechanical power (rotational) produced by expansion of the supercritical ammonia through the dense phase fluid expander was calculated by subtracting the mechanical power required to recycle the liquid and gas components of the ammonia stream produced at the outlet of dense phase fluid expander in the second power cycle from the mechanical power produced by expansion of the supercritical ammonia through the dense fluid phase isentropic expander. The electrical power produced by expansion of the supercritical ammonia in the dense fluid phase isentropic expander was calculated from the net mechanical power as converted to electrical power by driving a generator whose efficiency was assumed to be 99%.

The thermal power produced by expansion of the supercritical ammonia across the dense phase fluid isentropic expander was calculated from the enthalpy change of ammonia across the expander and the mass flow rate of ammonia through the expander. The enthalpy change of ammonia across the expander was calculated as 1,578.8 kJ/kg, and the mass flow of ammonia through the expander was calculated as 1,234,800 kg/h. The thermal power of expansion of the heated ammonia vapor across the expander was calculated as 1,949,502,240 kJ/h or 541.5 MWt.

The total mechanical power produced by expansion of the supercritical ammonia across the dense fluid phase expander was calculated from the thermal power produced by expansion of the supercritical ammonia across the dense fluid phase expander. The efficiency for conversion of thermal power to rotational mechanical power of the multi stage, dense fluid phase, isentropic expander was ascertained to be about 40-60%. The total mechanical power produced by expansion of the supercritical ammonia across the dense fluid phase expander was estimated to range from 216.6 to 324.9 MWm. The net mechanical power provided by expansion of the supercritical ammonia across the dense phase fluid expander was calculated as being in a range from 206.1 to 314.4 MWm by subtracting the mechanical power required for operation of the liquid ammonia pump and compressor from the total mechanical power.

Assuming about 1% losses in the electrical generator, the quantity of electrical power generated in the second power cycle utilizing high pressure ammonia as the working fluid was estimated to range from about 204.0 to about 311.3 MWe.

Power Generation of Illustrative Example 7 USC CFB Plant with Single Re-Heat Steam Design and Integrated Second Fluid Power Cycle using High Pressure Liquid Ammonia as the Second Power Cycle Working Fluid versus Comparative Example 1

The total electrical power produced by the power plant of the design study of Illustrative Example 7 was calculated by adding the electrical power produced by the first power cycle (steam) and the electrical power produced by the second power cycle (ammonia). The calculated total electrical power of the power plant of Illustrative Example 7 ranged from 484.6 to 591.9 MWe at full load. The net plant efficiency basis fuel is estimated to be between 51% and 63% basis input fuel (coal feed rate 132,291 kg/h at 25,724 kJ/kg or 945.3 MW fuel combustion power).

The power plant of Illustrative Example 7 yields a calculated 19% to 47% more power per unit fuel relative to Comparative Example 1, which provided 404.8 MWe net plant electrical power output for the same fuel consumption.

Power Generation of Illustrative Example 7 Using High Pressure Liquid Ammonia as the Working Fluid in the Second Power Cycle Versus Illustrative Example 1 Using Carbon Dioxide as the Working Fluid in the Second Power Cycle The power plant of Illustrative Example 7 utilizing high pressure ammonia as a working fluid in the second power cycle yielded a calculated 10 to 15% less power than the power plant output of Illustrative Example 1 utilizing high pressure carbon dioxide as a working fluid in the second power cycle.

Power Generation of Illustrative Example 7 Using High Pressure Liquid Ammonia as the Working Fluid in the Second Power Cycle Versus Illustrative Example 6 Using Carbon Dioxide as the Working Fluid in the Second Power Cycle The power plant of Illustrative Example 7 utilizing high pressure ammonia as a working fluid in the second power cycle yielded a calculated 10 to 11% less power than the power plant output of Illustrative Example 6 utilizing low pressure ammonia as a working fluid in the second power cycle.

Illustrative Example 8

USC CFB Plant with Single Re-Heat Steam Design and Integrated Second Fluid Power Cycle Using Liquid Ammonia including Power Extraction from Flue Gas—Flue Gas Heat Exchanger in Series Flow configuration with Steam/Water Condenser In Illustrative Example 8, the design study of Illustrative Example 3 was modified in one respect—low pressure liquid ammonia was used as the working fluid in the second power cycle instead of carbon dioxide. The system and method of the design study of Illustrative Example 8 were in accordance with the system and method of the present invention. In the second power cycle, the flue gas heat exchanger preceded the steam condenser in a single series flow path for coolant ammonia.

The electrical power produced by the modified design was calculated based on thermodynamic modeling.

The conditions and power produced in the first power cycle utilizing water/steam as the working fluid and recycling the water are set forth in Illustrative Example 2. The net electrical power produced in the first power cycle was calculated as 280.6 MWe.

The electrical power generated in the second power cycle was calculated based on the thermal power produced by thermally contacting the liquid ammonia with the flue gas stream and then with the steam from the first power cycle, expanding the resulting heated ammonia vapor through an expander system having a dense fluid phase (two phase) expander to generate mechanical power, subtracting mechanical power required to pump and condense the expanded ammonia for recycle through the second power cycle from the mechanical power produced in the dense fluid phase expander to determine net mechanical power produced in the second power cycle, and calculating the electrical power produced from the net mechanical power.

The composition, flow rate, and thermal power of the flue gas utilized in the design study of Illustrative Example 8 were the same as in Illustrative Example 2. Flue gas was produced at a rate of 1,487,912 kg/h. The flue gas was cooled from 117.8 C to 20 C in a heat exchanger by thermal contact with liquid ammonia having a temperature of 5° C. and a pressure of 4.47 MPa and an enthalpy of 368.8 kJ. The heat transfer rate between the flue gas and the ammonia in the heat exchanger was calculated as 321,454,739 kJ/h.

The temperature, pressure, flow rate, and thermal power of the steam entering the condenser in the first power cycle for condensation by thermal contact with the ammonia in the design study of Illustrative Example 8 were the same as in Illustrative Examples 1 and 2. The steam was produced at a flow rate of 934,240.4 kg/h. The steam was cooled from 285.6° C. to 160° C. at a pressure of 0.65 MPa by thermal contact with the ammonia provided from the outlet of the flue gas heat exchanger to condense liquid water from the steam. The enthalpy change upon cooling of the steam was calculated as 2354.9 kJ/kg and the resulting heat transfer rate between the steam and ammonia in the condenser was calculated as 2,200,042,718.0 kJ/h.

The total thermal power recovered from the flue gas and the steam by the ammonia in the second power cycle was calculated as 2,521,497,457 kJ/h, where it was assumed that there was negligible ammonia pressure drop across the flue gas heat exchanger and the steam condenser and the heat transfer efficiency between the flue gas and the ammonia and between steam and the ammonia was 100%. The initial temperature and enthalpy of the ammonia prior to thermally contacting the ammonia with the flue gas and the steam were 5° C. and 368.8 kJ/kg, respectively. Calculations indicated that ammonia vapor was produced from the steam condenser at a temperature of 200° C., a pressure of 4.47 MPa, and a density of 21.18 kg/m$^3$, where the ammonia vapor had a calculated enthalpy of 2,014.2 kJ/kg. The flow rate of ammonia was calculated by dividing the total thermal power to be recovered by the enthalpy change per kilogram of ammonia through the flue gas heat exchanger and the steam condenser-1645.4 kJ/kg. The calculated flow rate of ammonia was 1,532,453 kg/h.

Expansion of Ammonia Vapor

In the design study of Illustrative Example 8, the heated ammonia stream exiting the steam condenser (1,532,453 kg/h, 200.0° C., 4.47 MPa, and enthalpy of 2014.2 kJ/kg) was expanded to a pressure of 0.113 MPa through a multi-stage, dense fluid phase isentropic expander driving an electrical generator. The calculated temperature, pressure, enthalpy, and vapor quality properties of the ammonia stream as it traversed the expander are summarized in Table IE-8-1.

TABLE IE-8-1

Properties of Ammonia as it Transits the Expander
Isochoric Data for D = 21.183 kg/m$^3$

| Expansion Stage | Temperature, ° C. | Pressure, MPa | Enthalpy, kJ/kg | Vapor Quality |
|---|---|---|---|---|
| Stage 1 inlet | 200.0 | 4.47 | 2,014.2 | Vapor |
| Stage 1 Outlet | 54.7 | 2.291 | 1,466.5 | 0.84 |
| Stage 2 Inlet | | | | |
| Stage 2 Outlet | 28.5 | 1.116 | 938.4 | 0.40 |
| Stage 3 Inlet | | | | |
| Stage 3 Outlet | 7.2 | 0.558 | 628.4 | 0.20 |
| Stage 4 Inlet | | | | |
| Stage 4 Outlet | −12.2 | 0.266 | 418.4 | 0.10 |
| Stage 5 Inlet | | | | |
| Stage 5 Outlet | −31.12 | 0.113 | 262.7 | 0.04 |
| Overall Change | −231.12 | 4.357 | −1,751.5 | 0.96 |

Calculations indicated that the expanded ammonia was produced as a liquid at a temperature of −31.1° C., a pressure of 0.113 MPa, an enthalpy of 262.7 kJ/kg, a density of 679.3 kg/m$^3$, at a mass flow rate of 1,532,453 kg/h, and at a volumetric flow rate of 2,255.9 m$^3$/h.

Cold Liquid Ammonia Recycle

In the design study of Illustrative Example 8, cold ammonia liquid is collected at the dense fluid phase expander outlet, pumped through a heat exchanger to reheat it to 5° C., and recycled to the flue gas heat exchanger at 5° C. and 4.47 MPa to complete the circuit of the second fluid integrated power cycle.

Mechanical power required to pump 2,255.9 m$^3$/h of ammonia was estimated, based on the computed slope of 3.42×10$^{-4}$ MWt/(m$^3$/h) per megapascal differential pressure across the pump as calculated in Illustrative Example 1. This value was used to estimate the pumping power for liquid ammonia to recycle with the second power cycle. The power required to pump liquid ammonia for recycle was not the only large power consuming step when recycling liquid ammonia in the second fluid power cycle; it was also necessary to re-compress the small fraction of ammonia produced as a gas at the dense fluid phase expander outlet.

The power to pump liquid ammonia, as if no vapor were present in the expander exhaust, was computed as a function of the pump differential pressure as described above; then, the value was down rated by the fraction of liquid ammonia formed. The mechanical power required to pump the liquid ammonia was calculated to be 3.2 MWm according to the following equation.

Liquid Pumping Power=(3.42×10$^{-4}$ MW/(m$^3$·h·MPa))
(2,255.9 m$^3$/h)×(4.357 MPa)×(0.96)=3.2 MWm The power required for compression and liquefaction of ammonia vapor was assumed to be 10 times that of the liquid ammonia pumping power. In this way the compression power was sensitive to the final pressure and scaled to the fraction of ammonia vapor formed at the expander outlet. The mechanical power required to liquefy the gaseous ammonia was calculated to be 1.3 MWm according to the following equation:

Compression Power=(3.42×10$^{-4}$ MW/(m$^3$·h·MPa))(2,255.9 m$^3$/h)×(4.357 MPa)×(0.04)×10=1.3 MWm The total mechanical power required to pump liquid carbon dioxide and compress gaseous carbon dioxide for recycle in the second power cycle was calculated to be 4.5 MWm.

Power Recovery from the Ammonia Expander

The electrical power generation from expansion of the ammonia through the dense fluid phase expander was calculated. The net mechanical power (rotational) produced by expansion of the heated ammonia vapor through the dense phase fluid expander was calculated by subtracting the mechanical power required to recycle the liquid and gas components of the ammonia stream produced at the outlet of dense phase fluid expander in the second power cycle from the mechanical power produced by expansion of the heated ammonia vapor through the dense fluid phase isentropic expander. The electrical power produced by expansion of the heated ammonia vapor in the dense fluid phase isentropic expander was calculated from the net mechanical power as converted to electrical power by driving a generator whose efficiency was assumed to be 99%.

The thermal power produced by expansion of the heated ammonia vapor across the dense phase fluid isentropic expander was calculated from the enthalpy change of ammonia across the expander and the mass flow rate of ammonia through the expander. The enthalpy change of ammonia across the expander was calculated as 1751.5 kJ/kg, and the mass flow of ammonia through the expander was calculated as 1,532,453 kg/h. The thermal power of expansion of the heated ammonia vapor across the expander was calculated as 2,684,091,430 kJ/h or 745.6 MWt.

The total mechanical power produced by expansion of the heated ammonia vapor across the dense fluid phase expander was calculated from the thermal power produced by expansion of the heated ammonia vapor across the dense fluid phase expander. The efficiency for conversion of thermal power to rotational mechanical power of the multi stage, dense fluid phase, isentropic expander was ascertained to be about 40-60%. The total mechanical power produced by expansion of the heated ammonia vapor across the dense fluid phase expander was estimated to range from 298.2 to 447.4 MWm. The net mechanical power provided by expansion of the heated ammonia vapor across the dense phase fluid expander was calculated as being in a range from 293.7 to 442.9 MWm by subtracting the mechanical power required for operation of the liquid ammonia pump and compressor from the total mechanical power.

Assuming about 1% losses in the electrical generator, the quantity of electrical power generated in the second power cycle utilizing low pressure ammonia as the working fluid was estimated to range from 290.8 to 438.5 MWe.

Power Generation of Illustrative Example 8 with Series Flow Flue Gas and Steam Cooling and Condensing Heat Exchanger Versus Comparative Example 1

The total electrical power produced by the power plant of the design study of Illustrative Example 8 was calculated by adding the electrical power produced by the first power cycle (steam) and the electrical power produced by the second power cycle (ammonia). The calculated total electrical power of the power plant of Illustrative Example 8 ranged from 571.4 to 719.1 MWe at full load. The net plant efficiency basis fuel is estimated to be between 60% and 76% basis input fuel (coal feed rate 132,291 kg/h at 25,724 kJ/kg or 945.3 MW fuel combustion power).

The power plant of Illustrative Example 8 yields a calculated 41% to 78% more power per unit fuel relative to Comparative Example 1, which provided 404.8 MWe net plant electrical power output for the same fuel consumption.

Power Generation of Illustrative Example 8 with Liquid Ammonia Cooled Series Flow Flue Gas and Steam Cooling and Condensing Heat Exchangers versus Illustrative Example 3 with Liquid Carbon Dioxide Cooled Series Flow Flue Gas and Steam Cooling and Condensing Heat Exchangers The power plant of Illustrative Example 8 utilizing low pressure ammonia as a working fluid in the second power cycle yielded a calculated 1% to 5% less power than the power plant output of Illustrative Example 3 utilizing high pressure carbon dioxide as a working fluid in the second power cycle.

Illustrative Example 9

USC CFB Plant with Single Re-Heat Steam Design and Integrated Second Fluid Power Cycle Using High Pressure Liquid Ammonia including Power Extraction from Flue Gas—Flue Gas Heat Exchanger in Series Flow configuration with Steam/Water Condenser In Illustrative Example 9, the design study of Illustrative Example 8 was modified in one respect—high pressure ammonia (15.5 MPa) was used as the working fluid in the second power cycle instead of low pressure ammonia (4.47 MPa). The system and method of the design study of Illustrative Example 9 were in accordance with the system and method of the present invention. In the second power cycle, the flue gas heat exchanger preceded the steam condenser in a single series flow path for coolant ammonia.

The electrical power produced by the modified design was calculated based on thermodynamic modeling.

The conditions and power produced in the first power cycle utilizing water/steam as the working fluid and recycling the water are set forth in Illustrative Example 2. The net electrical power produced in the first power cycle was calculated as 280.6 MWe.

The electrical power generated in the second power cycle was calculated based on the thermal power produced by thermally contacting the liquid ammonia with the flue gas stream and then with the steam from the first power cycle, expanding the resulting heated ammonia vapor through an expander system having a dense fluid phase (two phase) expander to generate mechanical power, subtracting mechanical power required to pump and condense the expanded ammonia for recycle through the second power cycle from the mechanical power produced in the dense fluid phase expander to determine net mechanical power produced in the second power cycle, and calculating the electrical power produced from the net mechanical power.

The composition, flow rate, and thermal power of the flue gas utilized in the design study of Illustrative Example 9 were the same as in Illustrative Example 2. Flue gas was produced at a rate of 1,487,912 kg/h. The flue gas was cooled from 117.8 C to 20 C in a heat exchanger by thermal contact with liquid ammonia having a temperature of 5° C. and a pressure of 15.51 MPa and an enthalpy of 376.0 kJ. The heat transfer rate between the flue gas and the ammonia in the heat exchanger was calculated as 321,454,739 kJ/h.

The temperature, pressure, flow rate, and thermal power of the steam entering the condenser in the first power cycle for condensation by thermal contact with the ammonia in the design study of Illustrative Example 9 were the same as in Illustrative Examples 1 and 2. The steam was produced at a flow rate of 934,240.4 kg/h. The steam was cooled from 285.6° C. to 160° C. at a pressure of 0.65 MPa by thermal contact with the ammonia provided from the outlet of the flue gas heat exchanger to condense liquid water from the steam. The enthalpy change upon cooling of the steam was calculated as 2354.9 kJ/kg and the resulting heat transfer rate between the steam and ammonia in the condenser was calculated as 2,200,042,718.0 kJ/h.

The total thermal power recovered from the flue gas and the steam by the ammonia in the second power cycle was calculated as 2,521,497,457 kJ/h, where it was assumed that there was negligible ammonia pressure drop across the flue gas heat exchanger and the steam condenser and the heat transfer efficiency between the flue gas and the ammonia and between steam and the ammonia was 100%. The initial temperature and enthalpy of the ammonia prior to thermally contacting the ammonia with the flue gas and the steam were 5° C. and 376.0 kJ/kg, respectively. Calculations indicated that supercritical ammonia was produced from the steam condenser at a temperature of 200° C., a pressure of 15.51 MPa, and a density of 100.36 kg/m$^3$, where the ammonia vapor had a calculated enthalpy of 1,781.7 kJ/kg. The flow rate of ammonia was calculated by dividing the total thermal power to be recovered by the enthalpy change per kilogram of ammonia through the flue gas heat exchanger and the steam condenser—1405.7 kJ/kg. The calculated flow rate of ammonia was 1,793,766 kg/h.

Expansion of Ammonia Vapor

In the design study of Illustrative Example 9, the heated ammonia stream exiting the steam condenser (1,793,766 kg/h, 200.0° C., 15.51 MPa, and enthalpy of 1,781.7 kJ/kg) was expanded to a pressure of 0.10 MPa through a multi-stage, dense fluid phase isentropic expander driving an electrical generator. The calculated temperature, pressure, enthalpy, and vapor quality properties of the ammonia stream as it traversed the expander are summarized in Table IE-9-1.

TABLE IE-9-1

Properties of Ammonia as it Transits the Expander
Isochoric Data for D = 100.36 kg/m$^3$

| Expansion Stage | Temperature, ° C. | Pressure, MPa | Enthalpy, kJ/kg | Vapor Quality |
|---|---|---|---|---|
| Stage 1 inlet | 200.0 | 15.51 | 1,781.7 | Supercritical |
| Stage 1 Outlet | 116.2 | 8.50 | 1,434.8 | 0.85 |
| Stage 2 Inlet | | | | |
| Stage 2 Outlet | 81.1 | 4.24 | 1,007.8 | 0.30 |
| Stage 3 Inlet | | | | |
| Stage 3 Outlet | 50.0 | 2.034 | 723.5 | 0.13 |
| Stage 4 Inlet | | | | |
| Stage 4 Outlet | 25.0 | 1.00 | 537.4 | 0.07 |
| Stage 5 Inlet | | | | |
| Stage 5 Outlet | −33.2 | 0.10 | 202.9 | 0.01 |
| Overall Change | −233.2 | 15.41 | −1,578.8 | 0.99 |

Calculations indicated that the expanded ammonia was produced as a liquid at a temperature of −33.2° C., a pressure of 0.10 MPa, an enthalpy of 202.9 kJ/kg, a density of 681.8 kg/m$^3$, at a mass flow rate of 1,793,766 kg/h, and at a volumetric flow rate of 2,630.9 m$^3$/h.

In the design study of Illustrative Example 9, cold ammonia liquid is collected at the dense fluid phase expander outlet, pumped through a heat exchanger to reheat it to 5° C., and recycled to the flue gas heat exchanger at 5° C. and 15.51 MPa to complete the circuit of the second fluid integrated power cycle.

Mechanical power required to pump 2,630.9 m$^3$/h of ammonia was estimated, based on the computed slope of $3.42 \times 10^{-4}$ MWt/(m$^3$/h) per megapascal differential pressure across the pump as calculated in Illustrative Example 1. This value was used to estimate the pumping power for liquid ammonia to recycle with the second power cycle. The power required to pump liquid ammonia for recycle was not the only large power consuming step when recycling liquid ammonia in the second fluid power cycle; it was also necessary to re-compress the small fraction of ammonia produced as a gas at the dense fluid phase expander outlet.

The power to pump liquid ammonia, as if no vapor were present in the expander exhaust, was computed as a function of the pump differential pressure as described above; then, the value was down rated by the fraction of liquid ammonia formed. The mechanical power required to pump the liquid ammonia was calculated to be 13.7 MWm according to the following equation.

Liquid Pumping Power=$(3.42 \times 10^{-4}$ MW/(m$^3$/h·MPa)) $(2,630.9$ m$^3$/h$) \times (15.41$ MPa$) \times (0.99) = 13.7$ MWm The power required for compression and liquefaction of ammonia vapor was assumed to be 10 times that of the liquid ammonia pumping power. In this way the compression power was sensitive to the final pressure and scaled to the fraction of ammonia vapor formed at the expander outlet. The mechanical power required to liquefy the gaseous ammonia was calculated to be 1.4 MWm according to the following equation:

Compression Power=$(3.42 \times 10^{-4}$ MW/(m$^3$·h·MPa))(2,630.9 m$^3$/h$) \times (15.41$ MPa$) \times (0.01) \times 10 = 1.4$ MWm The total mechanical power required to pump liquid carbon dioxide and compress gaseous carbon dioxide for recycle in the second power cycle was calculated to be 15.1 MWm.

Power Recovery from the Ammonia Expander

The electrical power generation from expansion of the ammonia through the dense fluid phase expander was calculated. The net mechanical power (rotational) produced by expansion of the heated ammonia vapor through the dense phase fluid expander was calculated by subtracting the mechanical power required to recycle the liquid and gas components of the ammonia stream produced at the outlet of dense phase fluid expander in the second power cycle from the mechanical power produced by expansion of the heated ammonia vapor through the dense phase fluid isentropic expander. The electrical power produced by expansion of the heated ammonia vapor in the dense fluid phase isentropic expander was calculated from the net mechanical power as converted to electrical power by driving a generator whose efficiency was assumed to be 99%.

The thermal power produced by expansion of the heated ammonia vapor across the dense phase fluid isentropic expander was calculated from the enthalpy change of ammonia across the expander and the mass flow rate of ammonia through the expander. The enthalpy change of ammonia across the expander was calculated as 1578.8 kJ/kg, and the mass flow of ammonia through the expander was calculated as 1,793,766 kg/h. The thermal power of expansion of the heated ammonia vapor across the expander was calculated as 2,831,997,761 kJ/h or 786.7 MWt.

The total mechanical power produced by expansion of the heated ammonia vapor across the dense fluid phase expander was calculated from the thermal power produced by expansion of the heated ammonia vapor across the dense fluid phase expander. The efficiency for conversion of thermal power to rotational mechanical power of the multi stage, dense fluid phase, isentropic expander was ascertained to be about 40-60%. The total mechanical power produced by expansion of the heated ammonia vapor across the dense fluid phase expander was estimated to range from 314.7 to 472.0 MWm. The net mechanical power provided by expansion of the heated ammonia vapor across the dense phase fluid expander was calculated as being in a range from 299.6 to 456.9 MWm by subtracting the mechanical power required for operation of the liquid ammonia pump and compressor from the total mechanical power.

Assuming about 1% losses in the electrical generator, the quantity of electrical power generated in the second power cycle utilizing low pressure ammonia as the working fluid was estimated to range from 296.6 to 452.3 MWe.

Power Generation of Illustrative Example 9 USC CFB Plant with Single Re-Heat Steam Design and Integrated Second Fluid Power Cycle using High Pressure Liquid Ammonia as the Second Power Cycle Working Fluid versus Comparative Example 1

The total electrical power produced by the power plant of the design study of Illustrative Example 9 was calculated by adding the electrical power produced by the first power cycle (steam) and the electrical power produced by the second power cycle (ammonia). The calculated total electrical power of the power plant of Illustrative Example 9 ranged from 577.2 to 732.9 MWe at full load. The net plant efficiency basis fuel is estimated to be between 61% and 78% basis input fuel (coal feed rate 132,291 kg/h at 25,724 kJ/kg or 945.3 MW fuel combustion power).

The power plant of Illustrative Example 9 yields a calculated 42% to 81% more power per unit fuel relative to Comparative Example 1, which provided 404.8 MWe net plant electrical power output for the same fuel consumption.

Power Generation of Illustrative Example 9 Using High Pressure Liquid Ammonia as the Working Fluid in the Second Power Cycle Versus Illustrative Example 3 Using Carbon Dioxide as the Working Fluid in the Second Power Cycle The power plant of Illustrative Example 9 utilizing high pressure ammonia as a working fluid in the second power cycle yielded a calculated 0 to 4% less power than the power plant output of Illustrative Example 3 utilizing high pressure carbon dioxide as a working fluid in the second power cycle.

Power Generation of Illustrative Example 9 Using High Pressure Liquid Ammonia as the Working Fluid in the Second Power Cycle Versus Illustrative Example 8 Using Low Pressure Ammonia as the Working Fluid in the Second Power Cycle The power plant of Illustrative Example 9 utilizing high pressure ammonia as a working fluid in the second power cycle yielded a calculated 1% to 2% more power than the power plant output of Illustrative Example 8 utilizing low pressure ammonia as a working fluid in the second power cycle.

Comparative Example 2

A Pressurized Water Nuclear Power Plant with Steam Ammonia Binary Cycle

A steam-ammonia binary power cycle was investigated and reported by J. Fleury—Electricite de France. The goal of this binary cycle was to (a) reduce the size of the lowest pressure steam turbine elements and (b) enable dry condensation of steam at a power plant. Dry cooling of steam at power plants may allow such power plants to be located away from bodies of water such as oceans, lakes and rivers. A further benefit of dry condensation may be that the generation capacity of the power plant is less influenced by changes of the ambient temperature and that additional electrical power may be produced by the ammonia power cycle.

Figure 12:
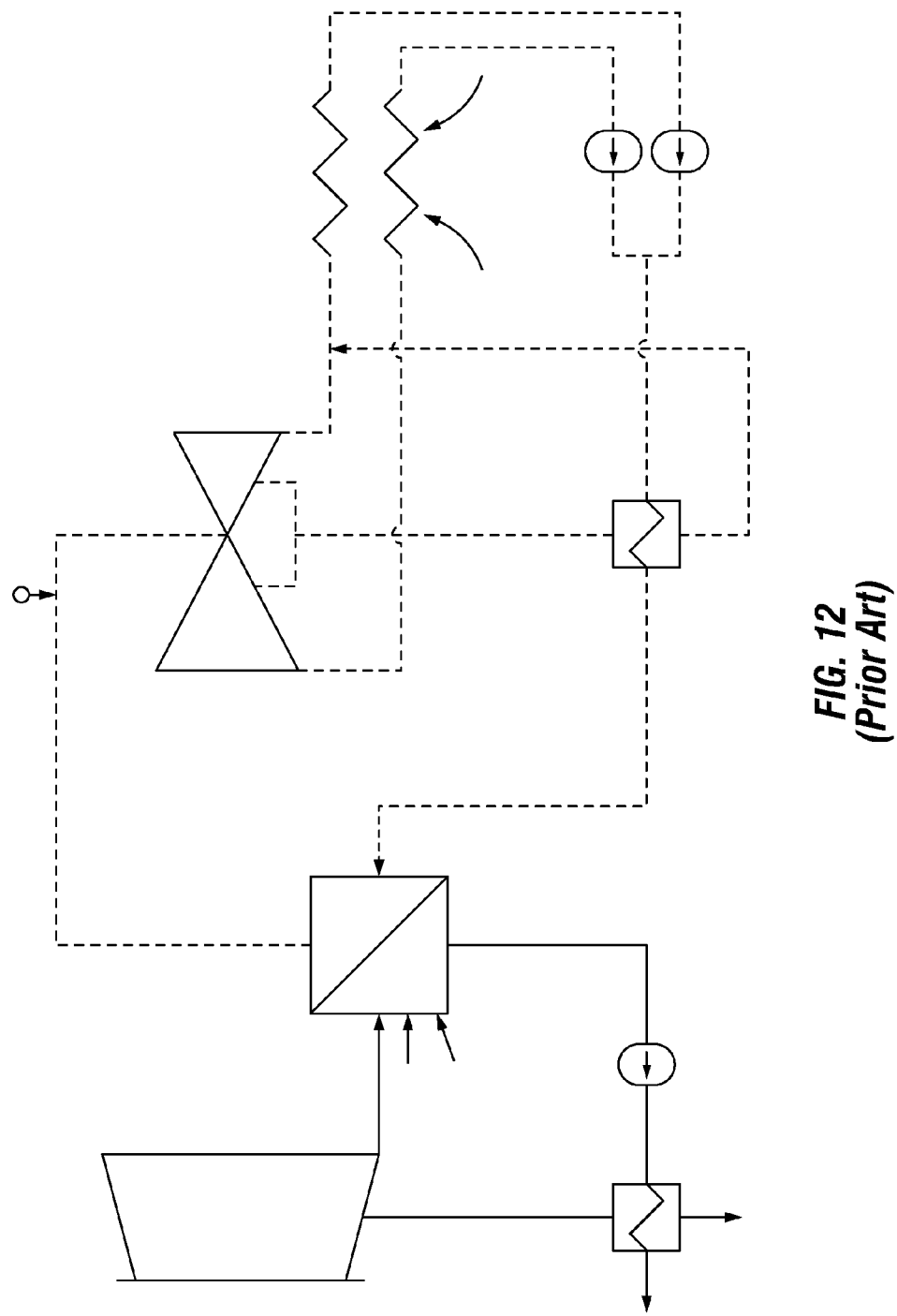
FIG. 12 provides a schematic diagram of a design plan of a nuclear electrical power generating system of the prior art.

The system developed was called CYBIAM. Liquid ammonia was used in a closed loop thermal cycle to condense steam and thereafter cool the condensed water prior to re-introduction of the water into the steam power cycle. An illustration of the CYBIAM system as it might be used, in conjunction with a 1,300 MWe Pressurized Water Nuclear Power Reactor is shown in FIG. 12.

Steam/water entered the CYBIAM steam condenser system from a low pressure steam turbine (1180 kg/second, assumed quality of 1.0, not superheated, 0.045 MPa) along with recycle streams from boiler feed water heaters and moisture separators (82 kg/second, quality 0.448 at 0.045 MPa). The vapor quality of the fluid return from the boiler feed water heaters, admixed with moisture separator return fluid, was adjusted to match the enthalpy of the steam/water condenser with the enthalpy change of liquid ammonia heater/boiler system. The overall characteristics of steam/water power cycle and the liquid ammonia power cycle of the system of Comparative Example 2 are summarized in Table CE-2-1.

TABLE CE-2-1

The CYBIAM System for Steam Condensation and Power Generation with an Ammonia Turbine Power Cycle

| Properties | Steam Input | Water Output | Ammonia Input | Ammonia Output |
|---|---|---|---|---|
| Vapor Quality | 0.964 | 0 | 0 | 1 |
| Temperature, °C. | 78.72 | 40.00 | 30.00 | 71.13 |
| Pressure, MPa | 0.045 | 0.045 | 3.4 | 3.4 |
| Flow Rate, kg/second (v) | 1216.7 | — | — | 2,645 |
| Flow Rate, kg/second (l) | 45.3 | 1,262 | 2,645 | — |
| Enthalpy, kJ/kg (v) | 2640.9 | — | — | 1626.2 |
| Enthalpy, kJ/kg (l) | 329.6 | 167.6 | 485.7 | — |
| Density, kg/m$^3$ | 0.244 (g) | 992.19 (l) | 597.41 (l) | 27.164 (g) |
| Thermal Power, MWt | 3,228.1 | 211.5 | 1,284.7 | 4,301.3 |

The condenser discharge water temperature was assumed to be 40° C., and the liquid ammonia coolant inlet temperature was assumed to be 30° C. The steam condenser and ammonia boiler heat exchange efficiencies were assumed to be 100% to determine power produced by the system at maximum efficiency. The ammonia boiler was stated to be a saturated vapor unit, therefore the working pressure defined the ammonia vapor effluent temperature and enthalpy. The flow rates of steam/water in the first power cycle and the ammonia liquid/vapor in the second power cycle were provided in the document.

Dry, hot, saturated ammonia vapor was routed to two expanders that were operated in parallel at different pressures. A first ammonia expander was operated to discharge ammonia at a pressure of 1.39 MPa, a temperature of 36° C., and a flow rate of 1201.5 kg/second with an effluent ammonia quality of 0.9. Expansion of ammonia through the first ammonia expander extracted 127.5 MWt thermal power. The first ammonia expander was calculated to yield about 113.6 MWe electric power in addition to electrical power produced by the steam expander, assuming that the expander had 90% isentropic efficiency and was connected to generator with 99% efficiency for conversion of rotational mechanical power into electrical power.

A second ammonia expander was operated to discharge ammonia at a pressure 1.09 MPa, a temperature of 28° C., and at a flow rate of 1183.5 kg/second with an effluent ammonia quality of 0.9. Expansion of ammonia through the second ammonia expander extracted 134.0 MWt thermal power. The second ammonia expander was calculated to yield about 119.4 MWe additional electric power, assuming that the expander had 90% isentropic efficiency and was connected to generator with 99% efficiency for conversion of rotational mechanical power into electrical power. Data related to the ammonia power recovery system are summarized in Table CE-2-2.

TABLE CE-2-2

The CYBIAM System
Parallel Ammonia Turbine Power Cycle Power Generation Summary

| | First Expander Inlet Conditions | Second Expander Inlet Conditions | First Expander Outlet Conditions | Second Expander Outlet Conditions |
|---|---|---|---|---|
| Quality | 1 | 1 | 0.9 | 0.9 |
| Temperature, ° C. | 71.13 | 71.13 | 36 | 28 |
| Pressure, MPa | 3.4 | 3.4 | 1.39 | 1.09 |
| Flow Rate, kg/second | 1201.5 | 1183.5 | 1201.5 | 1183.5 |
| V. Enthalpy, kJ/kg | 1626.2 | 1626.2 | 1631.9 | 1628.3 |
| L. Enthalpy, kJ/kg | 694.3 | 694.3 | 514.12 | 475.25 |
| density, kg/m3 | 27.164 | 27.164 | 27.164 | 27.164 |
| Thermal Power, MWt | 1953.9 | 1924.6 | 1826.4 | 1790.6 |
| Thermal Power extracted by expander, MWt | | | 127.5 | 134.0 |
| Mechanical Power, MW assuming 90% isentropic efficiency | | | 114.8 | 120.6 |
| Electrical Power, MWe assuming 99% generator efficiency | | | 113.6 | 119.4 |

The ammonia effluent streams from the first and second ammonia expanders were routed to air condensers and cooled against air whose temperature was 11° C. The liquefaction temperature of ammonia, at pressure of 1.09 MPa, is 27.7 C, and the liquefaction temperature of ammonia, at pressure of 1.39 MPa, is 36.0 C. Effluent liquid ammonia from the air condensers was assumed to have a temperature of 20° C. The enthalpy of liquid ammonia at 1.09 and 1.39 MPa and 20° C. is 437.0 and 437.2 kJ/kg, respectively. Thermal power rejected to the atmosphere as a result of air cooling the expanded ammonia effluent streams was computed to be about 1,301 MWt for the first expander ammonia effluent stream and 1,273 MWt for the second expander ammonia effluent stream.

Thermal power to re-heat liquid ammonia at 3.4 MPa and flow rate of 2,645 kg/second from 20 to 30 C was computed to be 125.8 MWt where the ammonia vapor extracted from the ammonia turbines for this purpose provided 311 MWt for that purpose.

Overall, the 1,300 MWe Pressurized Water Nuclear Power Reactor with the CYBIAM adaptation to permit dry cooling has an increase in electrical power output of 233 MWe, about a 19% increase relative to the un-modified power plant. Heat rejection to the atmosphere is estimated to be 2,760 MWt where the major contributing streams are the effluent of the first and second ammonia expanders at 1,301.2 and 1,273.4 MWt, respectively Ammonia extracted to preheat the return liquid ammonia stream contributed about 185.2 MWt to the heat rejected to the atmosphere.

Assuming that 100 MW of electric power was consumed in operation of the facility itself and that the steam expander system and ammonia expander system driving electric generators had 90% isentropic efficiency and that the electrical generators had 99% efficiency it may be computed that production of 1,633 MW of electric power (gross electrical power generation) required about 1,833 MW of thermal power. The gross thermal power of the entire CYBIAM modified Pressurized Water Nuclear Reactor power station was estimated to be about 4,593 MWt. The efficiency for conversion of that thermal power to gross electric power was, therefore, estimated to be about 35-36%. The vast majority of the thermal power was lost as waste heat emitted to the environment at the air cooler units of the ammonia condenser.

The net electric power of the entire CYBIAM modified Pressurized Water Nuclear Reactor power station was estimated to be about 33-34% basis gross thermal power of about 4,593 MWt.

The efficiency for conversion of thermal power to electric power, for the power plant of Comparative Example 2, is comparable to that of conventionally cooled similarly sized Pressurized Water Nuclear Reactor power station described in Comparative Example 3.

Comparative Example 3

Pressurized Water Nuclear Power Plant with Steam Cycle

A 1,600 MWe Pressurized Water Reactor Nuclear Power plant called Olkiluoto 3 is under construction in Finland; start up is expected in 2013. The facility was described in Framatome ANP publication number ANP:G-46-V1-05-ENG published in 2005. Additional description of the facility was published in "Modern Power Systems" magazine pages 43 to 46, August 2004 by Modern Power Systems. The author was Andreas Wichtmann of Siemens AG. Reprints of the article may be obtained from Siemens AG, order number E50001-G220-A119-X-4A00.

The thermal output of the reactor is 4,300 MWt. The electric power output exported from the power plant to external consumers is 1,600 MWe; about 100 to 120 MWe is consumed by internal operations of the power plant. The net electric power output of the plant is 1,600 MWe while the gross electric power output of the plant is 1,720 MWe.

Four steam generators, pumps, piping and pressurizers make up the primary reactor coolant system. Primary reactor coolant fluid is pumped, at about 327° C., from the reactor to each of the steam generators. In the steam generators, heat is exchanged from the primary reactor coolant circuits to feed water which is converted to steam to drive a turbine and electrical generator. Primary reactor coolant is returned from the steam generators to the reactor at about 300 C.

The steam, condensate, and feed water cycle comprise equipment similar to that found in traditional coal, oil and gas fired "steam boiler" power plants. The main components of the steam power generation system are the steam generators, a steam turbine having a high pressure section and a low pressure section, an electrical generator, a condenser, condensate pumps, feed water heaters and a feed water tank. Steam is produced in the steam generators at a temperature of 293° C. and a pressure of 7.8 MPa, at a mass flow rate of 8,794,800 kg/h. The steam is routed to a high pressure section of the steam turbine. The high pressure steam turbine is a double flow type. About 33% of the steam turbine total output is produced in the high pressure section of the steam turbine. Wet steam exits the high pressure section of the steam turbine at 1.0 MPa and 178° C.

Wet steam from the discharge of the high pressure section of the steam turbine is routed to moisture separator/reheater prior to introduction to the low pressure section of steam turbine. The low pressure section of the steam turbine is comprised of three double flow sections. Steam exits the low pressure section of the steam turbine at about 0.003 MPa and 30 C. The steam exiting the low pressure turbine section is routed to a condenser for liquefaction. The condenser is cooled with sea water. Due to the low sea water temperature in Finland, the net efficiency of the Olkiluoto 3 power station will be around 37% for conversion of thermal power generated in the Pressurized Water Nuclear Reactor to electric power.

More than 60% of the heat contained in the steam is lost because of condensation.

Condensate is pumped from the condenser through low pressure feed water heaters to the feed water tank. Feed water is pumped from the feed water tank via the high pressure feed water heaters back to the steam generator where it is heated and evaporated to enter the high pressure steam turbine again.

The steam turbine drive is coupled to the electrical generator that produces three phase alternating current at 27,000 volts. The electrical power is stepped up from 27,000 volts to 400,000 volts using three generator transformers and exported to the offsite power grid via high voltage switch gear.

Illustrative Example 10

Pressurized Water Nuclear Power Plant with Integrated Second Fluid Power Cycle

A design study was prepared based on thermodynamic calculations for a method and a system for producing electrical power using a first power cycle utilizing water/steam as the working fluid and a second power cycle integrated with the first power cycle utilizing carbon dioxide as a working fluid, where the method and system were in accordance with the present invention. In the first power cycle, a nuclear-powered heat source was utilized in the design study to produce steam for generation of electrical power followed by an integrated second fluid power cycle utilizing carbon dioxide as a working fluid. In the first power cycle, the nuclear-powered steam turbine driven generator portion of the design study of Illustrative Example 10 replicated the pressurized water nuclear power with a steam power cycle design study of 1600 MWe capacity described in Comparative Example 3 above with the exceptions that: (a) the moisture separator re-heaters; (b) the low pressure steam turbine and (c) the low pressure feed water heater were eliminated.

In the design study of Illustrative Example 10, as in the pressurized water nuclear power steam power cycle of Comparative Example 3, dry saturated steam produced by contacting water/steam with primary nuclear reactant coolant in a steam generator entered a high pressure steam turbine at a temperature of 293.25 C, a pressure of 7.80 MPa, and at a mass flow rate of 2,443 kg/second, where the enthalpy of the steam entering the high pressure steam turbine was calculated as 2761.6 kJ/kg. Similar to the steam power cycle of Comparative Example 3, steam exited the high pressure turbine at 178.02 C, 0.958 MPa and vapor quality less than 1. The effluent steam was directed to a steam condenser where it was liquefied and then recycled to the steam generator.

The vapor quality of the steam exiting high pressure steam turbine was computed by assuming that the high pressure steam turbine had isentropic efficiency of 90%, that the efficiency of the electrical generator for production of electrical power was 99%, and that the high pressure section of the steam turbine of Comparative Example 3 provided one third of the gross electrical power production of the power plant of Comparative Example 3 (gross electrical power production of power plant of Comparative Example 3=1720 MWe). Based on these assumptions, the gross electrical power production of the steam power generation system, when only the high pressure steam turbine was present, was estimated to be 573.3 MWe, where the maximum steam system gross power generation capacity was reduced by two thirds by elimination of the moisture separator re-heaters, the low pressure steam turbine, and the low pressure feed water heater.

The operating properties of the high pressure steam turbine and steam condenser of the design plan of Illustrative Example 10 are summarized in Table 1E-10-1.

TABLE IE-10-1

Operating Properties of the High Pressure Steam Turbine and the Steam Condenser

| | HP Turbine Input | HP Turbine Output/Condenser Inlet Conditions | Condenser Outlet Conditions |
|---|---|---|---|
| Quality | 1 | 0.863 | 0 |
| Temperature, C | 293.25 | 178.02 | 150 |
| Pressure, MPa | 7.80 | 0.958 | 0.958 |
| Flow Rate, kg/second | 2443 | 2443 | 2443 |
| V. Enthalpy, kJ/kg | 2761.6 | 2775.5 | — |
| L. Enthalpy, kJ/kg | 1307.7 | 754.33 | 632.48 |
| density, kg/m$^3$ | 41.287 | 4.939 | 917.28 |
| Thermal Power, MWt | 6746.6 | 6103.2 | 1545.1 |
| Thermal Power extracted, MWt | | 643.4 | |
| Mechanical Power, MW assuming 90% isentropic efficiency | | 579.1 | |
| Electrical Power, MWe assuming 99% generator efficiency | | 573.3 | |

In the design study of Illustrative Example 10, the wet steam was routed to the steam condenser from the high pressure steam turbine outlet where it was cooled to produce hot water. As shown in Table IE-10-1 the steam routed to the steam condenser was calculated to have a temperature of 178.02° C., a pressure of 0.958 MPa, was fed to the steam condenser at a flow rate of 8,794,800 kg/h and was calculated to be produced from the steam condenser at a temperature of 150 C, a pressure of about 0.958 MPa, at a mass flow rate of 8,794,800 kg/h. The enthalpy change upon condensation and cooling of water was calculated as 1865.8 kJ/kg of water, and the heat exchange duty of the condenser was calculated to be about 16,408,949,984 kJ/h.

The liquefied water stream at a temperature of 150 C, pressure of 0.958 MPa, enthalpy of 632.48 kJ/kg, density 917.28 kg/m$^3$ and mass flow rate of 8,794,800 kg/h was pumped by a low pressure water pump into a de-aerator tank of the steam system for recycle to the steam generators of the pressurized water reactor. The internal power consumption of the PWR power plant with only a high pressure steam turbine of the design plan of Illustrative Example 10 was substantially unchanged with respect to circulation of reactor primary coolant liquid to the steam generators and the recirculation of hot pressurized condensate to the steam generators relative to the plant design of Comparative Example 3. The internal power consumption in Comparative Example 3 was provided as 100 to 120 MWe.

In the design study of Illustrative Example 10, the net electrical power produced by the first power cycle utilizing steam/water as the working fluid was calculated to be from 453.3 to 473.3 MWe.

Liquid Carbon Dioxide Coolant to Condense Superheated Steam

In the design study of Illustrative Example 10, carbon dioxide was used as the working fluid in the second power cycle. Liquid carbon dioxide was utilized as the heat exchange fluid (coolant) in the steam condenser to condense steam of the first power cycle to liquid water. It was supplied to the steam condenser at an inlet temperature of 5 C, and pressure of 30 MPa. The enthalpy of liquid carbon dioxide at 5 C and 30 MPa is 203.3 kJ/kg.

As shown in Table IE-10-1, the thermal power of the steam entering the steam condenser was calculated to be 6103.2

MWt and the thermal power of the water exiting the steam condenser was calculated to be 1545.1 MWt. Assuming 100% heat transfer efficiency, the enthalpy of the carbon dioxide coolant fluid input to the steam condenser is increased by 4558 MWt as a result of steam condensation and water cooling.

In the design study of Illustrative Example 10, supercritical carbon dioxide was calculated to be produced from the steam condenser at a temperature of 150.0° C., and a pressure of 30 MPa, where the supercritical carbon dioxide was calculated to have an enthalpy of 488.1 kJ/kg. The enthalpy change of carbon dioxide upon transit through the steam condenser was calculated to be 284.8 kJ/kg. The flow rate of liquid carbon dioxide required to uptake 16,408,949,984 kJ/h required to cool the steam/water stream mixture in the condenser from 178° C. to 150° C. was calculated as 57,615,695.2 kg/h. The heat transfer efficiency from steam/water to carbon dioxide coolant is assumed to be 100% and the heat exchanger was assumed to provide negligible pressure drop.

Expansion of Supercritical Carbon Dioxide

In the design study of Illustrative Example 10, the supercritical carbon dioxide fluid produced from the steam condenser at a temperature of 150 C and a pressure of 30 MPa was routed to a multi-stage, dense fluid phase (two phase) isentropic expander driving an electrical generator. The supercritical carbon dioxide was expanded to a discharge pressure of 0.55 MPa. The mass flow rate of carbon dioxide fluid was calculated to be 57,615,695.2 kg/h. The temperature, pressure, enthalpy and vapor quality of the carbon dioxide fluid stream as it transited the multi-stage dense fluid phase expander were calculated and are summarized in Table IE-10-2.

TABLE IE-10-2

Properties of Carbon Dioxide as it Transits the Expander
Isochoric Data for D = 492 kg/m³

| Expansion Stage | Temperature, C. | Pressure, MPa | Enthalpy, kJ/kg | Vapor Quality |
|---|---|---|---|---|
| Stage 1 inlet | 150.0 | 30.0 | 488.1 | Supercritical |
| Stage 1 Outlet | 33.2 | 7.77 | 331.2 | Supercritical |
| Stage 2 Inlet | | | | |
| Stage 2 Outlet | 3.8 | 3.85 | 234.9 | 0.12 |
| Stage 3 Inlet | | | | |
| Stage 3 Outlet | −20.4 | 1.95 | 169.9 | 0.06 |
| Stage 4 Inlet | | | | |
| Stage 4 Outlet | −40.3 | 0.99 | 122.0 | 0.03 |
| Stage 5 Inlet | | | | |
| Stage 5 Outlet | −55.0 | 0.55 | 89.2 | 0.02 |
| Overall Change | −205.0 | 29.45 | −398.9 | 0.98 |

Calculations indicated that the expanded carbon dioxide was produced as a liquid at a temperature of −55.0 C, a pressure of 0.55 MPa, an enthalpy of 89.2 kJ/kg, a density of 1172.9 kg/m³, at a mass flow rate of 57,615,695.2 kg/h, and at a volumetric flow rate of 49,122.4 m³/h.

In the design study of Illustrative Example 10, cold carbon dioxide liquid was collected at the dense fluid phase expander outlet, pumped through a heat exchanger to reheat it to 5 C, and reintroduced to the condenser at 5 C and 30 MPa to re-enter the circuit of the second fluid integrated power cycle.

Mechanical power consumed to pump 49,122.4 m³/h of carbon dioxide was estimated, based on the computed slope of $3.42 \times 10^{-4}$ MWt/(m³/h) per megapascal differential pressure across the pump as calculated in Illustrative Example 1. This value was used to estimate the pumping power for liquid carbon dioxide to recycle with the second power cycle. Similar to Illustrative Example 1, the power required to pump liquid carbon dioxide for recycle was not the only large power consuming step when recycling liquid carbon dioxide in the second fluid power cycle; it was also necessary to re-compress the small fraction of carbon dioxide produced as a gas from the second fluid power cycle.

The power to pump liquid carbon dioxide, as if no vapor were present in the expander exhaust, was computed as a function of the pump differential pressure as described above; then, the value was down rated by the fraction of liquid carbon dioxide formed. The mechanical power required to pump the liquid carbon dioxide was calculated to be 484.9 MWm according to the following equation.

Liquid Pumping Power=$(3.42 \times 10^{-4}$ MW/(m³/h·MPa))
$(49,122.4$ m³/h)×(29.45 MPa)×(0.98)=484.9 MWm The power required for compression and liquefaction of carbon dioxide vapor was assumed to be 10 times that of the liquid carbon dioxide pumping power. In this way the compression power was sensitive to the final pressure and scaled to the fraction of carbon dioxide vapor formed at the expander outlet. The mechanical power required to liquefy the gaseous carbon dioxide was calculated to be 105.3 MWm according to the following equation:

Compression Power=$(3.42 \times 10^{-4}$ MW/(m³/h·MPa))
$(49,122.4$ m³/h)×(29.45 MPa)$_x$(0.02)×10=99.0 MWm The total mechanical power required to pump liquid carbon dioxide and compress gaseous carbon dioxide for recycle in the second power cycle was calculated to be 583.9 MWm.

Power Recovery from the Carbon Dioxide Expander

The electrical power generation from expansion of the carbon dioxide through the dense fluid phase expander was calculated. The net mechanical power (rotational) produced by expansion of the supercritical carbon dioxide through the dense phase fluid expander was calculated by subtracting the mechanical power required to recycle the liquid and gas components of carbon dioxide stream produced at the outlet of dense phase fluid expander in the second power cycle from the mechanical power produced by expansion of the supercritical carbon dioxide through the dense fluid phase isentropic expander. The electrical power produced by expansion of the supercritical carbon dioxide in the dense fluid phase isentropic expander was calculated from the net mechanical power as converted to electrical power by driving a generator whose efficiency was assumed to be 99%.

The thermal power produced by expansion of the supercritical carbon dioxide across the dense phase fluid isentropic expander was calculated from the enthalpy change of carbon dioxide across the expander and the mass flow of carbon dioxide through the expander. The enthalpy change of carbon dioxide across the expander was calculated as 398.9 kJ/kg, and the mass flow of carbon dioxide through the expander was calculated as 57,615,695.2 kg/h. The thermal power of expansion of the supercritical carbon dioxide across the expander was calculated as 22,982,900,802.8 kJ/h or 6,384.1 MWt.

The total mechanical power produced by expansion of the supercritical carbon dioxide across the dense fluid phase expander was calculated from the thermal power produced by expansion of the supercritical carbon dioxide across the dense fluid phase expander. The efficiency for conversion of thermal power to rotational mechanical power of the multi stage, dense fluid phase, isentropic expander was ascertained to be about 40-60%. The total mechanical power produced by expansion of the supercritical carbon dioxide across the dense fluid phase expander was estimated to range from 2553.7 to 3830.5 MWm. The net mechanical power provided by expansion of the supercritical carbon dioxide across the dense phase fluid expander was calculated as being in a range from 1969.8 to 3246.6 MWm by subtracting the mechanical power required for operation of the liquid carbon dioxide pump and compressor from the total mechanical power.

Assuming about 1% losses in the electrical generator, the quantity of electrical power generated in the second power cycle (carbon dioxide) was estimated to range from 1950.1 to 3,214.1 MWe.

Power Generation of Illustrative Example 10 Pressurized Water Nuclear Power Plant with integrated Second Fluid Power Cycle Versus Comparative Example 3

The total electrical power produced by the power plant of the design study of Illustrative Example 10 was calculated by adding the electrical power produced by the first power cycle (steam) and the electrical power produced by the second power cycle (carbon dioxide). The calculated total net electrical power of the power plant of Illustrative Example 10 ranged from 2,403.4 to 3,687.4 MWe at full load. The net plant efficiency basis fuel is estimated to be between 55 and 86% basis input fuel (4300 MWt fuel power).

The power plant of Illustrative Example 10 yields 50% to 130% more power per unit fuel relative to Comparative Example 3, which provided 1600 MWe net plant electrical power output for the same fuel consumption.

Illustrative Example 11

Pressurized Water Nuclear Power Plant with Integrated Second Fluid Power Cycle where the Second Fluid is Anhydrous Ammonia at Low Working Pressure A design study was prepared based on thermodynamic calculations for a method and a system for producing electrical power using a first power cycle utilizing water/steam as the working fluid and a second power cycle integrated with the first power cycle utilizing carbon dioxide as a working fluid, where the method and system were in accordance with the present invention. In the first power cycle, a nuclear-powered heat source was utilized in the design study to produce steam for generation of electrical power followed by an integrated second fluid power cycle utilizing carbon dioxide as a working fluid. In the first power cycle, the nuclear-powered steam turbine driven generator portion of the design study of Illustrative Example 11 replicated the pressurized water nuclear power with a steam power cycle design study of 1600 MWe capacity described in Comparative Example 3 above with the exceptions that: (a) the moisture separator re-heaters; (b) the low pressure steam turbine and (c) the low pressure feed water heater were eliminated.

In the design study of Illustrative Example 11, as in the pressurized water nuclear power steam power cycle of Comparative Example 3, dry saturated steam produced by contacting water/steam with primary nuclear reactant coolant in a steam generator entered a high pressure steam turbine at a temperature of 293.25 C, a pressure of 7.80 MPa, and at a mass flow rate of 2,443 kg/second, where the enthalpy of the steam entering the high pressure steam turbine was calculated as 2761.6 kJ/kg. Similar to the steam power cycle of Comparative Example 3, steam exited the high pressure turbine at 178.02 C, 0.958 MPa and vapor quality less than 1. The effluent steam was directed to a steam condenser where it was liquefied and then recycled to the steam generator.

The vapor quality of the steam exiting high pressure steam turbine was computed by assuming that the high pressure steam turbine had isentropic efficiency of 90%, that the efficiency of the electrical generator for production of electrical power was 99%, and that the high pressure section of the steam turbine of Comparative Example 3 provided one third of the gross electrical power production of the power plant of Comparative Example 3 (gross electrical power production of power plant of Comparative Example 3=1720 MWe). Based on these assumptions, the gross electrical power production of the steam power generation system, when only the high pressure steam turbine was present, was estimated to be 573.3 MWe, where the maximum steam system gross power generation capacity was reduced by two thirds by elimination of the moisture separator re-heaters, the low pressure steam turbine, and the low pressure feed water heater.

The operating properties of the high pressure steam turbine and steam condenser of the design plan of Illustrative Example 11 are the same as operating properties of the high pressure steam turbine and steam condenser of the design plan of Illustrative Example 10 summarized in Table IE-10-1 above.

In the design study of Illustrative Example 11, the wet steam was routed to the steam condenser from the high pressure steam turbine outlet where it was cooled to produce hot water. As shown in Table IE-10-1 the steam routed to the steam condenser was calculated to have a temperature of 178.02° C., a pressure of 0.958 MPa, was fed to the steam condenser at a flow rate of 8,794,800 kg/h and was calculated to be produced from the steam condenser as liquid water at a temperature of 150 C, a pressure of about 0.958 MPa, at a mass flow rate of 8,794,800 kg/h. The enthalpy change upon condensation and cooling of water was calculated as 1865.8 kJ/kg of water, and the heat exchange duty of the condenser was calculated to be about 16,408,949,984 kJ/h.

The liquefied water stream at a temperature of 150 C, pressure of 0.958 MPa, enthalpy of 632.48 kJ/kg, density 917.28 kg/m$^3$ and mass flow rate of 8,794,800 kg/h was pumped by a low pressure water pump into a de-aerator tank of the steam system for recycle to the steam generators of the pressurized water reactor. The internal power consumption of the PWR power plant with only a high pressure steam turbine of the design plan of Illustrative Example 11 was substantially unchanged with respect to circulation of reactor primary coolant liquid to the steam generators and the recirculation of hot pressurized condensate to the steam generators relative to the plant design of Comparative Example 3. The internal power consumption in Comparative Example 3 was provided as 100 to 120 MWe.

In the design study of Illustrative Example 11, the net electrical power produced by the first power cycle utilizing steam/water as the working fluid was calculated to be from 453.3 to 473.3 MWe.

Liquid Ammonia Coolant to Condense Superheated Steam

In the design study of Illustrative Example 11, low pressure anhydrous ammonia was used as the working fluid in the second power cycle. Liquid ammonia was utilized as the heat exchange fluid (coolant) in the steam condenser to condense steam of the first power cycle to liquid water. It was supplied to the steam condenser at an inlet temperature of 5 C, and pressure of 4.47 MPa. The enthalpy of liquid ammonia at 5 C and 4.47 MPa is 368.8 kJ/kg.

As shown in Table IE-10-1, the thermal power of the steam entering the steam condenser was calculated to be 6103.2 MWt and the thermal power of the water exiting the steam condenser was calculated to be 1545.1 MWt. Assuming 100% heat transfer efficiency, the enthalpy of the ammonia coolant fluid input to the steam condenser is increased by 4558 MWt as a result of steam condensation and water cooling.

In the design study of Illustrative Example 11, ammonia vapor was calculated to be produced from the steam condenser at a temperature of 150.0° C., and a pressure of 4.47 MPa, where the ammonia vapor was calculated to have an enthalpy of 1866.9 kJ/kg. The enthalpy change of ammonia upon transit through the steam condenser was calculated to be 1498.1 kJ/kg. The flow rate of liquid ammonia required to uptake 16,408,949,984 kJ/h required to cool the steam/water stream mixture in the condenser from 178° C. to 150° C. was calculated as 10,953,174 kg/h. The heat transfer efficiency from steam/water to ammonia coolant is assumed to be 100% and the heat exchanger was assumed to provide negligible pressure drop.

Ammonia vapor at about 150 C and 4.47 MPa is routed to one or more multi stage, dense fluid phase, isentropic expander driving electrical generators. It is expanded to a discharge pressure of 0.113 MPa. The mass flow rate of ammonia fluid is 10,953,174 kg/h.

Expansion of Ammonia Vapor

In the design study of Illustrative Example 11, the ammonia vapor produced from the steam condenser at a temperature of 150 C and a pressure of 4.47 MPa was routed to a multi-stage, dense fluid phase (two phase) isentropic expander driving an electrical generator. The ammonia vapor was expanded to a discharge pressure of 0.113 MPa. The mass flow rate of ammonia was calculated to be 10,953,174 kg/h. The temperature, pressure, enthalpy and vapor quality of the ammonia fluid stream as it transited the multi-stage dense fluid phase expander were calculated and are summarized in Table 1E-11-1.

TABLE IE-11-1

Properties of Ammonia as it Transits the Expander
Isochoric Data for D = 25.0 kg/m$^3$

| Expansion Stage | Temperature, C. | Pressure, MPa | Enthalpy, kJ/kg | Quality |
|---|---|---|---|---|
| Stage 1 inlet | 150.0 | 4.47 | 1,866.9 | Vapor |
| Stage 1 Outlet | 54.375 | 2.275 | 1324.4 | 0.70 |
| Stage 2 Inlet | | | | |
| Stage 2 Outlet | 28.500 | 1.116 | 865.4 | 0.34 |
| Stage 3 Inlet | | | | |
| Stage 3 Outlet | 7.125 | 0.556 | 587.8 | 0.17 |
| Stage 4 Inlet | | | | |
| Stage 4 Outlet | −12.000 | 0.268 | 399.4 | 0.09 |
| Stage 5 Inlet | | | | |
| Stage 5 Outlet | −31.125 | 0.113 | 253.6 | 0.04 |
| Overall Change | −181.125 | 4.357 | −1613.3 | 0.96 |

Calculations indicated that the expanded ammonia was produced as a liquid at a temperature of −31.13° C., a pressure of 0.113 MPa, an enthalpy of 253.6 kJ/kg, a density of 679.2 kg/m$^3$, at a mass flow rate of 10,953,174 kg/h, and at a volumetric flow rate of 16,126.6 m$^3$/h.

In the design study of Illustrative Example 11, cold ammonia liquid was collected at the dense fluid phase expander outlet, pumped through a heat exchanger to reheat it to 5 C, and reintroduced to the condenser at 5 C and 4.47 MPa to re-enter the circuit of the second fluid integrated power cycle.

Mechanical power consumed to pump 16,126.6 m$^3$/h of ammonia was estimated, based on the computed slope of $3.42 \times 10^{-4}$ MWt/(m$^3$/h) per megapascal differential pressure across the pump as calculated in Illustrative Example 1. This value was used to estimate the pumping power for liquid ammonia to recycle with the second power cycle. Similar to Illustrative Example 1, the power required to pump liquid ammonia for recycle was not the only large power consuming step when recycling liquid ammonia in the second fluid power cycle; it was also necessary to re-compress the small fraction of ammonia produced as a gas from the second fluid power cycle.

The power to pump liquid ammonia, as if no vapor were present in the expander exhaust, was computed as a function of the pump differential pressure as described above; then, the value was down rated by the fraction of liquid ammonia formed. The mechanical power required to pump the liquid ammonia was calculated to be 23.1 MWm according to the following equation.

Liquid Pumping Power=$(3.42 \times 10^{-4}$ MW/(m$^3$/h·MPa)) $(16,126.6$ m$^3$/h$) \times (4.357$ MPa$) \times (0.96) = 23.1$ MWm The power required for compression and liquefaction of ammonia vapor was assumed to be 10 times that of the liquid ammonia pumping power. In this way the compression power was sensitive to the final pressure and scaled to the fraction of ammonia vapor formed at the expander outlet. The mechanical power required to liquefy the gaseous ammonia was calculated to be 9.6 MWm according to the following equation:

Compression Power=$(3.42 \times 10^{-4}$ MW/(m$^3$/h·MPa)) $(16,126$ m$^3$/h$) \times (4.357$ MPa$) \times (0.04) \times 10 = 9.6$ MWm The total mechanical power required to pump liquid ammonia and compress gaseous ammonia for recycle in the second power cycle was calculated to be 32.7 MWm.

Power Recovery from the Ammonia Expander

The electrical power generation from expansion of the ammonia vapor through the dense fluid phase expander was calculated. The net mechanical power (rotational) produced by expansion of the ammonia vapor through the dense phase fluid expander was calculated by subtracting the mechanical power required to recycle the liquid and gas components of the ammonia stream produced at the outlet of dense phase fluid expander in the second power cycle from the mechanical power produced by expansion of the ammonia vapor through the dense fluid phase isentropic expander. The electrical power produced by expansion of the ammonia vapor in the dense fluid phase isentropic expander was calculated from the net mechanical power as converted to electrical power by driving a generator whose efficiency was assumed to be 99%.

The thermal power produced by expansion of the ammonia vapor across the dense phase fluid isentropic expander was calculated from the enthalpy change of ammonia across the expander and the mass flow of ammonia through the expander. The enthalpy change of ammonia across the expander was calculated as 1613.3 kJ/kg, and the mass flow of carbon dioxide through the expander was calculated as 10,953,174 kg/h. The thermal power of expansion of the ammonia vapor across the expander was calculated as 17,670,755,630 kJ/h or 4,908.5 MWt.

The total mechanical power produced by expansion of the ammonia vapor across the dense fluid phase expander was calculated from the thermal power produced by expansion of the ammonia vapor across the dense fluid phase expander. The efficiency for conversion of thermal power to rotational mechanical power of the multi stage, dense fluid phase, isentropic expander was ascertained to be about 40-60%. The total mechanical power produced by expansion of the ammonia vapor across the dense fluid phase expander was estimated to range from 1,963.4 to 2,945.1 MWm. The net mechanical power provided by expansion of the ammonia vapor across the dense phase fluid expander was calculated as being in a range from 1,930.7 to 2,912.4 MWm by subtracting the mechanical power required for operation of the liquid ammonia pump and compressor from the total mechanical power.

Assuming about 1% losses in the electrical generator, the quantity of electrical power generated in the second power cycle (ammonia) was estimated to range from 1911.4 to 2,883.3 MWe.

Power Generation of Illustrative Example II Pressurized Water Nuclear Power Plant with integrated Anhydrous Ammonia Second Fluid Power Cycle versus Comparative Example 3

The total electrical power produced by the power plant of the design study of Illustrative Example 11 was calculated by adding the electrical power produced by the first power cycle (steam) and the electrical power produced by the second power cycle (ammonia). The calculated total electrical power of the power plant of Illustrative Example 11 ranged from 2,364.7 to 3,356.6 MWe at full load. The net plant efficiency basis fuel is estimated to be between 55 and 78% basis input fuel (4300 MWt fuel power). The power plant of Illustrative Example 11 yields 47% to 110% more power per unit fuel relative to Comparative Example 3, which provided 1600 MWe net plant electrical power output for the same fuel consumption.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. While systems and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from a to b," or, equivalently, "from a-b") disclosed herein is to be understood to set forth every number and range encompassed within the broader range of values. Whenever a numerical range having a specific lower limit only, a specific upper limit only, or a specific upper limit and a specific lower limit is disclosed, the range also includes any numerical value "about" the specified lower limit and/or the specified upper limit. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

What is claimed is:

1. A method for producing power comprising:
providing a water vapor stream comprising at least 50 mass % water vapor;
providing a fluid stream comprised of a fluid in liquid or supercritical phase, where the fluid of the fluid stream is formed of one or more constituents selected from the group consisting of molecular nitrogen, argon, a chemical compound having a boiling point of at most 65° C. at 0.101 MPa and a latent heat of vaporization of at least 350 kJ/kg, and a chemical compound having a boiling point of at most 65° C. at 0.101 MPa and a specific heat capacity as a liquid of at least 1.9 kJ/kg-° K, where the one or more constituents comprise at least 50% of the fluid;
thermally contacting the water vapor stream and the fluid stream and exchanging heat between the water vapor stream and the fluid stream to condense water from the water vapor stream and to heat the fluid stream, where the heated fluid stream is comprised of the fluid in gaseous or supercritical phase;
expanding the heated fluid stream to produce an expanded fluid stream comprised of the fluid in liquid phase and to generate mechanical power;
in the step of thermally contacting the water vapor stream and the fluid stream, controlling the mass flow rate of the fluid stream, or the mass flow rate of the water vapor stream, or the mass flow rates of both the fluid stream and the water vapor stream to maintain the temperature of liquid phase fluid of the expanded fluid stream at or below 10° C.; and
generating electrical power from the mechanical power.

2. The method of claim 1 wherein at least a portion of the heat exchanged between the water vapor stream and the fluid stream is at least a portion of the latent heat of condensation of water condensed from the water vapor stream, wherein the water vapor stream is condensed to produce a water stream having a vapor quality of at most 0.25.

3. The method of claim 1 wherein the water vapor stream is provided for thermal contact with the fluid stream at a temperature of from 100° C. to 200° C. and the fluid stream is provided for thermal contact with the water vapor stream at a temperature of from 0° C. to 65° C.

4. The method of claim 1 further comprising thermally contacting at least a portion of the liquid phase fluid of the expanded fluid stream with the water vapor stream to exchange heat between the water vapor stream and the liquid phase fluid of the expanded fluid stream to condense water from the water vapor stream and to convert at least a portion of the liquid phase fluid of the expanded fluid stream to a gaseous or supercritical phase.

5. The method of claim 1 wherein, in the step of thermally contacting the water vapor stream and the fluid stream, the mass flow rate of the fluid stream, or the mass flow rate of the water vapor stream, or the mass flow rates of both the fluid stream and the water vapor stream is, or are, controlled to produce the expanded fluid stream at a vapor quality of at most 0.5.

6. The method of claim 1 wherein, in the step of thermally contacting the water vapor stream and the fluid stream, the mass flow rate of the fluid stream, or the mass flow rate of the water vapor stream, or the mass flow rates of both the fluid stream and the water vapor stream is, or are, controlled to maintain the temperature of the liquid phase fluid of the expanded fluid stream at from −100° C. to 0° C.

7. The method of claim 6 further comprising the steps of:
providing a solvent effective for absorbing carbon dioxide or sulfur dioxide at a temperature of −25° C. or below;
exchanging heat between the liquid phase fluid of the expanded fluid stream having a temperature of from −100° C. to −25° C. and the solvent to heat the liquid phase fluid of the expanded fluid stream and to cool the solvent to a temperature of from −100° C. to −25° C.; and
scrubbing a flue gas stream comprising carbon dioxide or sulfur dioxide with the cooled solvent to separate carbon dioxide or sulfur dioxide from the flue gas stream and absorb the carbon dioxide or sulfur dioxide in the cooled solvent and thereby produce a carbon dioxide-rich solvent or a sulfur dioxide-rich solvent.

8. The method of claim 7 further comprising the step of thermally contacting at least a portion of the heated liquid phase fluid of the expanded fluid stream with the water vapor stream to exchange heat between the water vapor stream and the heated liquid phase fluid of the expanded fluid stream to condense water from the water vapor stream and to convert at least a portion of the heated liquid phase fluid of the expanded fluid stream to a gaseous or supercritical phase.

9. The method of claim 8 further comprising the step of expanding the gaseous or supercritical phase fluid generated by converting the heated liquid phase fluid of the expanded fluid stream to produce at least a portion of the expanded fluid stream.

10. The method of claim 7 further comprising the step of heating the carbon dioxide-rich or sulfur dioxide-rich solvent to separate the carbon dioxide or sulfur dioxide from the carbon dioxide-rich or sulfur dioxide-rich solvent, respectively, and regenerate the solvent.

11. The method of claim 10 further comprising the step of thermally contacting the regenerated solvent with the liquid phase fluid of the expanded fluid stream having a temperature of from −100 C to −25° C. to cool the regenerated solvent to a temperature of from −100° C. to −25° C. and to heat the liquid phase fluid of the expanded fluid stream.

12. The method of claim 1 wherein the fluid is selected from the group consisting of anhydrous ammonia, anhydrous carbon dioxide, anhydrous sulfur dioxide, methanol, dichloromethane, dimethyl ether, acetone, diethyl ether, methyl amine, dimethyl amine, trimethyl amine, and mixtures thereof.

13. The method of claim 1 wherein the water vapor stream is provided by:
heating water to generate steam having a temperature of at least 350° C. and a pressure of at least 3 MPa;
expanding the steam to produce the water vapor stream and to produce mechanical power; and
generating electrical power from the mechanical power produced by expanding the steam.

14. The method of claim 13 wherein the step of heating water to generate steam comprises combusting a fuel stream to produce a combusted gas stream containing thermal power and thermally contacting the combusted gas stream and the water.

15. The method of claim 14 wherein the combusted gas stream comprises carbon dioxide or sulfur dioxide and wherein the step of thermally contacting the combusted gas stream and water cools the combusted gas stream to produce a flue gas stream comprising carbon dioxide or sulfur dioxide, and further comprising the step of directly physically contacting the flue gas stream with a solvent capable of absorbing carbon dioxide or sulfur dioxide and having a temperature of less than 0° C. to separate carbon dioxide or sulfur dioxide from the flue gas stream.

16. The method of claim 15 further comprising the steps of:
in the step of thermally contacting the water vapor stream and the fluid stream, controlling the mass flow rate of the fluid stream, or the mass flow rate of the water vapor stream, or the mass flow rates of both the fluid stream and the water vapor stream to maintain the temperature of the liquid phase fluid of the expanded fluid stream at from −100° C. to −25° C.;
thermally contacting the liquid phase fluid of the expanded fluid stream having a temperature of from −100° C. to −25° C. and the solvent to heat the liquid phase fluid of the expanded fluid stream and to cool the solvent to a temperature of from −100° C. to −25° C.; and
directly contacting the flue gas stream comprising carbon dioxide or sulfur dioxide with the cooled solvent to separate carbon dioxide or sulfur dioxide from the flue gas stream and capture the carbon dioxide or sulfur dioxide in the solvent thereby producing a carbon dioxide-rich or a sulfur dioxide-rich solvent containing an increased amount of carbon dioxide or sulfur dioxide, respectively, therein relative to the cooled solvent.

17. The method of claim 16 further comprising the step of heating the carbon dioxide-rich or sulfur dioxide-rich solvent to separate the carbon dioxide or the sulfur dioxide from the carbon dioxide-rich or the sulfur dioxide-rich solvent, respectively, and regenerate the solvent.

18. The method of claim 17 further comprising the step of contacting the regenerated solvent with liquid phase fluid of the expanded fluid stream having a temperature of from −100 C to −25° C. to cool the regenerated solvent to a temperature of from −100° C. to −25° C. and to heat the liquid phase fluid of the expanded fluid stream.

19. The method of claim 1 wherein the one or more constituents comprise at least 75 wt. % of the fluid.

20. The method of claim 1 wherein the heated fluid stream is expanded in two or more stages in sequence, wherein the final stage of expansion produces the expanded fluid stream comprised of the liquid phase fluid.

21. The method of claim 1 wherein the fluid stream is provided for thermal contact with the water vapor stream, or the water vapor stream is provided for thermal contact with the liquid phase fluid stream, at a flow rate effective to provide a mass ratio of the fluid stream to the water vapor stream of at least 1.

22. The method of claim 1 wherein the fluid of the fluid stream provided for thermal contact with the water vapor stream is in supercritical phase.

* * * * *